United States Patent [19]
Hikita et al.

[11] Patent Number: 6,047,306
[45] Date of Patent: Apr. 4, 2000

[54] CDMA COMMUNICATION RF SIGNAL PROCESSING APPARATUS USING SAW

[75] Inventors: Mitsutaka Hikita; Chisaki Takubo, both of Hachioji; Nobuhiko Shibagaki, Kodaira; Kazuyuki Sakiyama, Chigasaki, all of Japan

[73] Assignee: Hitachi, Ltd., Japan

[21] Appl. No.: 08/980,086

[22] Filed: Nov. 26, 1997

[30] Foreign Application Priority Data

Nov. 29, 1996 [JP] Japan ..................................... 8-319077

[51] Int. Cl.[7] .............................. G06G 7/12; H01L 41/40
[52] U.S. Cl. ....................................... 708/815; 310/313 R
[58] Field of Search .................. 708/813, 815; 310/313 R

[56] References Cited

U.S. PATENT DOCUMENTS 4,021,657  5/1977  Auld ........................................ 708/815
5,434,893  7/1995  Le Roy et al. .......................... 708/815

*Primary Examiner*—Tan V. Mai
*Attorney, Agent, or Firm*—Sofer & Haroun, LLP

[57] ABSTRACT

A surface acoustic wave signal processing apparatus for processing first and second high-frequency signals having frequencies $f_1$ and $f_2$ respectively, which comprises: first and second surface acoustic wave delay elements for receiving the first and second high-frequency signals respectively and independently of each other, the delay elements being formed as surface acoustic wave excitation and reception transducers on a piezoelectric substrate so that a phase delay $\phi_1$ with respect to the frequency $f_1$ is substantially equal to a phase delay $\phi_2$ with respect to the frequency $f_2$ (that is, $\phi_1 \approx \phi_2$); and a mixer for mixing first and second high-frequency output signals of the first and second surface acoustic wave delay elements so that a signal having a frequency $|f_1-f_2|$ which is a difference between the two frequencies $f_1$ and $f_2$ is taken out as an output signal of the mixer.

45 Claims, 33 Drawing Sheets

$$\phi_1(1) = \frac{\omega 1}{v} l1, \quad \phi_1(2) = \frac{\omega 1}{v}(l1+l1'), \quad \omega 1 = 2\pi f1$$

$$\phi_2(1) = \frac{\omega 2}{v} l2, \quad \phi_2(2) = \frac{\omega 2}{v}(l2+l2'), \quad \omega 2 = 2\pi f2$$

FIG. 8A

| MODULATION DATA | | | | DEMODULATION DATA | | CLOCK PULSES |
|---|---|---|---|---|---|---|
| I-CHANNEL | | Q-CHANNEL | | I-CHANNEL | Q-CHANNEL | |
| PRESENT DATA | FORMER DATA | PRESENT DATA | FORMER DATA | | | |
| m | m | n | n | $\{\{IIi(1)+IIi(2)\}^2$ $+\{QQi(1)+QQi(2)\}^2$ $-\{IIi(1)-IIi(2)\}^2$ $-\{QQi(1)-QQi(2)\}^2\}$ | $\{\{IIq(1)+IIq(2)\}^2$ $+\{QQq(1)+QQq(2)\}^2$ $-\{IIq(1)-IIq(2)\}^2$ $-\{QQq(1)-QQq(2)\}^2\}$ | $\{\{IIi(1)+IIi(2)\}^2+\{QQi(1)+QQi(2)\}^2$ $+\{IIi(1)-IIi(2)\}^2+\{QQi(1)-QQi(2)\}^2\}$ OR $\{\{IIq(1)+IIq(2)\}^2+\{QQq(1)+QQq(2)\}^2$ $+\{IIq(1)-IIq(2)\}^2+\{QQq(1)-QQq(2)\}^2\}$ |
| m | m | -n | n | $4\{IIi(1)^2+QQi(1)^2\}$ | $4\{IIq(1)^2+QQq(1)^2\}$ | $4\{IIi(1)^2+QQi(1)^2\}$ OR $4\{IIq(1)^2+QQq(1)^2\}$ |
| m | -m | n | n | $4\{IIi(1)^2+QQi(1)^2\}$ | $-4\{IIq(1)^2+QQq(1)^2\}$ | $4\{IIi(1)^2+QQi(1)^2\}$ OR $4\{IIq(1)^2+QQq(1)^2\}$ |
| m | -m | -n | n | $-4\{IIi(1)^2+QQi(1)^2\}$ | $4\{IIq(1)^2+QQq(1)^2\}$ | $4\{IIi(1)^2+QQi(1)^2\}$ OR $4\{IIq(1)^2+QQq(1)^2\}$ |
| m | m | -n | n | $-4\{IIi(1)^2+QQi(1)^2\}$ | $-4\{IIq(1)^2+QQq(1)^2\}$ | $4\{IIi(1)^2+QQi(1)^2\}$ OR $4\{IIq(1)^2+QQq(1)^2\}$ | m, n = +1 or −1

| MODULATION DATA | | DEMODULATION DATA | CLOCK PULSES |
|---|---|---|---|
| PRESENT DATA | FORMER DATA | $\{IIi(1)+IIi(2)\}^2$ $+\{QQi(1)+QQi(2)\}^2$ $-\{IIi(1)-IIi(2)\}^2$ $-\{QQi(1)-QQi(2)\}^2$ | $\{IIi(1)+IIi(2)\}^2$ $+\{QQi(1)+QQi(2)\}^2$ $+\{IIi(1)-IIi(2)\}^2$ $+\{QQi(1)-QQi(2)\}^2$ |
| m | m | $4\{IIi(1)^2+QQi(1)^2\}$ | $4\{IIi(1)^2+QQi(1)^2\}$ |
| m | −m | $-4\{IIi(1)^2+QQi(1)^2\}$ | $4\{IIi(1)^2+QQi(1)^2\}$ | m = +1 or −1

FIG. 12A

| MODULATION DATA | | | | DEMODULATION DATA | | CLOCK PULSES |
|---|---|---|---|---|---|---|
| I-CHANNEL | | Q-CHANNEL | | I-CHANNEL | Q-CHANNEL | |
| PRESENT DATA | FORMER DATA | PRESENT DATA | FORMER DATA | | | |
| m | m | n | n | $\|ooi(1)+ooi(2)\|^2 - \|ooi(1)-ooi(2)\|^2$ | $\|ooq(1)+ooq(2)\|^2 - \|ooq(1)-ooq(2)\|^2$ | $\|ooi(1)+ooi(2)\|^2 + \|ooi(1)-ooi(2)\|^2$ OR $\|ooq(1)+ooq(2)\|^2 + \|ooq(1)-ooq(2)\|^2$ |
| m | m | n | -n | $4\|ooi(1)\|^2$ | $4\|ooq(1)\|^2$ | $4\|ooi(1)\|^2$ OR $4\|ooq(1)\|^2$ |
| m | -m | n | n | $4\|ooi(1)\|^2$ | $-4\|ooq(1)\|^2$ | $4\|ooi(1)\|^2$ OR $4\|ooq(1)\|^2$ |
| m | -m | n | n | $-4\|ooi(1)\|^2$ | $4\|ooq(1)\|^2$ | $4\|ooi(1)\|^2$ OR $4\|ooq(1)\|^2$ |
| m | -m | n | -n | $-4\|ooi(1)\|^2$ | $-4\|ooq(1)\|^2$ | $4\|ooi(1)\|^2$ OR $4\|ooq(1)\|^2$ | m,n = +1 or -1

6,047,306

CDMA COMMUNICATION RF SIGNAL PROCESSING APPARATUS USING SAW

BACKGROUND OF THE INVENTION

1. Field of the Invention

The present invention relates to a signal processing apparatus in which transducers for exciting or receiving surface acoustic wave (hereinafter referred to as SAW) are formed on a piezoelectric substrate of a single crystal such as lithium niobate ($LiNbO_3$), lithium tantalate ($LiTaO_3$), lithium borate ($Li_2B_4O_7$), quartz, etc. or on a piezoelectric substrate in which a film such as a zinc oxide (ZnO) film, etc. is formed on a non-piezoelectric substrate so that filtering of high-frequency signals and making correlation between high-frequency signals are performed by means of converting electric signals into SAW signals and converting SAW signals into electric signals.

2. Description of the Related Art

An SAW correlator (convolver) shown in FIG. 1 is a typical example of a conventional signal processing apparatus using SAW. In the SAW correlator, transducer electrodes 4 and 5 for exciting SAW are formed on an upper surface of a piezoelectric substrate 1, and a uniform electrode 9 is formed between two transducers disposed in the center portion of the piezoelectric substrate 1. A uniform ground electrode 6 is formed under a lower surface of the piezoelectric substrate 1. Independent high-frequency signals are applied from independent electric terminals 2-1 and 3-1.

The high-frequency signals thus applied are converted into SAW signals, and the SAW signals are inputted into the uniform electrode 9 in the center portion from left and right sides. When the amplitude of each of the high-frequency signals is large at some extent, the member of the product of the high-frequency signals entering from the left and right sides is generated under the electrode 9 by the nonlinear effect of SAW. This member is integrated spatially and taken out as an output between the terminal 8 and the ground 7.

The signal processing apparatus shown in FIG. 1 can be used as a demodulator for spread-spectrum communication. That is, a spread-spectrum signal received by an end device is inputted to the terminal 2-1. A replica signal spectrally spreaded on the basis of a code row obtained by time inversion of a specific code row allocated to each end device is inputted to the terminal 3-1 so that only the data allocated to each end device can be demodulated from the reception spread-spectrum signal selectively. In this case, the frequency of the output demodulation signal is twice as high as the frequency of the input signal.

Although the SAW signal processing apparatus shown in FIG. 1 has been already used for demodulation in spread-spectrum communication for special purposes, the apparatus has a large disadvantage as follows. Because the nonlinear effect of SAW is substantially small, the level of the output signal is low. Further, a replica signal spectrally spread on the basis of a code row obtained by time inversion of a specific code row allocated to each end device needs to be generated in the end device. Therefore, a replica signal generating circuit needs to be provided separately. There arises a disadvantage that the total circuit scale becomes large. Further, because the frequency of the demodulation signal is twice as high as the frequency of the input signal, it is difficult to handle the demodulation signal after that.

SUMMARY OF THE INVENTION

An object of the present invention is to provide a SAW signal processing apparatus in which the aforementioned disadvantage is eliminated, that is, the disadvantage that no signal but low-level output signal can be obtained can be improved greatly without requiring any replica signal generating circuit which must be provided separately in the apparatus shown in FIG. 1.

In order to achieve the above object, a spread-spectrum signal and a non-modulation signal are inputted to SAW delay elements independently or integrally. Further, the spread-spectrum output signal and the non-modulation output signal are mixed by external mixers. The outputs of the mixers are weighted correspondingly to a code row. As a result, the replica signal generating circuit as described above becomes unnecessary. Not only SAW delay elements giving preference to conversion efficiency can be employed but also a large-level output signal can be obtained because the amplification factors of the mixers have contribution thereto.

BRIEF DESCRIPTION OF THE DRAWINGS

FIGS. 8A and 8B are views showing arithmetic operations for obtaining demodulation data from QPSK-modulation data in the embodiment of the present invention depicted in FIG. 5;

FIGS. 12A and 12B are views showing arithmetic operations for obtaining demodulation data from QPSK-modulation (data) in the embodiment of the present invention depicted in FIG. 10;

DESCRIPTION OF THE PREFERRED EMBODIMENTS

Figure 2:
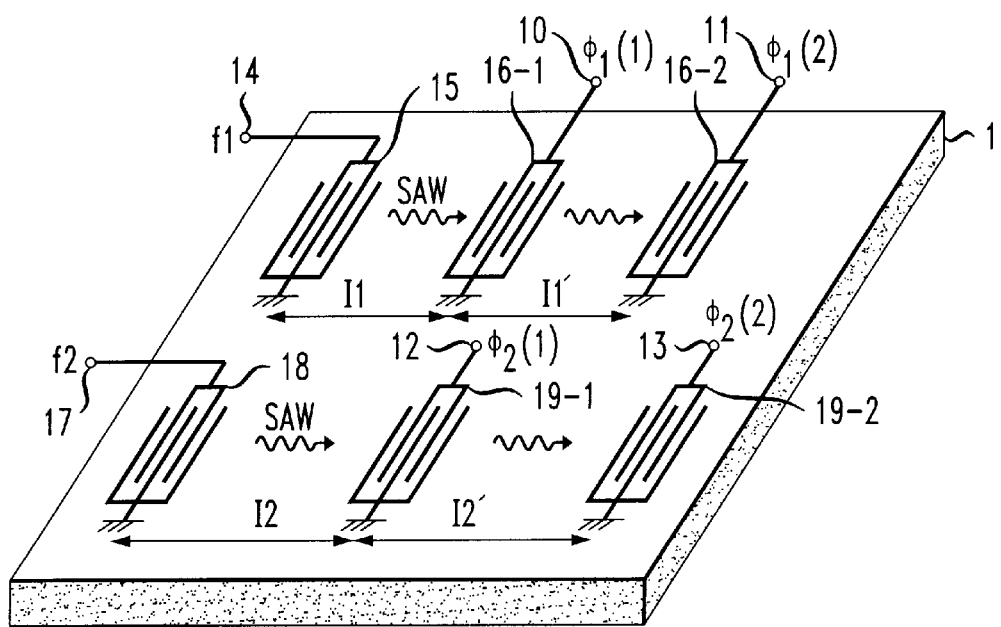
FIG. 2 is a partial view for explaining the present invention.

FIG. 2 is a partial view showing a first embodiment of the present invention. First, in order to solve inefficiency which is the largest problem of the conventional SAW signal processing apparatus, generally, it is necessary to use, as the piezoelectric substrate 1, a substrate which is large in electromechanical coupling coefficient $k^2$ expressing the efficiency of electricity-SAW conversion. As examples of the piezoelectric substrate large in $k^2$, $LiNbO_3$, $LiTaO_3$, $Li_2B_4O_7$, etc. are currently known. The temperature characteristic in the acoustic velocity of SAW propagating in these piezoelectric substrates is, however, poor. Therefore, if an apparatus configuration which can compensate the temperature characteristic is put into practice, the inefficiency can be solved radically by positive use of the aforementioned substrates.

FIG. 2 shows an example of the apparatus configuration including the aforementioned temperature compensation according to the present invention as stated in Claims 1 to 3. As shown in FIG. 2, two transducers 15 and 18 for exciting SAW are formed on a piezoelectric substrate 1, and transducers 16-1 and 16-2 and transducers 19-1 and 19-2 are formed for receiving SAW signals excited by the transducers 15 and 18 and converting the SAW signals into electric signals again. In FIG. 2, an SAW delay element constituted by the upper propagation path is referred to as a first delay element and an SAW delay element constituted by the lower propagation path is referred to as a second delay element. In FIG. 2, a high-frequency signal with a frequency $f_1$ is supplied to the first delay element and a high-frequency signal with a frequency $f_2$ is supplied to the second delay element. Let v be the acoustic velocity of SAW, and $l_1$, $l_1'$, $l_2$ and $l_2'$ be the distances between excitation and reception transducers respectively as shown in the drawing. The phase delays $\phi$ in output signals relative to input signals having frequencies $f_1$ and $f_2$ are given as follows:

$$\phi_1(1) = \omega_1 l_1/v$$

$$\phi_1(2) = \omega_1(l_1 + l_1')/v$$

$$\phi_2(1) = \omega_2 l_2/v$$

$$\phi_2(2) = \omega_1(l_2 + l_2')/v$$

in which $\phi_1$ expresses the first delay element, $\phi_2$ expresses the second delay element, and (1) and (2) correspond to the front and rear of reception transducers, respectively. Further, the relations $\omega_1 = 2\pi f_1$ and $\omega_2 = 2\pi f_2$ should hold.

When the temperature changes so that v changes by $\Delta v$ from a value $v_0$ in room temperature on the basis of the temperature characteristic of the piezoelectric substrate, that is, in the case of $v = v_0 + \Delta v$, the phase delays in outputs with reference to the room temperature are as follows:

$$\phi_1(1) = \omega_1 l_1/v_0 \times (1 - \Delta v/v_0)$$

$$\phi_1(2) = \omega_1(l_1 + l_1')/v_0 \times (1 - \Delta v/v_0)$$

$$\phi_2(1) = \omega_2 l_2/v_0 \times (1 - \Delta v/v_0)$$

$$\phi_2(2) = \omega_1(l_2 + l_2')/v_0 \times (1 - \Delta v/v_0)$$

From the aforementioned equations, when, for example, a DS (direct sequence) spread-spectrum signal with a frequency $f_1$ is supplied to the excitation transducer of the first delay element shown in FIG. 2, the phase delays in outputs of the reception transducers 16-1 and 16-2 change, in accordance with the temperature, by $-\omega_1 l_1 \Delta v/v_0^2$ and $-\omega_1(l_1 + l_1')\Delta v/v_0^2$ with respect to values $\phi_1 l_1/v_0$ and $\omega_1(l_1 + l_1')/v_0$ defined at room temperature, respectively. Because $\Delta v$ changes continuously with respect to the temperature, the change of the phase difference $-\omega_1 l_1' \Delta v/v_0^2$ between the outputs of the transducers 16-1 and 16-2 in accordance with the temperature also changes continuously. Accordingly, it is impossible to set the change to be zero or an integer multiple of $2\pi$ all over the whole temperature range. From the above description, when signals such as DS modulation signals having spectra spreaded with DS on the basis of the phase changes are used, the phase changes of the delay elements depending on the temperature become definitive bad factors.

We have found a novel apparatus configuration for compensating the phase changes depending on the temperature. As shown in FIG. 2, a first main delay element and a second subsidiary delay element are prepared. When a CW (continuous wave) signal with a frequency $f_2$ is supplied to an excitation transducer 18 of the second delay element, the phase delays in outputs of reception transducers 19-1 and 19-2 are $\omega_2 l_2/v_0^2$ and $\omega_1(l_2 + l_2')/v_0^2$ at room temperature and change by $-\omega_2 l_2 \Delta v/v_0^2$ and $-\omega_2(l_2 + l_2')\Delta v/v_0^2$ in accordance with the temperature in the same manner as in the first delay element.

Assume, next, the case where outputs of the first and second delay elements, that is, outputs of the transducers 16-1 and 19-1 are mixed by a mixer (not shown in FIG. 2) comprising external transistors, FETs, diodes, etc. to take out the output of a differential frequency $f_3 = |f_1 - f_2|$. The outputs of the transducers 16-1 and 19-2 are given as $A_1 \exp\{j\omega_1 t + jC_1(1) - j\phi_1(1)\}$ and $A_2 \exp\{j\omega_2 t + jC_2 - j\phi_2(1)\}$, respectively. In the expression, $C_1(1)$ and $C_2$ are quantities expressing generically phases peculiar to input signals with frequencies $f_1$ and $f_2$ respectively. $C_1(1)$ contains phase modulation information for spread spectrum and $C_2$ is a constant value because the signal with a frequency $f_2$ is a CW signal.

The differential frequency output $f_3=|f_1-f_2|$ of the mixer is given as $[A_3\exp\{j(\omega_1-\omega_2)t+j\{C_1(1)-C_2\}-j\{\phi_1(1)-\phi_2(1)\}]$. The member $\phi_1(1)-\phi_2(1)$ depending on the temperature is given as follows.

$$\phi_1(1)-\phi_2(1)=(\omega_1 l_1-\omega_2 l_2)/v_0-(\omega_1 l_1-\omega_2 l_2)\Delta v/v_0^2$$

If the value put in parentheses in the second member of the right side becomes zero, the output does not depend on the temperature any more. That is, the condition $\omega_1 l_1 \approx \omega_2 l_2$ is equivalent to the condition $\phi_1(1)\approx\phi_2(1)$ because the first member of the right side is also zero at that time. In this case, the output of the mixer becomes $A_3\exp[j(\omega_1-\omega_2)t+j\{C_1(1)-C_2\}]$, so that the frequency $f_1$ is converted into $f_3=|f_1-f_2|$ but the member in which the delay elements depend on the temperature characteristic is eliminated.

The same rule holds also with respect to outputs of the transducers 16-2 and 19-2. The outputs of the transducers 16-2 and 19-2 are given as $A_1\exp\{j\omega_1 t+jC_1(2)-j\phi_1(2)\}$ and $A_2\exp\{j\phi_2 t+jC_2-j\phi_2(2)\}$. The output of the mixer becomes $A_3\exp[j(\omega_1-\omega_2)t+j\{C_1(2)-C_2\}]-j\{\phi_1(2)-\phi_2(2)\}$ in the same manner as described above. The member $\phi_1(2)-\phi_2(2)$ depending on the temperature is given as follows:

$$\phi_1(2)-\phi_2(2)=\{\omega_1(l_1+l_1')-\omega_2(l_2+l_2')\}/v_0-\{\omega_1(l_1+l_1')-\omega_2(l_2+l_2')\}\Delta v/v_0^2$$

If the value put in brackets in the right side becomes zero, that is, in the case of $\omega_1(l_1+l_1')\approx\omega_2(l_2+l_2')$, temperature dependency is eliminated. This condition is equivalent to the condition $\phi_1(2)\approx\phi_2(2)$. The output of the mixer becomes $A_3\exp[j(\omega_1-\omega_2)t+j\{C_1(2)-C_2\}]$ in the same manner as described above, so that there is no member in which the delay elements depend on the temperature characteristic.

From the above result, the second subsidiary delay element introduced as shown in FIG. 2 can compensate the temperature characteristic depending on the delay element when a spread-spectrum signal, or the like, is supplied to the first delay element shown in FIG. 2 so that output signals are taken out from a plurality of reception transducers. The distances $l_2$ and $l_2+l_2'$ between the excitation and reception transducers in the second delay element may be determined as $l_2\approx\omega_1 l_1/\omega_2$, and $l_1+l_2'\approx\omega_1(l_1+l_1')/\omega_2$ respectively so that the relations $\phi_1(1)\approx\phi_2(1)$ and $\phi_1(2)\approx\phi_2(2)$ are satisfied. As described above, the outputs of the respective mixers become $A_3\exp[j(\omega_1-\omega_2)t+j\{C_1(1)-C_2\}]$ and $A_3\exp[j(\omega_1-\omega_2)t+j\{C_1(2)-C_2\}]$, respectively. Accordingly, the frequencies of the two outputs are converted into $f_3=|f_1-f_2|$ and a fixed phase delay of $C_2$ is generated in common to the two outputs. However, phase information is not lost due to passage through the delay elements because phase modulation information $C_1(1)$ and $C_1(2)$ for spread spectra is held as it is.

The basic operating theory concerning a novel measure to introduce a piezoelectric substrate large in electromechanical coupling coefficient $k^2$ in order to radically solve the inefficiency of the conventional SAW signal processing apparatus and to solve a new problem concerning the temperature characteristic of the substrate has been described above.

Figure 3:
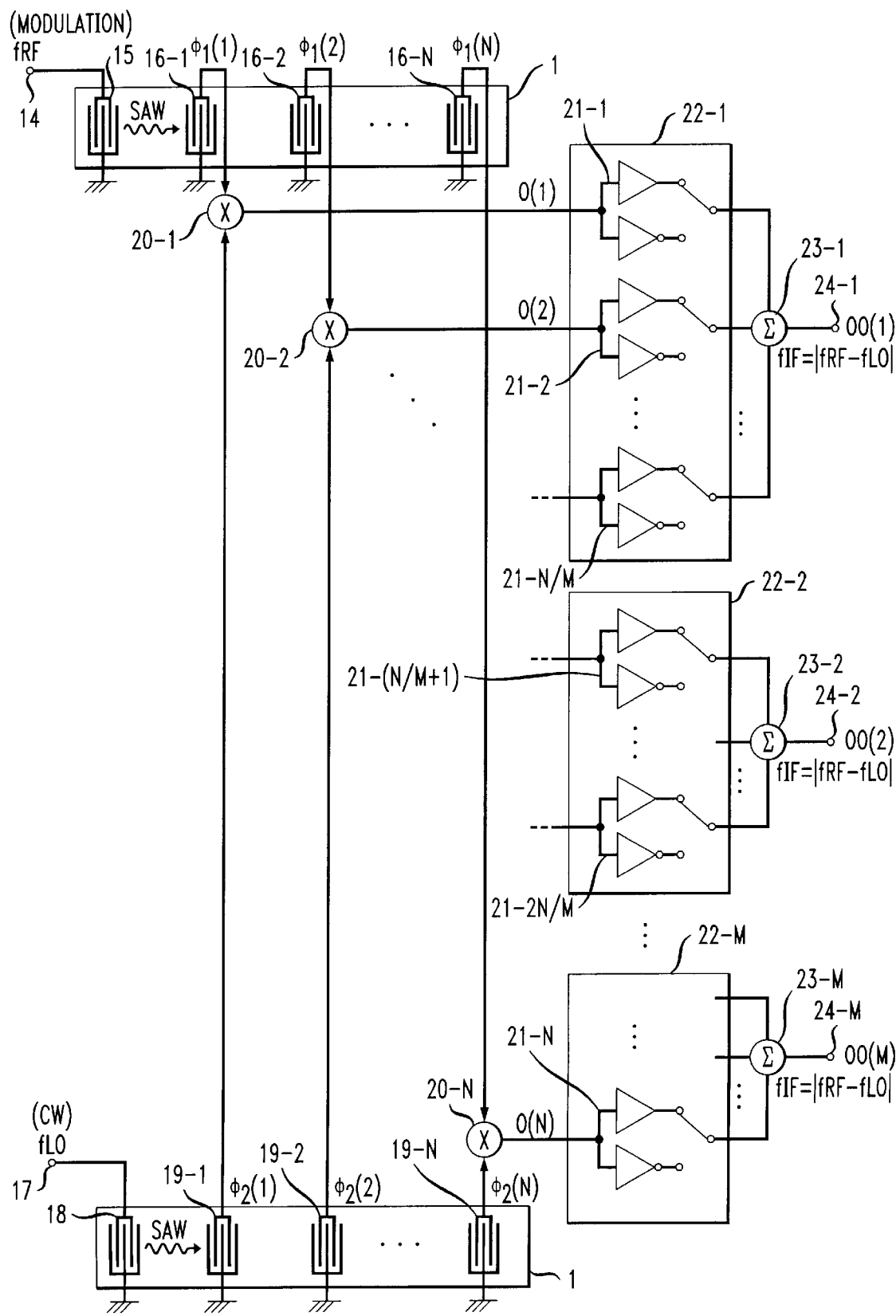
FIG. 3 is a circuit diagram of an SAW signal processing apparatus for spread-spectrum communication as an embodiment of the present invention.

FIG. 3 shows another embodiment of the present invention having features as stated in Claims 4 and 5. FIG. 3 shows the case where K is 1 and M is an integer satisfying $M\geq 1$ as stated in Claim 5. In FIG. 3, the upper SAW delay element is the first delay element in which an SAW excitation transducer 15 and N reception transducers 16-1, ..., 16-N are formed on a piezoelectric substrate 1 so that phase delays in outputs of the respective transducers are $\phi_1(1), ..., \phi_1(N)$, respectively. The lower SAW delay element is the second delay element in which an SAW excitation transducer 18 and N reception transducers 19-1, ..., 19-N are formed on the piezoelectric substrate 1 so that phase delays in outputs of the respective transducers are $\phi_2(1), ..., \phi_2(N)$, respectively, as described above.

Figure 4:
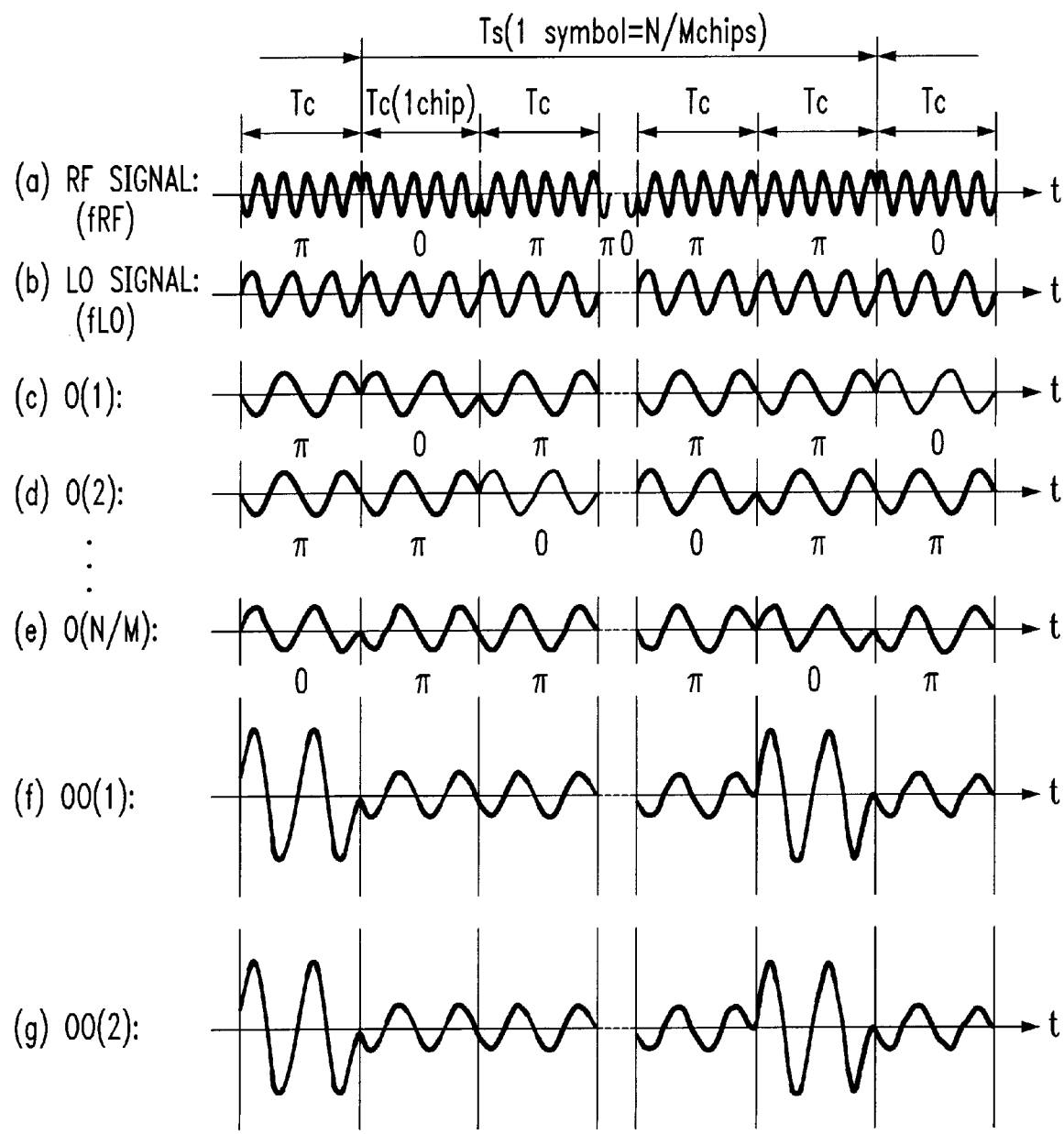
FIG. 4 is a waveform diagram for explaining the function of the embodiment of the present invention depicted in FIG. 3.

As shown in the signal chart (a) of FIG. 4, a DS spread-spectrum signal having a frequency $f_1=f_{RF}$ and having a spectrum spread by binary phase shift keying (BPSK) of +1 (that is, phase 0) or −1 (that is, phase $\pi$) is inputted to an input terminal 14 of the first delay element. That is, it may be considered that a reception signal of a radio apparatus or a signal obtained by conversion of a reception signal into an intermediate-frequency band signal is inputted to the input terminal 14. As shown in the signal chart (b) of FIG. 4, a non-modulation continuous wave (CW) signal having a frequency $f_2=f_{LO}$ is inputted to an input terminal 17 of the second delay element. That is, it may be considered that a local oscillation signal of a radio apparatus is inputted to the input terminal 17. As shown in FIG. 3, the output signals of the delay elements are mixed by mixers 20-1, ..., 20-N, so that output signals O(1), ..., O(N) having a differential frequency $f_3=f_{IF}$ ($=|f_{RF}-f_{LO}|$) are obtained. Here, the corresponding delay elements satisfy $\phi_1(1)\approx\phi_2(1), ..., \phi_1(N)\approx\phi_2(N)$ as described above with reference to FIG. 2. Accordingly, phase changes between the outputs from the output terminals with respect to the temperature are compensated as described above.

As shown in FIG. 4, one symbol (corresponding to one bit in BPSK) of the spread-spectrum signal has a length Ts and is composed of N/M chips by using a positive integer M which will be described later in detail. One chip has a length Tc. As is known well, the chips correspond to a diffusion code row composed of +1 and −1, and the phases thereof change to 0 and $\pi$ by chip. Here, the respective chips in the signal chart (a) of FIG. 4 need to correspond to the output terminals of the first delay element shown in FIG. 3, so that the difference between phase delays in outputs from adjacent terminals must be substantially equal to the phase change in one chip in the case of K=1. That is, the following needs to be satisfied.

$$|\phi_1(1)-\phi_1(2)|\approx, ..., \approx|\phi_1(N-1)-\phi_1(N)|\approx|\phi_2(1)-\phi_2(2)|\approx, ..., \approx|\phi_2(N-1)-\phi_2(N)|\approx Tc\times 2\pi f_{RF}(=\omega_{RF}Tc)$$

Further, the N output terminals of the delay element correspond to each other for one symbol and are classified into M groups: from first order to N/M-th order; from N/M+1-th order to 2N/M-th order; ...; from (M−1)N/M+1-th order to N-th order. Accordingly, the difference between phase delays in the first and N-th outputs is given as follows:

$$|\phi_1(1)-\phi_1(N)|\approx Tc\times 2\pi f_{RF}\times(N/M)\times M=Ts\times 2\pi f_{RF}\times M$$

In FIG. 3, the outputs O(1), ..., O(N) of the mixers 20-1, ..., 20-N are given as shown in the signal charts (c), (d) and (e) of FIG. 4 (which shows waveforms in one symbol in a range of from O(1), ..., O(N/M)). In the waveform of O(1), the frequency $f_{RF}$, is converted into $f_{IF}$, but it is considered that the phase relation is the same as that of the input signal having a frequency $f_{RF}$ shown in the signal chart (a) of FIG. 4. Practically, a delay equivalent to the delay between the excitation transducer 15 and the reception transducer 16-1 is generated, but this delay will be neglected for simplification of the following description. The waveform of O(2) is the same as the waveform of O(1) delayed by one chip. Similarly, the waveforms of O(3), O(4), ... become waveforms delayed by two chips, three chips, ... successively, and the waveform of O(N/M) becomes a waveform of O(1) delayed by N/M−1 chips. Though not shown, the waveform of O(N/M+1) becomes a waveform of O(1) delayed by N/M chips. Accordingly, because the delay corresponds to a delay for one symbol, it may be considered that O(N/M+1) is outputted as a waveform corresponding to O(1) before one symbol. Similarly, O(N/M+2), ..., O(2N/M) are outputted as waveforms corresponding to O(2), ..., O(N/M) respectively before one symbol. Similarly, O((M−1)N/M+1), ..., O(N) are outputted as waveforms corresponding to O(1), ..., O(N/M) respectively before M−1 symbols. It is now important that the phase relations of O(2), ..., O(N/M) with the phase of O(1) in the conventional SAW delay element are not given by a delay of corresponding chips simply, so that the phase further changes because of the temperature characteristic of the piezoelectric substrate. The quantity of this change is determined on the basis of the TCD (temperature coefficient of delay) in the acoustic velocity of propagating SAW. Assume now as an example the case where one symbol has about 120 wavelengths. Assume 128° YX-LiNbO$_3$ which is very general as a substrate having a large piezoelectric effect, then TCD is about 80 ppm/° C. Assume a temperature range of from room temperature to ±50° C. as a temperature range in which a radio apparatus is used generally, then, a phase change of about ±π is generated between outputs corresponding to O(1) and O(N/M) when a 120 wavelength delay element is used in the aforementioned temperature range. This means that the phase information of the spread-spectrum signal is lost thoroughly when the spread-spectrum signal passes through the delay element in a temperature range except a specific temperature, for example, room temperature. The apparatus according to the present invention as shown in FIG. 3 compensates such phase changes depending on the temperature so that correlation in phase between outputs is held perfectly regardless of the temperature even after the signal passes through the delay element.

Circuits after the mixers will be described below with reference to FIG. 3. The outputs O(1), ..., O(N) of the mixers are inputted to switching circuits 21-1, ..., 21-N, respectively. Either in-phase, that is, +1 weighted (AND in FIG. 3) output or anti-phase, that is, −1 weighted (NAND in FIG. 3) output is selected by switches. Here, the switching circuits are classified into M groups: from the first to the N/M-th; from the N/M+1-th to the 2N/M-th; ...; from the (M−1)N/M+1-th to the N-th. The groups are expressed by the reference characters 22-1, ..., 22-M respectively as shown in FIG. 3.

In the aforementioned BPSK modulation system, the phase of the spread-spectrum signal generally changes by 0 or π by the basic unit of one chip in one symbol in accordance with the spread code row of +1 and +1 to thereby spread the spectrum. The basis of demodulation may be considered as follows. That is, 0-phase chips are weighted with +1 (the switching circuit in FIG. 3 operates in +1 position) and π-phase chips are weighted with −1 (the switching circuit in FIG. 3 operates in −1 position). Further, when the sum of all chips (which corresponds to an adder 23-1 in FIG. 3) over one symbol is calculated, a very large output waveform (which corresponds to OO(1) in FIG. 3) is obtained in the case where the all chips are superposed in the same phase relation. The condition that the all chips become in-phase to generate a peak is only at points of time within one symbol as described above. At other points of time, the phase relation becomes substantially random because of the characteristic of the spread code row, so that no output waveform but a very small output waveform can be obtained even in the case where the sum of the all chips is calculated.

Next, with the above way of thinking as a basis, a method for selecting in-phase (weighting with +1) and anti-phase (weighting with −1) in each of switching circuits in each group will be described below specifically. For example, assume now the switching circuit group 22-1. The phase relations of O(1), O(2) and O(N/M) in the signal charts (c), (d) and (e) of FIG. 4 are given as relations in which a signal is delayed successively chip by chip with reference to O(1). Accordingly, for example, in order to weight a spread code row of +1 and −1 constituting one symbol, correspondingly to O(1), O(2), ..., O(N/M), it is necessary to make the first order of the code row correspond to O(N/M), the second order correspond to O(N/M−1), ..., the N/M-th order correspond to O(1), in contrast to the order of spread code row as illustrated in the signal charts (c), (d) and (e) of FIG. 4. That is, the switching circuit 21-1 in the switching circuit group 22-1 selects +1 if the N/M-th code of the spread code row is +1 and selects −1 if the N/M-th code of the spread code row is −1. Similarly, the switching circuit 21-2 performs selection on the basis of the N/M−1-th code of the spread code row. The similar combination selection as described above is performed upon N/M switching circuits in total. Further, the respective outputs of the switching circuits are added up by an adder 23-1 so that the sum is taken out as an output OO(1).

The specific explanation of the above description and a simple measure will be described below with reference to the waveforms shown in FIG. 4. It is apparent from the signal chart (a) of FIG. 4 that the spread code row is 0 ππ ... 0 ππ, that is, +1−1−1 ... +1−1−1. As described above, the phase relation of O(1) is assumed to be the same as the input signal having a frequency $f_{RF}$. Here, pay attention to respective outputs corresponding to the leftmost chips in the signal charts (c), (d) and (e) of FIG. 4, that is, respective outputs corresponding to the earliest chips in the time axis of FIG. 4. These phases are π, π and 0 in the order of O(1), O(2) and O(N/M). The phase relation is equal to the reverse order of the spread code row. Accordingly, as described above, O(1), O(2), ..., O(N/M) are weighted correspondingly to a code row obtained by the reverse order of the spread code row and the weighted O(1), O(2), ..., O(N/M) are added up. Because the all outputs are added up in the same phase relation, the output becomes large. The output waveform of the sum is shown in the signal chart (f) of FIG. 4. Here, in practice, the number of the outputs O(1), O(2), ..., O(N/M) is very large, that is, from about 10 to about one hundred and several tens, so that the amplitude of the summation output becomes very large.

Next, pay attention to respective outputs corresponding to the second chip from the left side in the signal charts (c), (d) and (e) of FIG. 4, that is, respective outputs delayed for one chip from the above description in the time axis of FIG. 4. In this case, there is no correlation between weighting corresponding to the aforementioned code row obtained by the reverse order of the spread code row and the phase of each output. Accordingly, the phase relation of the sum of all weighted outputs is random, so that the output of the sum becomes relatively small as shown in the signal chart (f) of FIG. 4. The same rule applies to respective outputs delayed for 2, 3, ..., N/M−1 chips. As shown in the signal chart (f) of FIG. 4, the result of the addition of the all outputs becomes very small. Because the output delayed for N/M chips returns to the aforementioned initial phase relation again, the addition of the all weighted outputs results in large amplitude again as shown in the signal chart (f) of FIG. 4.

As is obvious from the above description, the large peak output in OO(1) in the signal chart (f) of FIG. 4 is obtained every symbol, which means that an autocorrelation value of the spread-spectrum signal over one symbol is obtained as an output waveform. Although the signal chart (f) of FIG. 4 shows the case where two large output waveforms are expressed in in-phase, phase modulation data for transmitting 1-bit data as one symbol are expressed in the correlation in phase between the two output waveforms. That is, it may be considered, as an example, that data over 2 bits are +1+1 or −1−1 if the two large output waveforms are in-phase and data over 2 bits are +1−1 or −1+1 if the two large output waveforms are in reverse phase to each other. Accordingly, as stated in Claim 6, demodulation of a spread-spectrum signal by a BPSK modulation system can be performed when the amplitude and phase of the output OO(1) are monitored for every symbol by the apparatus shown in FIG. 3, so that a circuit technique of general synchronous detection can be directly applied as it is. In this case, a carrier recovery circuit and, if necessary, a clock recovery circuit for determining a judging point of output are prepared separately in the outside. It is sufficient to form these circuits in a circuit configuration generally used in a radio apparatus.

As a demodulation system other than those described above, there is a delay detection system. Delay detection is a method of comparing a one-symbol-previous output with a current symbol output to thereby demodulate data. The one-symbol-previous output is given by OO(2) in FIG. 3. A switching circuit group 22-2 having switching circuits 21-(N/M+1), . . . , 21-2N/M apply weighting in combination of +1 and −1 to corresponding outputs O(N/M+1), . . . , O(2N/M) one-symbol previous to outputs O(1), . . . , O(N/M) in the same manner as in the switching circuit group 22-1. The respective outputs are added up by an adder 23-2, so that the sum is outputted as OO(2) from a terminal 24-2. The signal chart (g) of FIG. 4 shows an example of output OO(2).

When OO(1) in the signal chart (f) of FIG. 4 and OO(2) in the signal chart (g) of FIG. 4 are compared to perform delay detection, data can be demodulated as stated in Claim 7. That is, when an arithmetic operation is executed as stated in Claim 8, data can be demodulated easily. When OO(3), . . . , OO(M) in previous symbols are also used for utilizing the correlation in phase and amplitude of all outputs, demodulation further enduring noise, or the like, can be performed. When M is, however, generally set to be 2 and the phase and amplitude of outputs in a current symbol and a previous symbol are used, considerably accurate demodulation can be performed.

Figures 5, 5A:
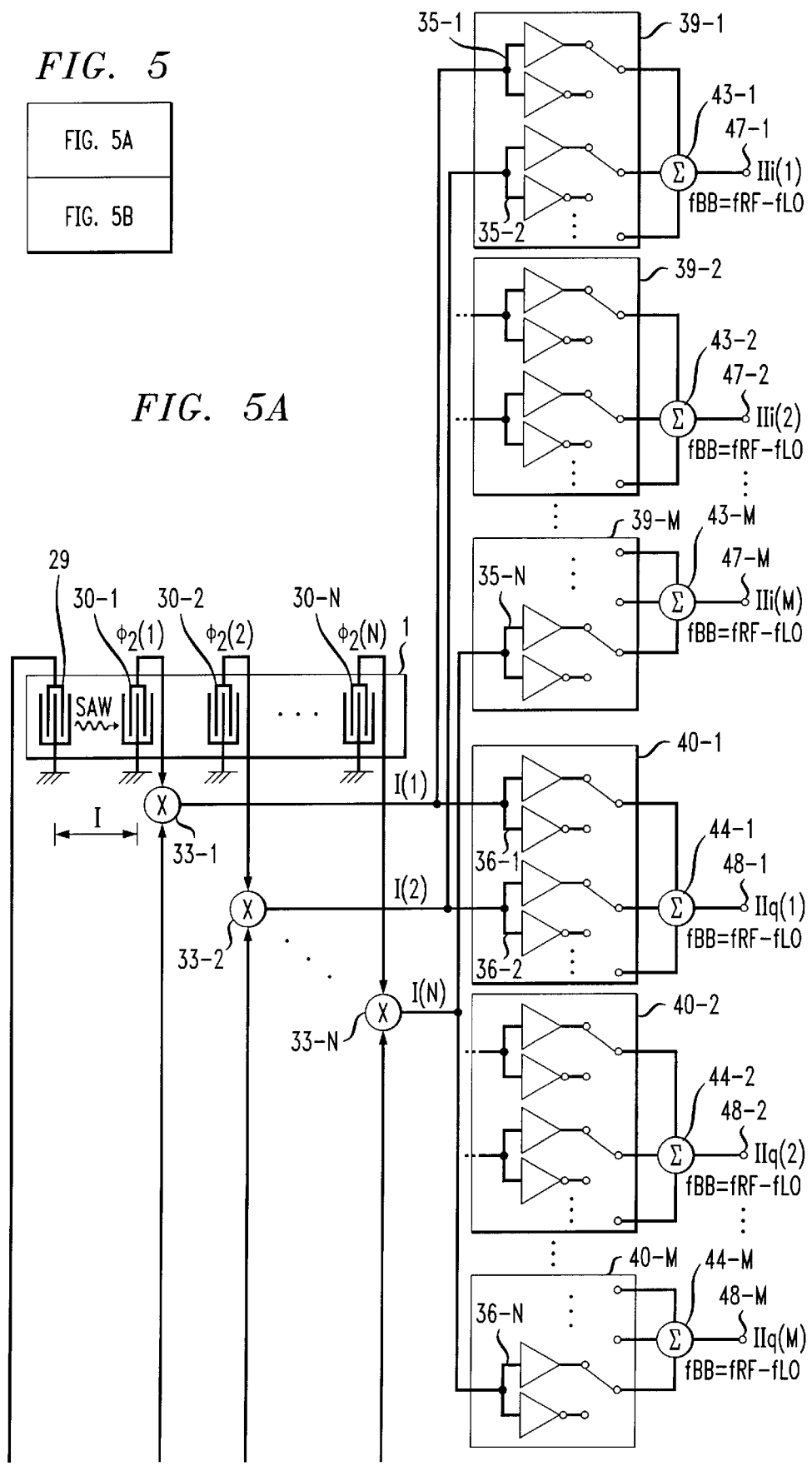
FIG. 5 is a circuit diagram of the SAW signal processing apparatus for spread-spectrum communication as an embodiment of the present invention.
Figure 5B:
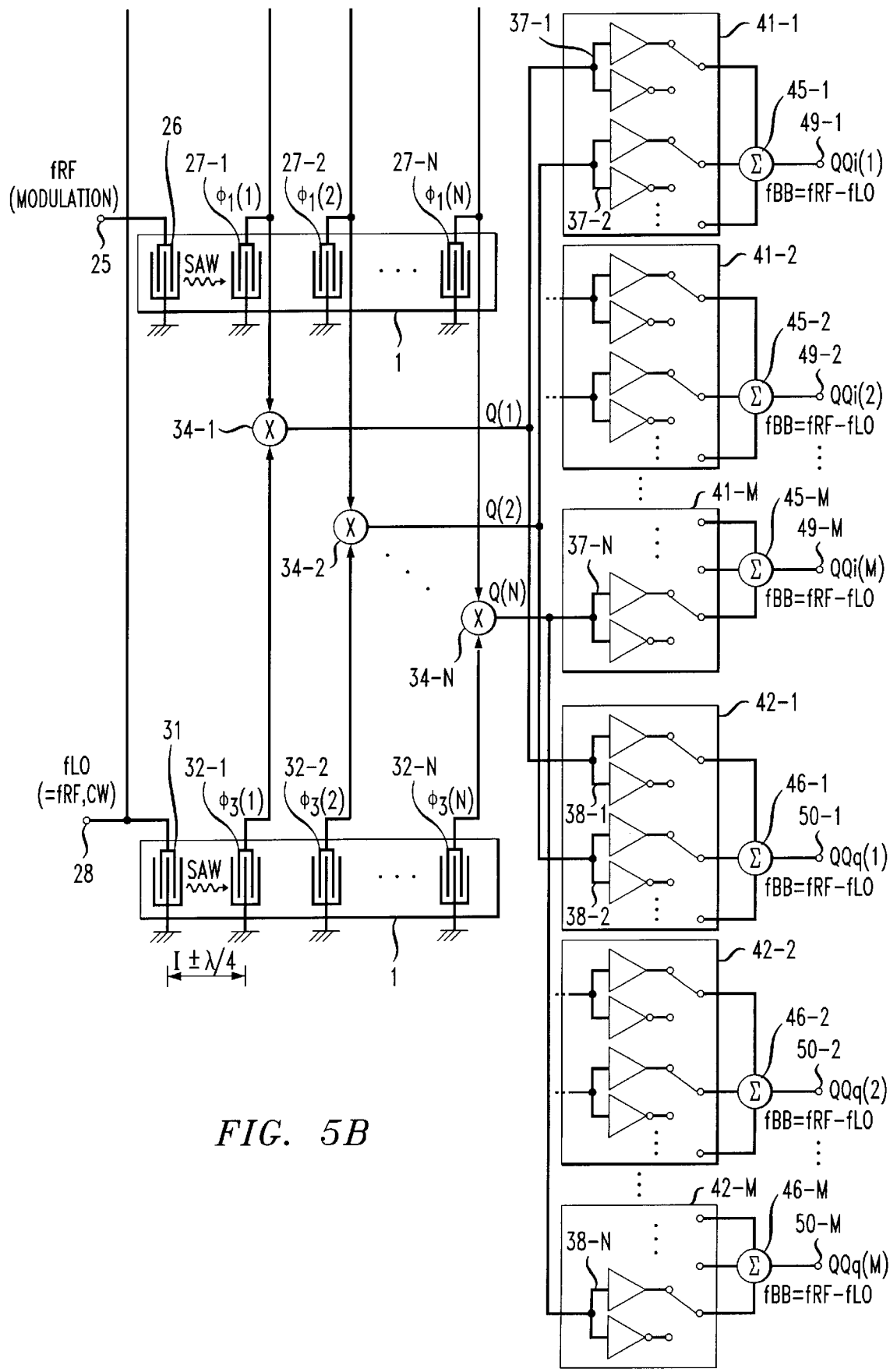

FIG. 5 shows another embodiment of the present invention as stated in Claims 13 and 20. FIG. 5 shows the case of K=1 as stated in Claim 13 or the case where M is an integer satisfying M≧1 as stated in Claim 20. This apparatus comprises a first SAW delay element located in the center portion of FIG. 5, a second SAW delay element located in the upper portion of FIG. 5, and a third SAW delay element located in the lower portion of FIG. 5. The phase delays in outputs of the delay elements are expressed by $\phi_1(1), \ldots, \phi_1(N), \phi_2(1), \ldots, \phi_2(N)$ and $\phi_3(1), \ldots, \phi_3(N)$, respectively. A spread-spectrum signal having a frequency $f_{RF}$ is inputted to the first delay element. A CW signal which is a non-modulation signal having a frequency $f_{LO}$ equal to the frequency $f_{RF}$ is inputted to the second and third delay elements. Similarly to the case shown in FIG. 3, the phase delays in outputs at corresponding terminals of the first and second delay elements are substantially equal to each other. That is, the following relations are satisfied.

$$\phi_1(1) \approx \phi_2(1), \phi_1(2) \approx \phi_2(2), \ldots, \phi_1(N) \approx \phi_2(N)$$

Further, the phase delays in outputs at corresponding terminals of the second and third delay elements have a difference of about 90° from each other. That is, the following relations are satisfied. Here, the phase difference of 90° may be formed by the change of a propagation path of surface acoustic wave as stated in Claim 14 or by an external circuit as stated in Claim 15.

$$\phi_2(1) \approx \phi_3(1) \pm 90°, \phi_2(2) \approx \phi_3(2) \pm 90°, \ldots, \phi_2(N) \approx \phi_3(N) \pm 90°$$

Similarly to the case of FIG. 3, the difference between the phase delays in outputs at corresponding adjacent terminals in N output terminals of each delay element satisfies the following relations in the case of K=1.

$$|\phi_1(1) - \phi_1(2)| \approx \ldots, \approx |\phi_1(N-1) - \phi_1(N)| \approx |\phi_2$$

$$(1) - \phi_2(2)| \approx, \ldots, \approx |\phi_2(N-1) - \phi_2(N)| \approx |\phi_3$$

$$(1) - \phi_3(2)| \approx, \ldots, \approx |\phi_3(N-1) - \phi_3(N)| \approx Tc \times 2\, \pi f_{RF}(\omega_{RF} Tc)$$

Similarly, the difference between phase delays in the first and N-th outputs of each delay element is given as follows:

$$|\phi_1(1) - \phi_1(N)| \approx |\phi_2(1) - \phi_2(N)| \approx |\phi_3(1) - \phi_3(N)| \approx Tc \times 2\, \pi f_{RF} \times (N/M) \times M = Ts \times 2\, \pi f_{RF} \times M$$

Differently from the case of FIG. 3, corresponding outputs of the first and second delay elements are inputted to mixers 33-1, . . . , 33-N, respectively, as shown in FIG. 5 and the outputs of the mixers are made I(1), . . . , I(N), respectively. Corresponding outputs of the first and third delay elements are inputted to mixers 34-1, . . . , 34-N and the outputs of the mixers are made Q(1), . . . , Q(N), respectively. The outputs I(1), . . . , I(N) and the outputs Q(1), . . . , Q(N) are classified into groups in the same manner as the case in FIG. 3. That is, the outputs are classified into M groups, namely, from 1 to N/M, from N/M+1 to 2N/M, . . . , from (M−1)N/M+1 to N. As will be described later in detail, each group corresponds to one symbol of the spread-spectrum signal.

Figure 6:
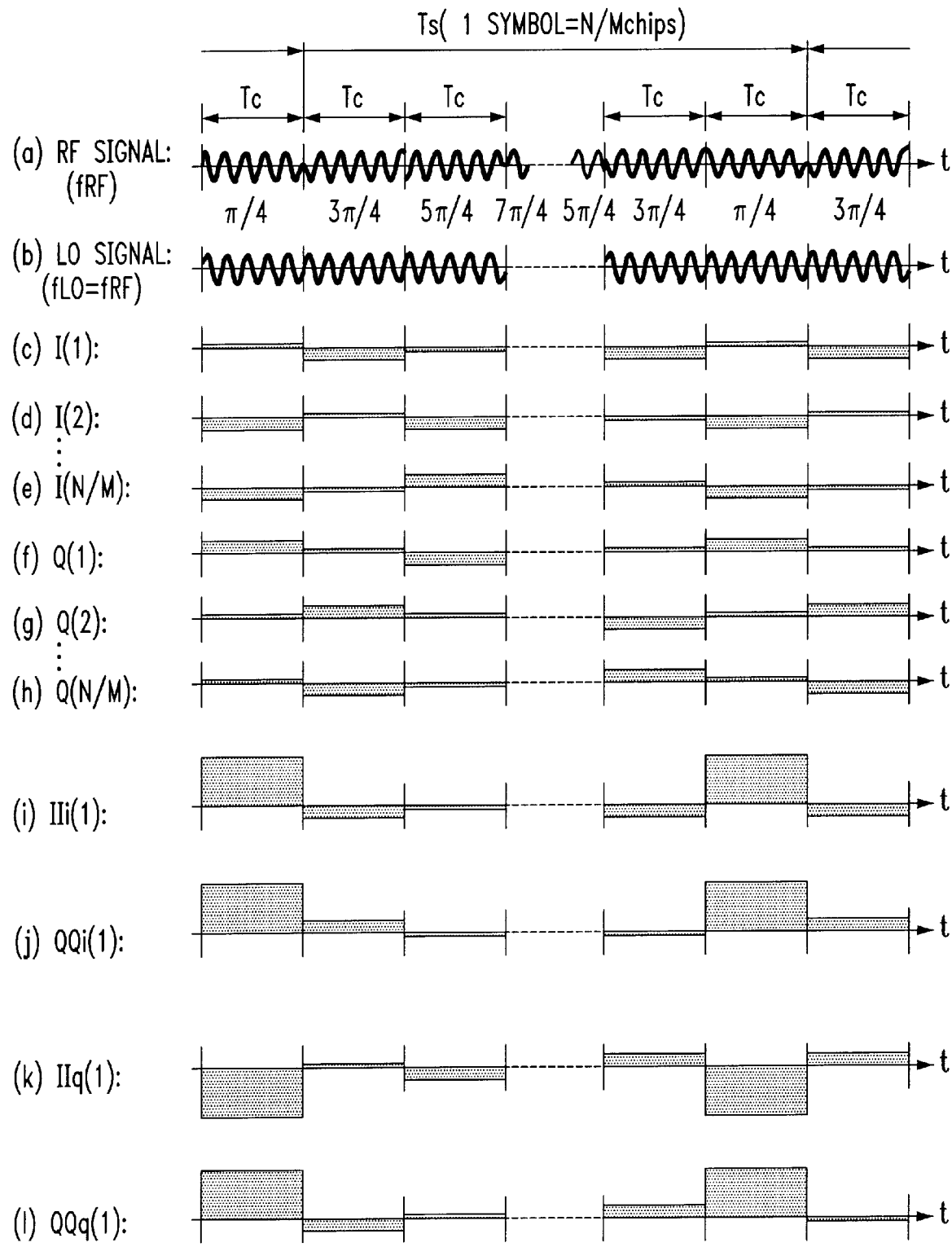
FIG. 6 is a waveform diagram for explaining the function of the embodiment of the present invention using QPSK modulation depicted in FIG. 5.
Figure 7A:
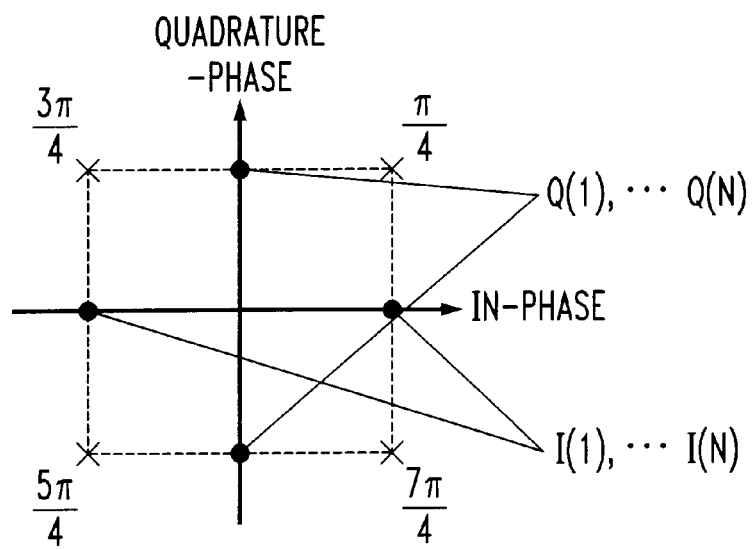
FIGS. 7A and 7B are graphs showing the phase and amplitude (constellation) of a QPSK-modulated signal.

FIG. 6 shows output waveforms of respective parts in FIG. 5, similarly to FIG. 4. Differently from the description of FIG. 4, the input spread-spectrum signal is a DS signal spectrally spreaded with quadri-phase shift keying (QPSK). As shown in the signal chart (a) of FIG. 6, the QPSK is a system using four phases of π/4, 3 π/4, 5 π/4 and 7 π/4 to perform modulation. Accordingly, one of the aforementioned four phases is allocated to one chip in the case of FIG. 6 whereas either 0 or π in two phases is allocated to one chip in the case of FIG. 4. The relation between the phase and amplitude of QPSK modulation wave can be expressed in constellation as shown in FIG. 7A. Coordinate points corresponding to 4 phases can be considered to be classified into a group of in-phase (0°-phase) components and a group of quadrature-phase (90°-phase) components. Generally, the group of in-phase components in a QPSK modulation signal is called i-channel and the group of quadrature-phase components is called q-channel.

A spread-spectrum signal using QPSK is generated by allocation of independent spread code rows to these i- and q-channels. For example, in the case of the signal chart (a) of FIG. 6, it is to be understood that the i-channel spread code row is given as −1−1+1 . . . −1−1+1 and the q-channel spread code row is given as +1−1−1 . . . −1+1+1 with respect to one symbol when in-phase components and quadrature-phase components are obtained on the basis of the phases of chips. Further, in QPSK, differently from BPSK, data of 2 bits per symbol can be transmitted. This is because data of 1 bit per symbol in each of i- and q-channels can be individually modulated in the same manner as in spectral spread.

Referring to FIG. 5, the mixer outputs I(1), . . . , I(N) and Q(1), . . . , Q(N) will be explained below. If the second delay element is regarded below as a reference, it can be assumed that each of outputs of the second delay element has a frequency $F_{LO}$ equal to $f_{RF}$ and is a non-modulation cosine wave signal. Each of outputs of the third delay element is also a non-modulation cosine wave signal having the phase shifted by 90° from a corresponding output of the second delay element, that is, a sine wave signal. Accordingly, output waveforms corresponding to the i-channel spread code row are obtained as the mixer outputs I(1), . . . , I(N) whereas output waveforms corresponding to the q-channel spread code row are obtained as the mixer outputs Q(1), . . . , Q(N). The example shown in FIG. 5 is different from the case of FIG. 4 in that modulation signals (frequency $f_{BB} \approx f_{RF} - f_{LO}$) of a base band is directly obtained as the outputs because of $f_{LO} \approx f_{RF}$. In connection with the constellation in FIG. 7A, this means that projection components obtained when coordinate points corresponding to four phases are projected to the in-phase axis are obtained as outputs I(1), . . . , I(N) and projection components obtained when the coordinate points are projected to the quadrature-phase axis are obtained as outputs Q(1), . . . , Q(N).

Figure 7B:
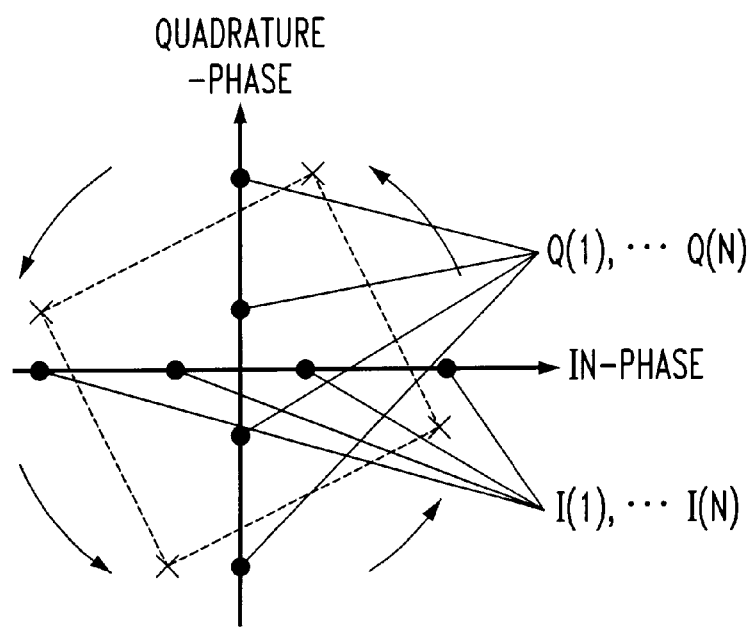

The aforementioned discussion relates to the case where a reference signal (a local oscillation signal corresponding to the aforementioned cosine wave and sine wave) having a frequency equal to that of the reception signal and having a phase relation in which the phase of the reference signal is located in the center of the coordinate points corresponding to the four phases in FIG. 7A, is generated by means of a carrier recovery circuit provided separately in the inside of a radio apparatus. For simplification of a system, the reference signal may be generated without the carrier recovery circuit. In this case, the phase relation of the reference signal (local oscillation signal) with the reception signal is different from the aforementioned relation and the phases of the reception signal are not always located in the coordinate points of $\pi/4$, $3\pi/4$, $5\pi/4$ and $7\pi/4$ with respect to the reference signal. This means that the four coordinate points of the reception signal rotate synchronously in a direction with the passage of time with respect to the reference signal having a frequency $f_{LO}$ as shown in FIG. 7B. Accordingly, in this case, it is apparent from FIG. 7B that components I(1), . . . , I(N) projected to the in-phase axis and components Q(1), . . . , Q(N) projected to the quadrature-phase axis do not always have output waveforms corresponding to the i-channel spread code row and q-channel spread code row of the spread-spectrum reception QPSK modulation signal, respectively. The signal charts (c), (d), (e), (f), (g) and (h) of FIG. 6 show I(1), . . . , I(N/M) and Q(1), . . . , Q(N/M) on the assumption of the case of FIG. 7B. Although outputs corresponding to the modulation signal of a base band are obtained, it is apparent from FIG. 7B that not only the + and − signs of the outputs but also the levels of the outputs change because the phases of the outputs rotate positively by an angle of about the order of tens of degrees in this case. Here, discussion is made in the same manner as in the case of FIG. 4 while the phase change corresponding to the delay between the excitation transducer 26 and reception transducer 27-1 of the first delay element is neglected. Accordingly, I(1) and Q(1) in the signal charts (c) and (f) of FIG. 6 correspond directly to the phase of the input signal in the signal chart (a) of FIG. 6, and I(2) and Q(2) in the signal charts (d) and (g) of FIG. 6 are delayed for one chip from I(1) and Q(1), respectively. Similarly, I(N/M) and Q(N/M) in the signal charts (e) and (h) of FIG. 6 are delayed for N/M−1 chips from I(1) and Q(1), respectively.

In FIG. 5, switching circuit groups 39-1, . . . , 39-M, 40-1, . . . , 40-M, 41-1, . . . , 41-M and 42-1, . . . , 42-M classify I(1), . . . , I(N) and Q(1), . . . , Q(N) into M groups by N/M and weighted with +1 and −1 by switching circuits contained in the groups, respectively. Outputs from the respective switching circuit groups are added up by group by adders 43-1, . . . , 43-M, 44-1, . . . , 44-M, 45-1, . . . , 45-M and 46-1, . . . , 46-M, so that IIi(1), . . . , IIi(M), IIq(1), . . . , IIq(M), QQi(1), . . . , QQi(M) and QQq(1), . . . , QQq(M) are outputted (the meanings of the suffixes i and q will be described later). The selection of weighting from +1 and −1 by means of the switching circuits may correspond to the respective switching circuits while reversing the order of the spread code row of the spread-spectrum signal in the same manner as in the case of FIG. 3. It is, however, important that the i- and q-channel modulation signal components of a base band are outputted while being spread to components I(1), . . . , I(N/M) projected to the in-phase axis and components Q(1), . . . , Q(N/M) projected to the quadrature-phase axis. Accordingly, the modulation signals for the respective channels need to be determined by using both I(1), . . . , I(N/M) and Q(1), . . . , Q(N/M). An output obtained when I(1), . . . , I(N/M) weighted with +1 or −1 correspondingly to the i-channel spread code row are further added up by an adder is IIi(1) whereas an output obtained when I(1), . . . , I(N/M) weighted with +1 or −1 correspondingly to the q-channel spread code row are further added up by an adder is IIq(1). Similarly, an output obtained when Q(1), . . . , Q(N/M) weighted correspondingly to the i-channel spread code row are further added up by an adder is QQi(1) whereas an output which is obtained when Q(1), . . . , Q(N/M) weighted correspondingly to the q-channel spread code row are further added up by an adder is QQq(1). The aforementioned outputs are taken out from terminals 47-1, 48-1, 49-1 and 50-1 in FIG. 5. The same operation is applied also to one-symbol-previous outputs I(N/M+1), . . . , I(2N/M) and Q(N/M+1), . . . , Q(2N/M), so that outputs IIi(2), IIq(2), QQi(2) and QQq(2) are obtained and taken out from terminals 47-2, 48-2, 49-2 and 50-2. When the same operation is further repeated successively, outputs up to IIi(M), IIq(M), QQi(M) and QQq(M) are determined. From the above description, the suffixes i and q have the following meanings. That is, i expresses an i-channel modulation signal, IIi and QQi represent a component of the i-channel modulation signal projected to the in-phase axis and a component of the i-channel modulation signal projected to the quadrature-phase axis, respectively, q expresses a q-channel modulation signal, IIq and QQq represent a component of the q-channel modulation signal projected to the in-phase axis and a component of the q-channel modulation signal projected to the quadrature-phase axis, respectively.

The signal charts (i), (j), (k) and (l) of FIG. 6 show an example of IIi(1), QQi(1), IIq(1) and QQq(1). It is apparent from FIG. 6 that an output corresponding to the leftmost chip, that is, the most previous chip in terms of the time axis is large. This is because in-phase components and quadrature-phase components are added up respectively together with the same sign on the basis of weighting with +1 and −1 corresponding to the i- and q-channel spread code rows. This means that the autocorrelation value of the spread-spectrum signal over one symbol is obtained in the same manner as in the case of the signal chart (f) of FIG. 4. The amplitude of the autocorrelation value is given by $\sqrt{\{IIi(1)^2 + QQi(1)^2\}}$ for i-channel and by $\sqrt{\{IIq(1)^2 + QQq(1)^2\}}$ for q-channel. Here, modulation for sending data of 2 bits, that is, 1 bit per symbol in i-channel and 1 bit per symbol in q-channel, is carried out as follows.

That is, the signs of IIi(1) and QQi(1) are changed simultaneously to make it possible to send data of 1 bit, and the signs of IIq(1) and QQq(1) are changed simultaneously to make it possible to send data of 1 bit.

Similarly to the case of the signal chart (f) of FIG. 4, the peak of each autocorrelation value is obtained again at the point of time when the signal is delayed for one symbol but outputs are relatively very small as shown in the signal charts (i), (j), (k) and (l) of FIG. 6 at other points of time because there is no correlation between the sign of each of outputs I(i), . . . , I(N/M), Q(1), . . . , Q(N/M) and the weighting thereof.

In data demodulation as stated in Claim 21, the amplitude and sign (phase) of IIi(1) and QQi(1) are monitored for every symbol to obtain data of 1 bit, and the amplitude and sign (phase) of IIq(1) and QQq(1) are monitored for every symbol to obtain data of 1 bit. In this case, a carrier regenerating circuit having a general circuit configuration of a synchronous detector and, if necessary, a clock regenerating circuit for determining a judging point of output may be prepared separately in the outside.

Delay detection which is another demodulation system as stated in Claim 22 is carried out as follows. In FIG. 5, the amplitude and sign (phase) of corresponding outputs among one-symbol-previous outputs IIi(2), QQi(2), IIq(2) and QQq(2) and current symbol outputs IIi(1), QQi(1), IIq(1) and QQq(1) are compared with each other to thereby make it possible to demodulate i- and q-channel data. More specifically, as stated in Claim 23, arithmetic operations shown in the table of FIG. 8A are carried out to thereby make it possible to demodulate data. Let m and n be modulation data corresponding to i- and q-channels, respectively (each of m and n takes a value of +1 or −1). Combinations of data (present data) in a current symbol and data (former data) in a previous symbol in the case of delay detection are shown in the left of FIG. 8A. In order to obtain demodulation data, the following arithmetic operation is carried out with respect to i-channel.

$${IIi(1)+IIi(2)}^2+{QQi(1)+QQi(2)}^2-{IIi(1)-IIi(2)}^2-{QQi(1)-QQi(2)}^2=4{IIi(1)\cdot IIi(2)+QQi(1)\cdot QQi(2)}$$

The following arithmetic operation is carried out with respect to q-channel.

$${IIq(1)+IIq(2)}^2+{QQq(1)+QQq(2)}^2-{IIq(1)-IIq(2)}^2-{QQq(1)-QQq(2)}^2=4{IIq(1)\cdot IIq(2)+QQq(1)\cdot QQq(2)}$$

Figure 8B:
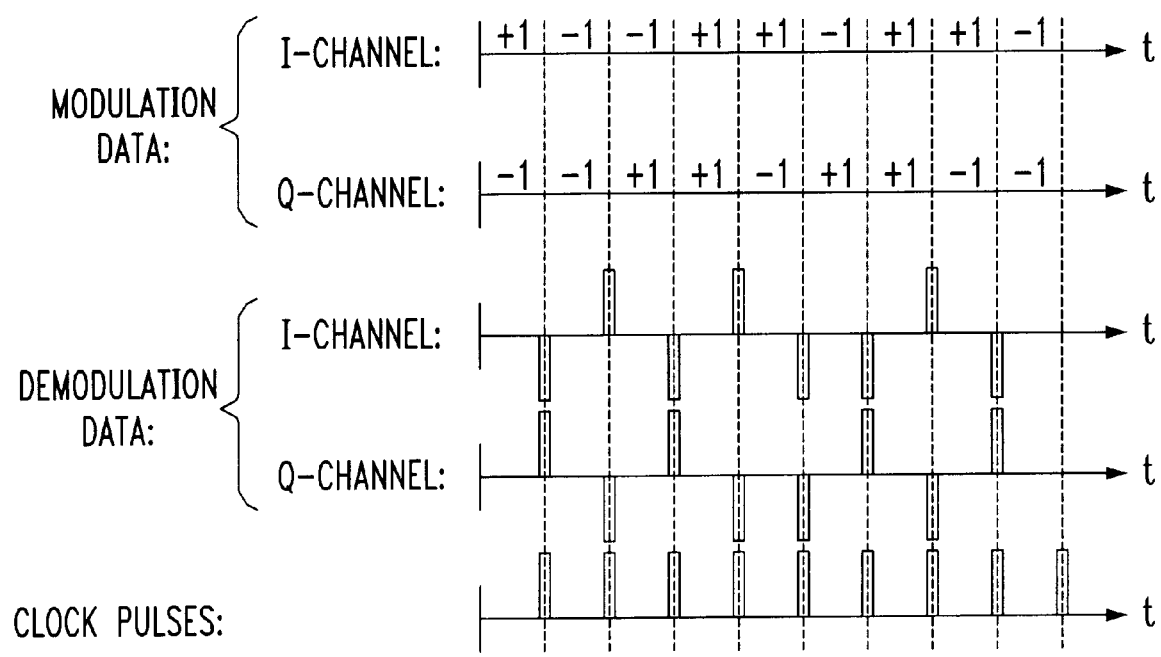

By combinations of present data and former data of m and n, results of the arithmetic operations shown in the lower portion of the center of the table of FIG. 8A are obtained. The aforementioned results are shown in FIG. 8B. That is, i- and q-channel modulation data are given in combination of +1 and −1, as shown in the upper portion of FIG. 88B. In each of i- and q-channels, a demodulation data is given as a "+" output when the signs of 2 bits are +1+1 or −1−1 whereas a demodulation data is given as a "−" output when the signs of 2 bits are +1−1 or −1+1. Accordingly, demodulation data are outputted as a pulse row of "+" and "−" as shown in the center of FIG. 8B, and original data are demodulated without any problem if differential coding is used in the transmitter side.

Demodulation data are outputted in the form of pulses as shown in the center of FIG. 8B. Accordingly, clock pulses for determining the timing of detection of these pulses is required. These clock pulses are obtained by the following arithmetic operation shown in the right of the table of FIG. 8A.

$${IIi(1)+IIi(2)}^2+{QQi(1)+QQi(2)}^2+{IIi(1)-IIi(2)}^2+{QQi(1)-QQi(2)}^2=2{IIi(1)^2+IIi(2)^2+QQi(1)^2+QQi(2)^2}$$

or $${IIq(1)+IIq(2)}^2+{QQq(1)+QQq(2)}^2+{IIq(1)-IIq(2)}^2+{QQq(1)-QQq(2)}^2=2{IIq(1)^2+IIq(2)^2+QQq(1)^2+QQq(2)^2}$$

The result of the aforementioned arithmetic operation is shown in the lower portion of the right of FIG. 8A. Specifically, a periodic clock pulse row as shown in the lower portion of FIG. 8B is obtained.

Figures 9A, 9B:
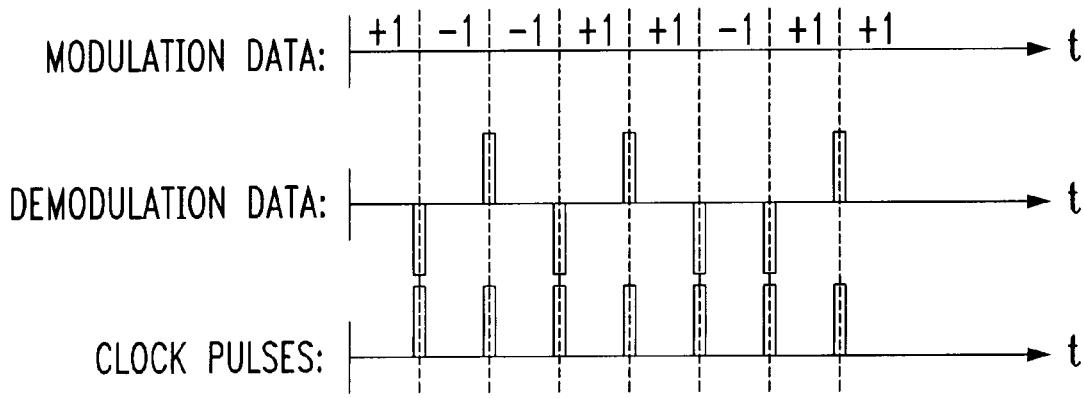
FIGS. 9A and 9B are views showing arithmetic operations for obtaining demodulation data from BPSK-modulation data in the embodiment of the present invention depicted in FIG. 5.

Although the above description has been made about the case where QPSK is used as a modulation system, the same effect is obtained also in the case where BPSK is used. In BPSK, however, either i-channel or q-channel is used. Assuming now only i-channel for simplification, combinations of data expressed in m=+1 or −1 are as shown in the left of FIG. 9A. Because weighting is not required for the q-channel spread code row, the switching circuit groups 40-1, . . . , 40-M, 42-1, . . . , 42-M in FIG. 5 become unnecessary. Demodulation data are obtained by the following arithmetic operation in the same manner as in the case of FIG. 8A.

$${IIi(1)+IIi(2)}^2+{QQi(1)+QQi(2)}^2-{IIi(1)-IIi(2)}^2-{QQi(1)-QQi(2)}^2=4{IIi(1)\cdot IIi(2)+QQi(1)\cdot QQi(2)}$$

The result of the aforementioned arithmetic operation is shown in the lower portion of the center of FIG. 9A depending on the value of m. Further, clock pulses are obtained by the following arithmetic operation.

$${IIi(1)+IIi(2)}^2+{QQi(1)+QQi(2)}^2+{IIi(1)-IIi(2)}^2+{QQi(1)-QQi(2)}^2=2{IIi(1)^2+IIi(2)^2+QQi(1)^2+QQi(2)^2}$$

The result of the aforementioned arithmetic operation is shown in the lower portion of the right of FIG. 9A. The aforementioned results are shown in FIG. 9B in comparison with a modulation data row, and original data are demodulated in the same manner as in the case of FIG. 8B.

Figure 10:
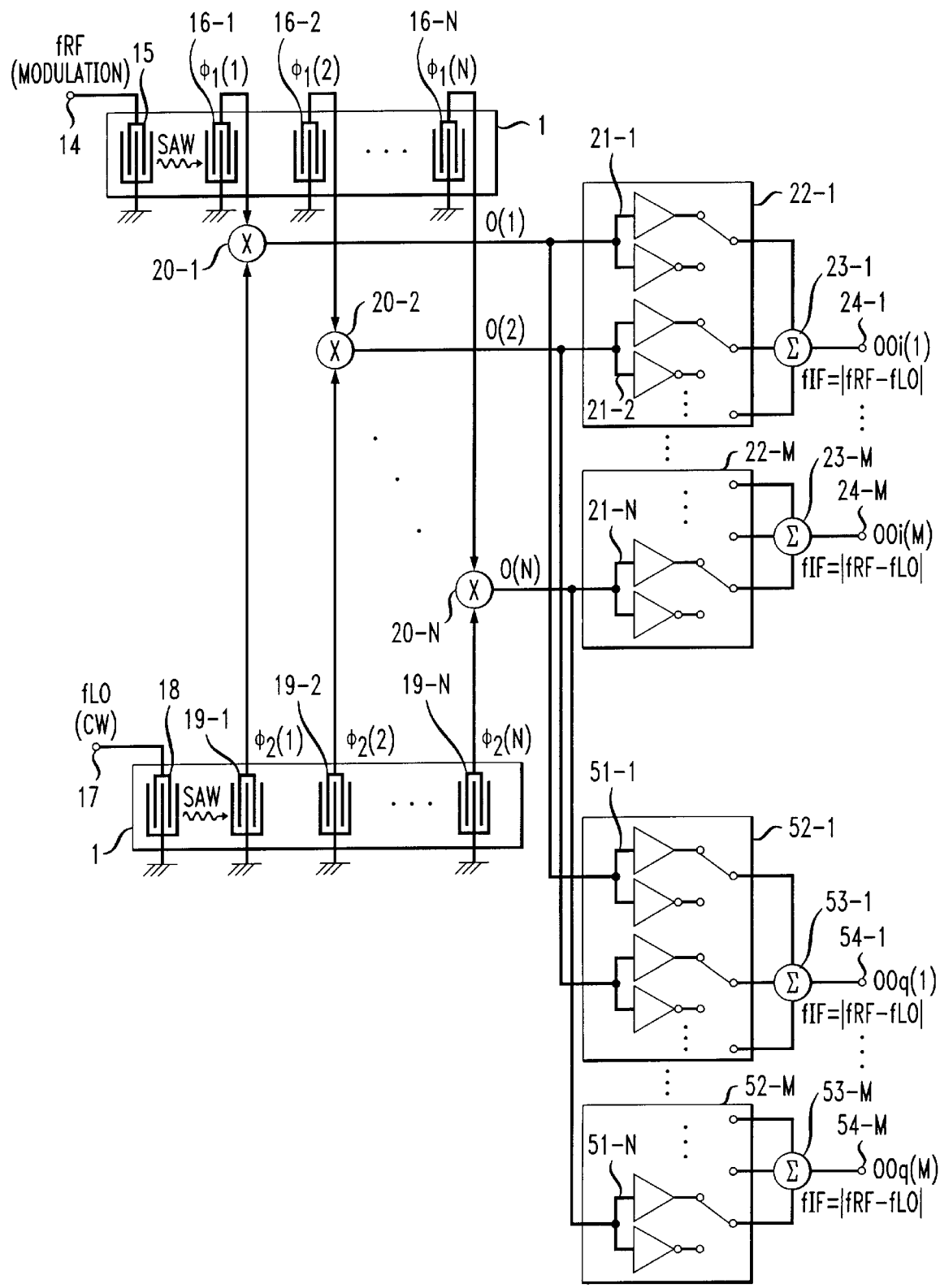
FIG. 10 is circuit diagram of the SAW signal processing apparatus for spread-spectrum communication as an embodiment of the present invention.

FIG. 10 shows a further embodiment of the present invention as stated in Claim 9. FIG. 10 is basically equal to FIG. 3 but FIG. 10 shows a configuration upon the assumption of a QPSK modulation system whereas FIG. 3 shows a configuration upon the assumption of a BPSK modulation system. The outputs O(1), . . . , O(N) of mixers are weighted with +1 or −1 through switching circuits and added up by an adder. Differently from FIG. 3, weighting corresponding to i- and q-channel spread code rows is required in the case of QPSK. Switching circuit groups 22-1, . . . , 22-M are applied to weighting corresponding to the i-channel spread code row whereas switching circuit groups 52-1, . . . , 52-M are applied to weighting corresponding to the q-channel spread code row. These weighted outputs are added up by symbol by adders 23-1, . . . , 23-M and 53-1, . . . , 53-M, respectively, so that outputs OOi(1), . . . , OOi(M) and OOq(1), . . . , OOq(M) are taken out.

Figure 11:
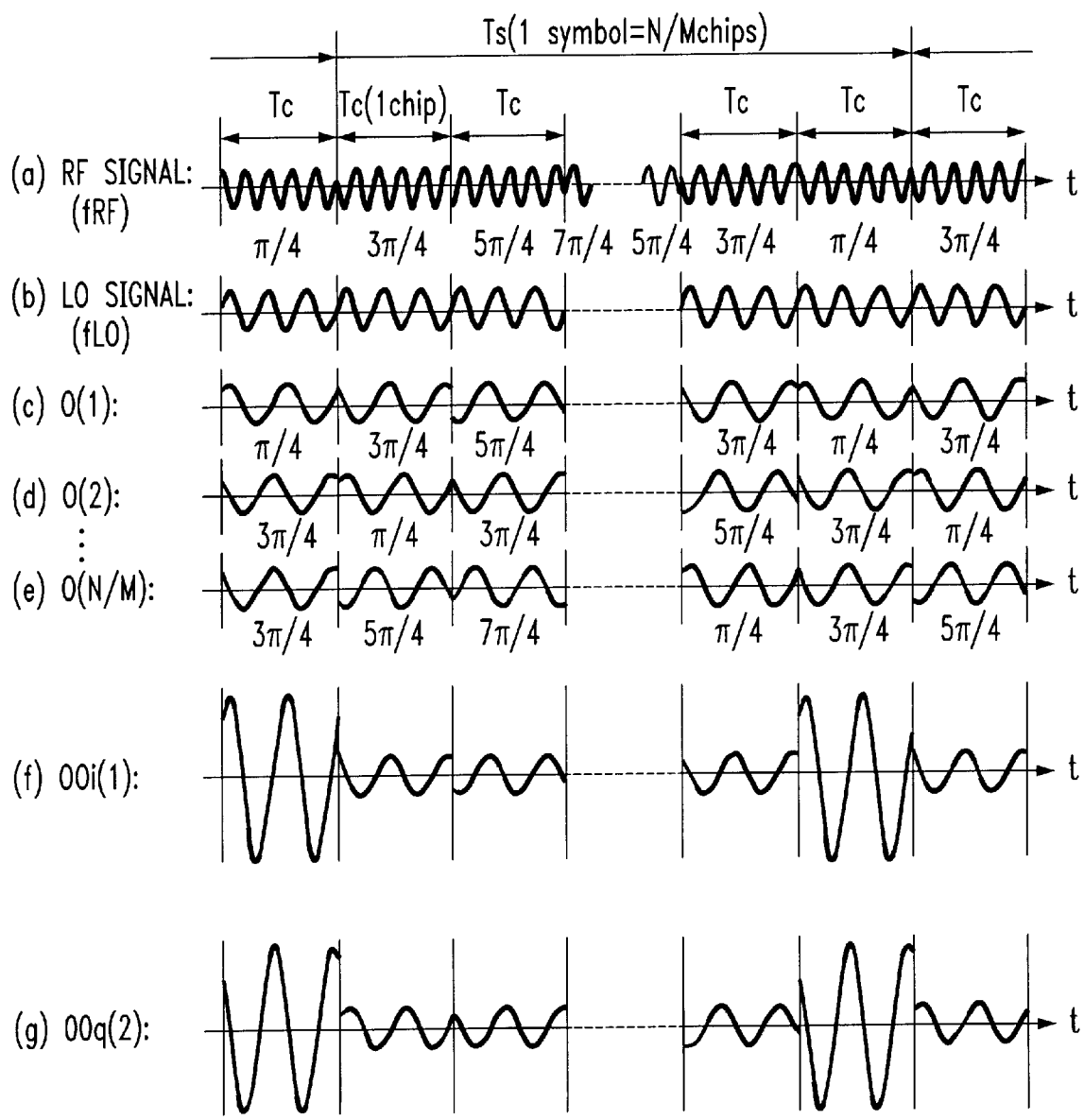
FIG. 11 is a view for explaining the function of the embodiment of the present invention using QPSK modulation depicted in FIG. 10.

FIG. 11 shows waveforms at respective parts of FIG. 10. Assume now that the input signal has the same waveform as in FIG. 6. Because of $f_{LO} \approx f_{RF}$, the frequency of O(1), . . . , O(N) is $f_{IF}=|f_{RF}-f_{LO}|$. Outputs O(1), . . . , O(N/M) are given as shown in the signal charts (c), (d) and (e) of FIG. 11 so that the frequency is converted but the phase relation is held. Outputs OOi(1) and OOq(1) at terminals 24-1 and 54-1 in FIG. 10 are shown in the signal charts (f) and (g) of FIG. 11. Peaks of autocorrelation values corresponding to i- and q-channels are obtained by symbol in the same manner as in FIGS. 4 and 6. This embodiment is however different from the case of FIG. 6 in that output waveforms having a frequency different from the modulation frequency of a base band, that is, having the intermediate frequency $f_{IF}$ modulated with a base band signal. Though not shown, one-symbol-previous output waveforms OOi(2) and OOq(2) are obtained by the same means as described above.

Accordingly, as stated in Claims 10 to 11, synchronous detection or delay detection can be made in the same manner as described above. FIG. 12A shows an example concerning demodulation arithmetic operations in the case of delay detection in the same manner as in FIG. 8A. Let m and n be demodulation data for i- and q-channels respectively. Combinations of data in a current symbol and data in a previous symbol are shown in the left of FIG. 12A. To obtain demodulation data, the following arithmetic operation is carried out with respect to i-channel, as stated in Claim 12.

$$|OOi(1)+OOi(2)|^2-|OOi(1)-OOi(2)|^2=4OOi(1)\cdot OOi(2)$$

The following arithmetic operation is carried out with respect to q-channel.

$$|OOq(1)+OOq(2)|^2-|OOq(1)-OOq(2)|^2=4OOq(1)\cdot OOq(2)$$

Results of the aforementioned arithmetic operations are given as shown in the lower portion of the center of FIG. 12A. Further, clock pulses are obtained by the following arithmetic operation shown in the right of FIG. 12A.

$$|OOi(1)+OOi(2)|^2+|OOi(1)-OOi(2)|^2=2\{OOi(1)^2+OOi(2)^2\}$$

or $$|OOq(1)+OOq(2)|^2+|OOq(1)-OOq(2)|^2=2\{OOq(1)^2+OOq(2)^2\}$$

The result of the aforementioned arithmetic operation is shown in the lower portion of the right of FIG. 12A, so that a periodic clock pulse row is obtained.

Figure 12B:
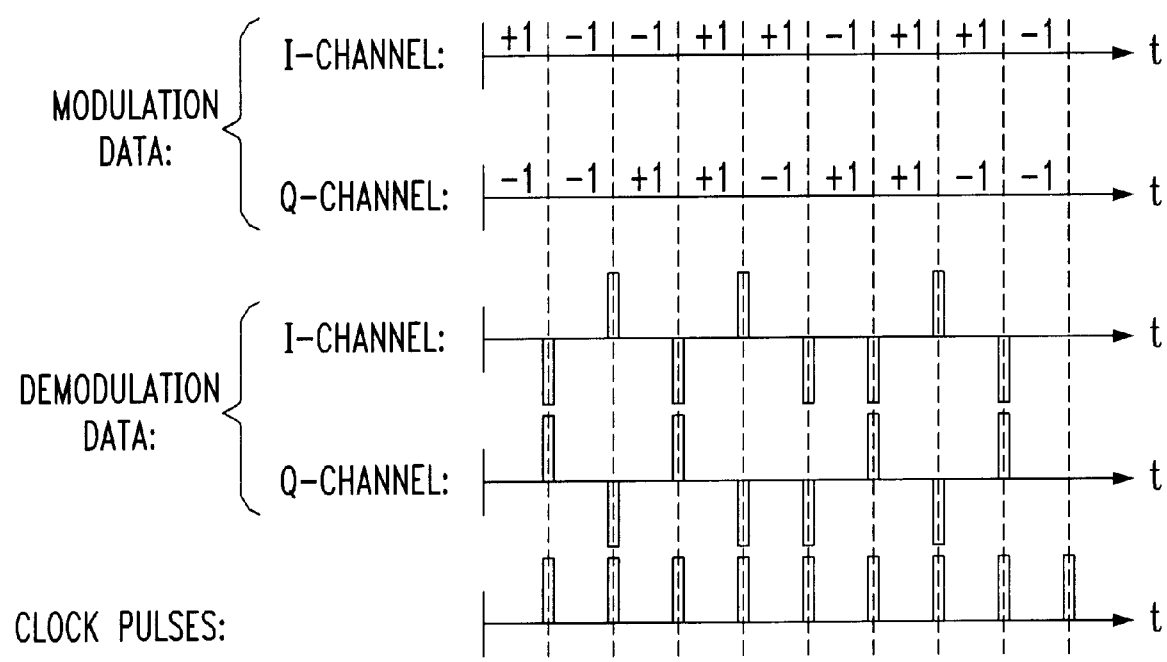

The aforementioned results are given by waveforms as shown in the example of FIG. 12B. Waveforms substantially the same as in FIG. 8B are basically obtained as output waveforms at respective parts. The example shown FIG. 12B is however different from the example shown in FIG. 8B in that output waveforms are given as rectified waveforms oscillating with a frequency $f_{IF}$. Accordingly, output waveforms quite the same as in FIG. 8B are obtained if the output waveforms are made to pass through lowpass filters.

Figure 13:
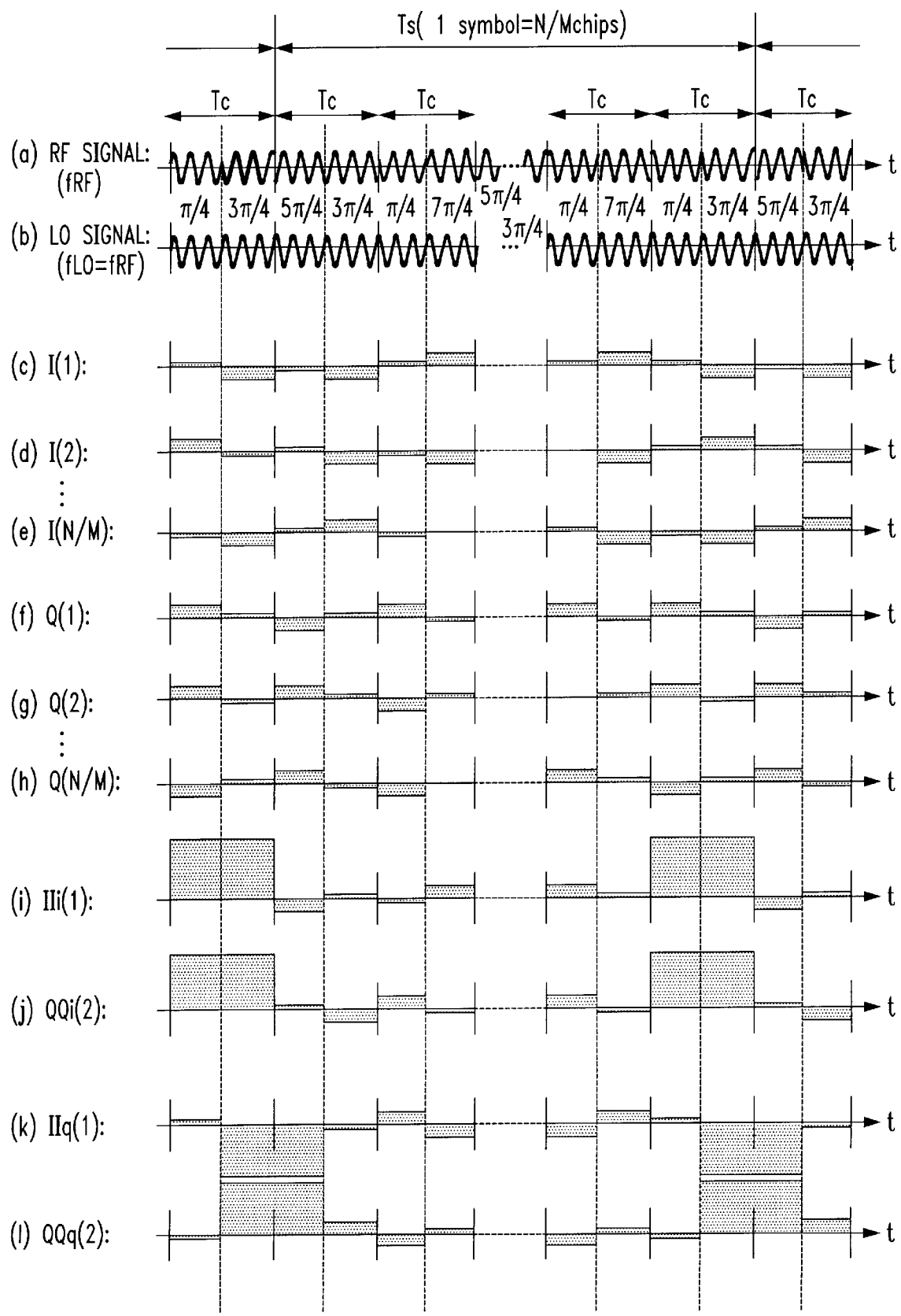
FIG. 13 is a waveform diagram for explaining the function of the embodiment of the present invention using OQPSK modulation depicted in FIG. 5.

The above description can be directly applied to a modulation system using BPSK or QPSK as a basis, as stated in Claims 36 and 37. Accordingly, the above description can be applied to MSK (minimum shift keying), GMSK (gaussian filtered minimum shift keying), etc. without any problem. A similar modulation system OQPSK (offset QPSK) is a system in which modulation for i-channel and modulation for q-channel are shifted by a half chip from each other in the time axis as shown in FIG. 13 when modulation is to be performed on the basis of i- and q-channel spread code rows. In this case, constellation expressing the relation between the phase and amplitude of modulation wave do not have zero cross in the transition between chips. Accordingly, there arises an excellent point in little influence of circuit elements having nonlinear characteristic such as an amplifier system, or the like.

The present invention can be applied also to an OQPSK modulation system with quite the same apparatus configuration. The phase of OQPSK modulation wave changes even in the center of each chip as shown in the signal chart (a) of FIG. 13 whereas the phase of QPSK modulation wave in the signal chart (a) of FIG. 6 changes for each chip. Accordingly, in the quite same configuration as in FIG. 5, mixer outputs I(1), . . . , I(N/M) and Q(1), . . . , Q(N/M) are obtained. As shown in the signal charts (c), (d), (e), (f), (g) and (h) of FIG. 13, outputs change even in the center of each chip in response to the aforementioned phase change. Outputs substantially quite the same as in the case of general QPSK are basically obtained as outputs IIi(1), QQi(1), IIq(1) and QQq(1) obtained when outputs weighted with +1 or −1 correspondingly to i- and q-channels are added up by adders respectively though the phases of the outputs IIi(1), QQi(1), IIq(1) and QQq(1) are shifted by a half chip from each other as shown in the signal charts (i), (j), (k) and (l) of FIG. 13. Accordingly, synchronous detection or delay detection can be made in the same manner as described above. For example, demodulation using delay detection can be performed by arithmetic operations shown in FIG. 8A.

Figure 14:
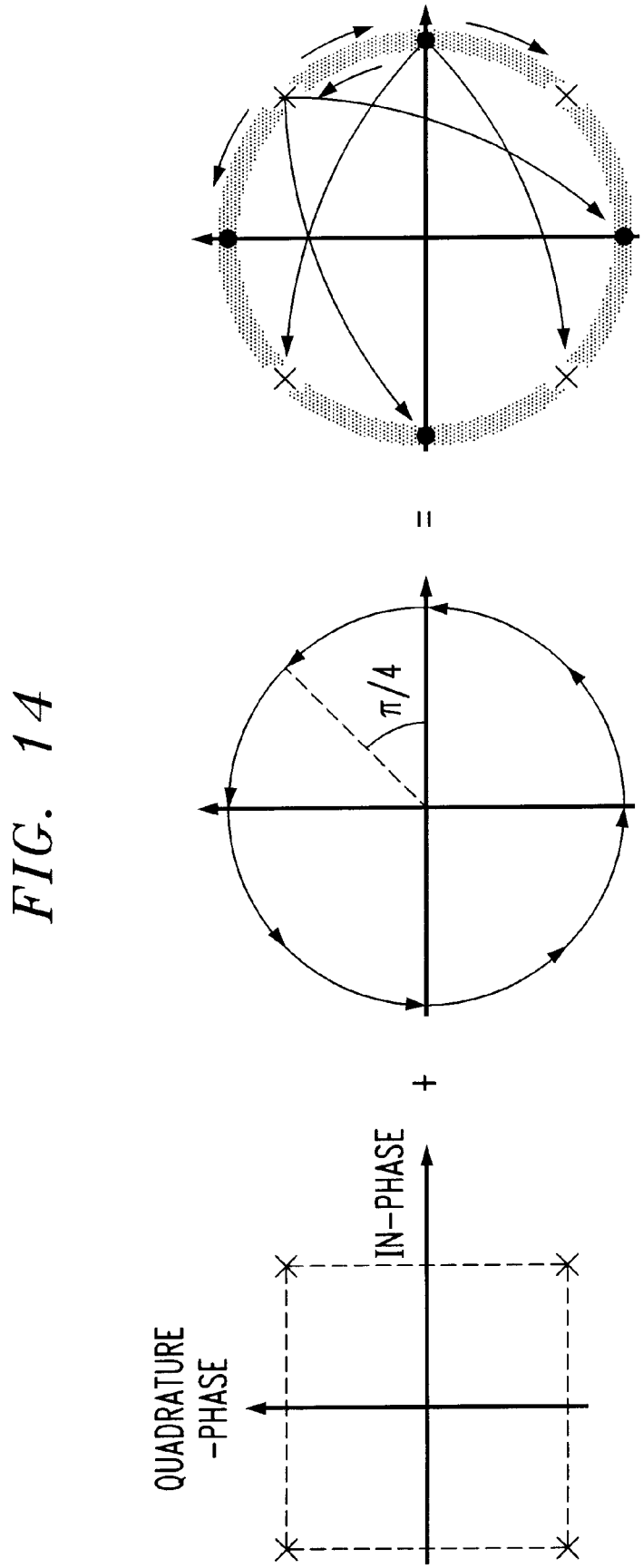
FIG. 14 is a graph showing the phase and amplitude (constellation) of a $\pi/4$-shift QPSK-modulated signal.

A π/4-shift QPSK modulation system will be described below. This modulation system is characterized in that general QPSK is used basically in the same manner as in OQPSK buts π/4-shift for positive or negative rotation is applied to each chip as shown in FIG. 14 (FIG. 14 shows the case of positive rotation). As a result, constellation expressing the phase and amplitude of the modulation wave does not have zero cross in the same manner as in the case of OQPSK in the transition between chips. There arise excellent characteristics that the influence of a nonlinear element is less and the frequency bandwidth necessary for spectral spread may be relatively narrow if the chip rate is constant.

Figure 15:
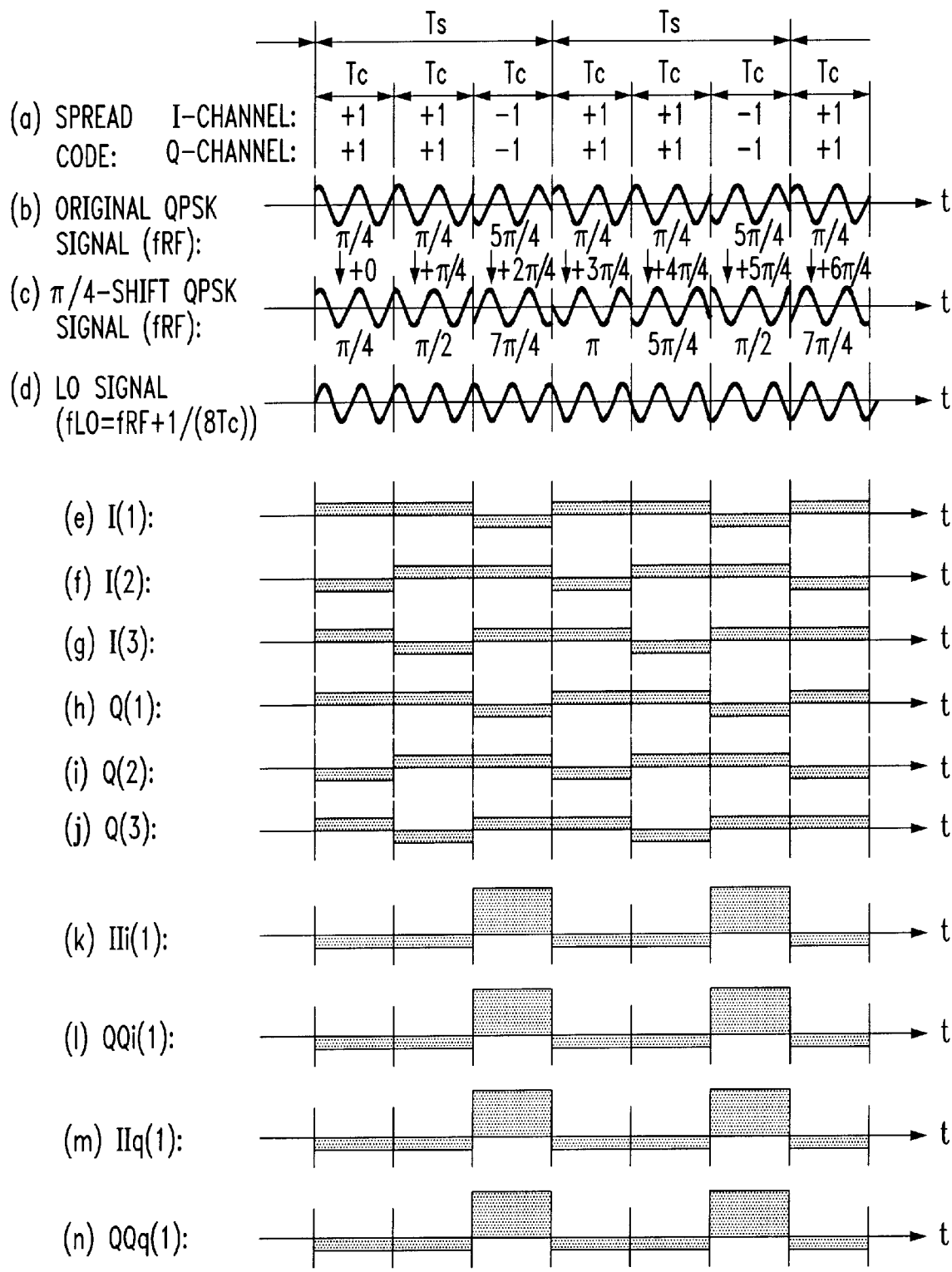
FIG. 15 is a waveform diagram for explaining the function of the embodiment of the present invention using $\pi/4$-shift QPSK modulation depicted in FIG. 5.

Also in the case of π/4-shift QPSK modulation, demodulation can be made in the same manner as described above but the shift value of π/4 or −π/4 for each chip needs to be corrected on the basis of the frequency of a local oscillation signal. FIG. 15 shows waveforms at respective parts. As shown in the signal chart (a) of FIG. 15, spread code rows for i- and q-channels are assumed to be the same for simplification and be +1+1−1 for simplification. One symbol is assumed to be composed of 3 chips. Original QPSK modulation wave is given from a spread code row as shown in the signal chart (b) of FIG. 15. Assuming the case of π/4-shift positive rotation, then, π/4-shift QPSK wave is given as shown in the signal chart (c) of FIG. 15. Upon the consideration of the aforementioned shift, the local oscillation signal needs to have a frequency shifted by about 1 MHz by using 8 chips. That is, as shown in the signal chart (d) of FIG. 15, the relation $f_{LO}=f_{RF}+1/(8Tc)$ is made to hold. In the case of π/4-shift negative rotation, the relation $f_{LO}=f_{RF}-1/(8Tc)$ is made to hold. Outputs I(1), I(2), I(3), Q(1), Q(2) and Q(3) in FIG. 5 are given as shown in the signal charts (e), (f), (g), (h), (i) and (j) of FIG. 15. Outputs IIi(1), QQi(1), IIq(1) and QQq(1) obtained when outputs weighted correspondingly to the spread code rows are added up by adders respectively are given as shown in the signal charts (k), (l), (m) and (n) of FIG. 15. Peaks of autocorrelation values corresponding to i- and q-channels are obtained at intervals of a symbol in the same manner as in the case of QPSK modulation. Accordingly, the same modulation as described above can be performed, for example, by arithmetic operations shown in FIG. 8A.

Figure 1:
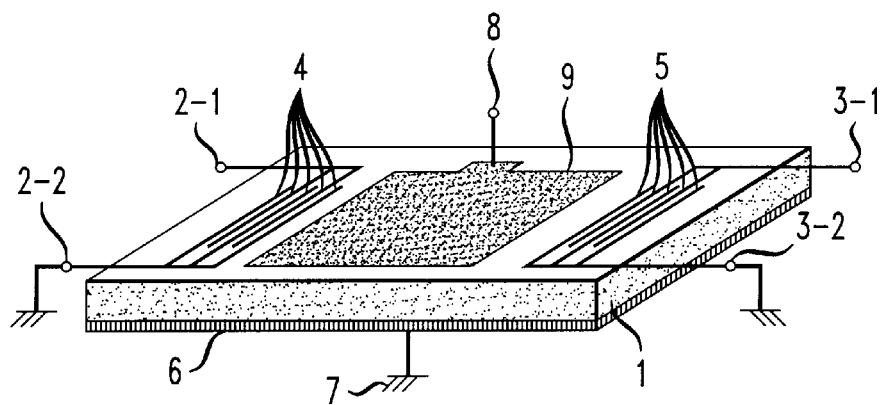
FIG. 1 is a view of a conventional SAW signal processing apparatus for spread-spectrum communication.
Figure 16:
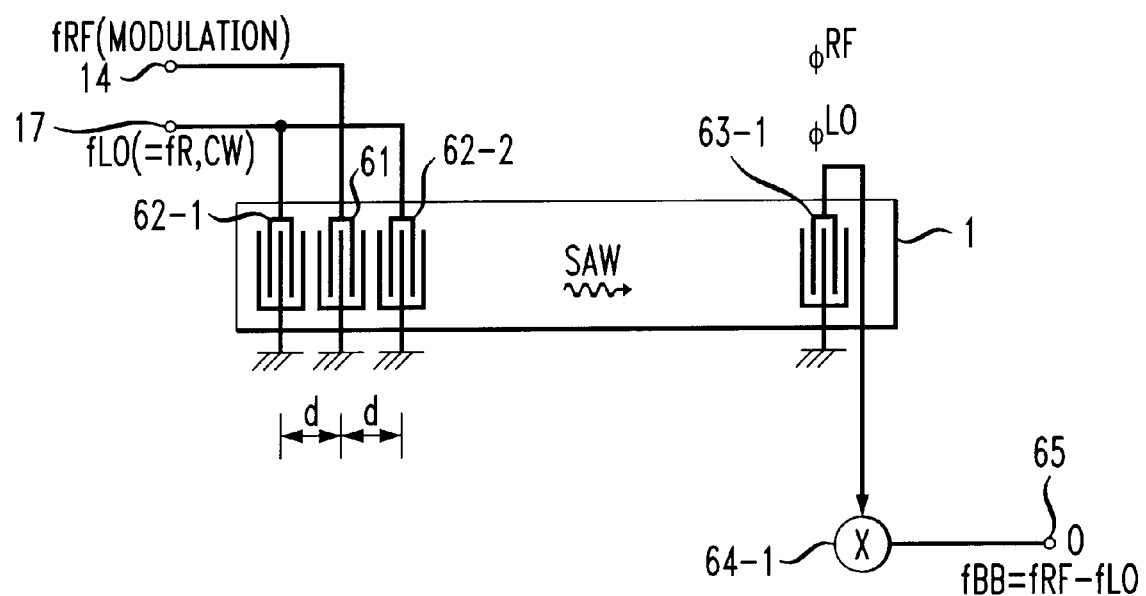
FIG. 16 is a circuit diagram of the SAW signal processing apparatus for spread-spectrum communication as an embodiment of the present invention.

FIG. 16 shows a further embodiment of the present invention as stated in Claim 24. In the basic configuration, the first and second surface acoustic wave delay elements in FIG. 1 are united by using two kinds of surface acoustic wave excitation transducers to form a third surface acoustic wave delay element to thereby form one output terminal. That is, an SAW excitation transducer 61 for inputting a spread-spectrum signal having a frequency $f_1=f_{RF}$, SAW excitation transducers 62-1 and 62-2 disposed in opposite sides of the transducer 61 for inputting a non-modulation signal having a frequency $f_2=f_{LO}$ equal to $f_{RF}$ and a reception transducer 63-1 are formed on a piezoelectric substrate as shown in FIG. 16. Two input high-frequency signals of the excitation transducers propagate as SAW in the same direction and in the same path on the same substrate, so that two high-frequency signals are obtained simultaneously from the reception transducer. When the transducer 61 is located in a substantially middle position between the transducers 62-1 and 62-2, the phase delays at the reception transducer, of the two high-frequency signals given from the input terminals respectively are substantially equal to each other to thereby establish $\phi^{RF} \approx \phi^{LO}$. Two high-frequency signals obtained from the outputs are mixed by a mixer 64-1, so that a modulation signal 0 of a base band is directly outputted. Accordingly, in the configuration of FIG. 2, the same function as in the case of $f_1=f_2$ is obtained. Incidentally, the mixer 64-1 can be achieved easily as a base or gate common input transistor or FET type mixer.

Figures 17, 17A, 17B:
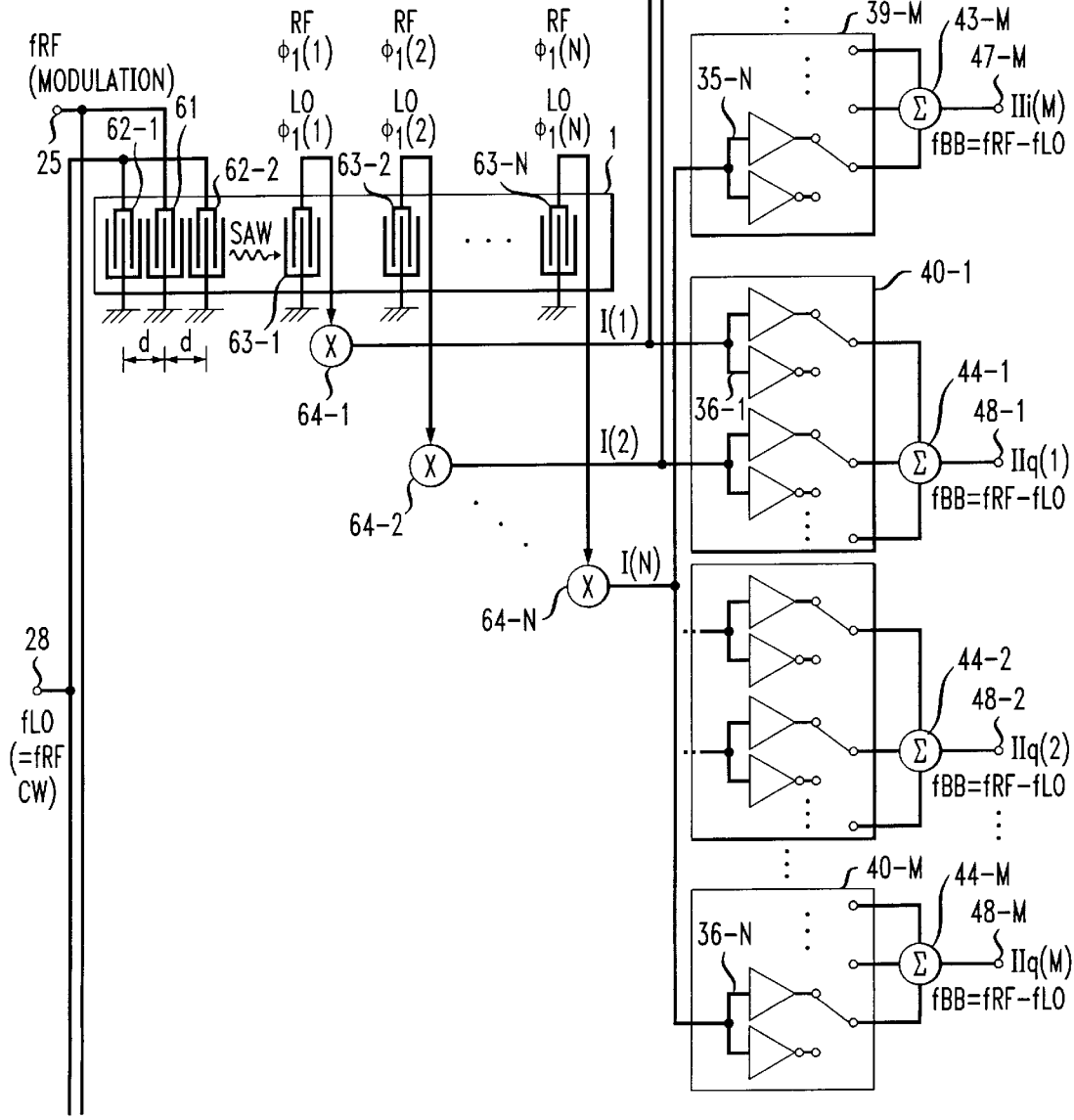
FIG. 17 is a circuit diagram of the SAW signal processing apparatus for spread-spectrum communication as an embodiment of the present invention.
Figure 17B:
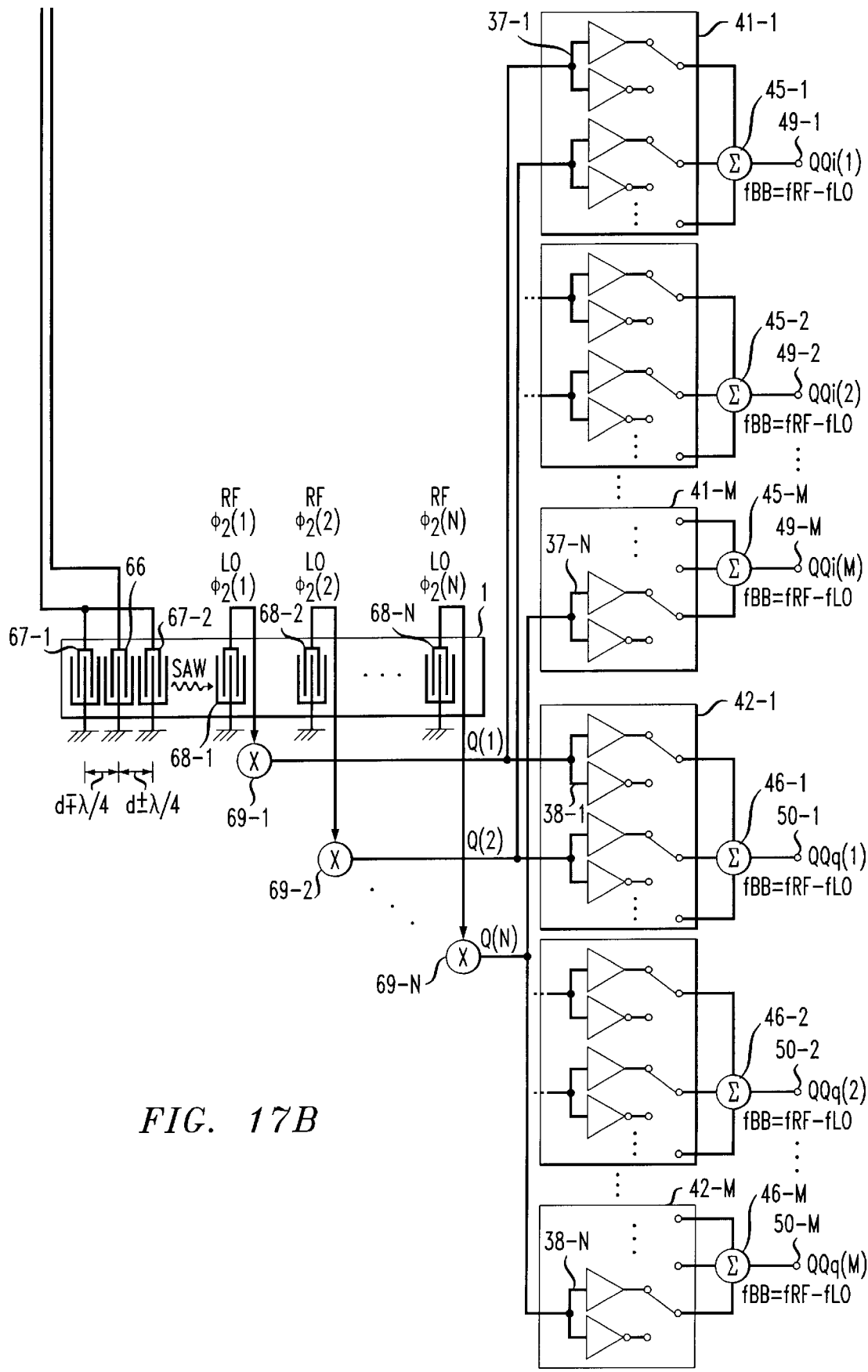

FIG. 17 shows a further embodiment used in a QPSK modulation system, or the like, as stated in Claim 25. Of course, this embodiment can be applied also to a BPSK modulation system. This apparatus has a configuration in which the first, second and third SAW delay elements in the apparatus of FIG. 5 are replaced by two delay elements each using two kinds of SAW excitation transducers in the same manner as in FIG. 16. The first and second surface acoustic wave delay elements in FIG. 5 are united to form a fourth surface acoustic wave delay element (delay element in the upper portion of FIG. 17), and the first and third surface acoustic wave delay elements are united to form a fifth surface acoustic wave delay element (delay element in the lower portion of FIG. 17). In the fourth delay element, an SAW excitation transducer 61 for inputting a spread-spectrum signal having a frequency $f_{RF}$ and SAW excitation transducers 62-1 and 62-2 disposed in opposite sides of the transducer 61 for inputting a non-modulation signal having a frequency $f_{LO}$ equal to the frequency $f_{RF}$ are formed as shown in FIG. 17 in the same manner as in FIG. 16. Further, N reception transducers 63-1, . . . , 63-N are formed as shown in FIG. 17. In the fifth delay element, an SAW excitation transducer 66 for inputting a spread-spectrum signal and SAW excitation transducers 67-1 and 67-2 disposed in opposite sides of the transducer 66 for inputting a non-modulation signal are formed as shown in FIG. 17. Further, N reception transducers 68-1, . . . , 68-N are formed as shown in FIG. 17. The fifth delay element is different from the fourth delay element in that the center of the transducer 66 is shifted (by a quarter wavelength in FIG. 17) from the intermediate position between the transducers 67-1 and 67-2. In the case where two high-frequency signals given from the transducers 62-1, 62-2 and 67-1, 67-2 of the fourth and fifth delay elements are received by N reception transducers, the following relations need to be satisfied so that the difference between phase delays in non-modulation signals obtained from corresponding output terminals of the fourth and fifth delay elements becomes about 90°.

$$\phi_1^{LO}(1) \approx \phi_2^{LO}(1) \pm 90°, \phi_1^{LO}(2) \approx \phi_2^{LO}(2) \pm 90°, \ldots,$$
$$\phi_1^{LO}(N) \approx \phi_2^{LO}(N) \pm 90°$$

Phase delays in corresponding outputs at adjacent terminals of N reception transducers in each of the fourth and fifth delay elements satisfy the following relations in the same manner as in the case of FIG. 5.

$$|\phi_1^{RF}(1)-\phi_1^{RF}(2)| \approx |\phi_1^{RF}(2)-\phi_1^{RF}(3)| \approx, \ldots, \approx|$$
$$\phi_1^{RF}(N-1)-\phi_1^{RF}(N)| \approx |\phi_2^{RF}(1)-\phi_2^{RF}(2)| \approx|$$

$$\phi_2^{RF}(2)-\phi_2^{RF}(3)| \approx, \ldots, \approx|\phi_2^{RF}$$
$$(N-1)-\phi_2^{RF}(N)| \approx Tc \times 2 \pi f_{RF}(=\omega_{RF}Tc)$$

Two high-frequency signals of a spread-spectrum signal and a non-modulation signal are inputted to the two kinds of SAW excitation transducers in each of the fourth and fifth delay elements, so that two high-frequency signals obtained simultaneously from N independent reception transducers for each of the fourth and fifth delay elements are mixed by N independent mixers 64-1, . . . , 64-N, 69-1, . . . , 69-N. N modulation signals I(1), I(2), . . . , I(N) and N modulation signals Q(1), Q(2), . . . , Q(N) each having a frequency equal to the differential frequency, that is, of a base band are taken out from the mixers respectively. The same weighting and addition as in the posterior to the mixers in FIG. 5 are performed so that M independent output signals IIi(1), IIi(2), . . . , IIi(M), M independent output signals QQi(1), QQi(2), . . . , QQi(M), M independent output signals IIq(1), IIq(2), . . . , IIq(M) and M independent output signals QQq(1), QQq(2), . . . , QQq(M) can be taken out. This is quite the same as the output signal obtained in FIG. 5. The configuration of FIG. 17 is effective in that the number of delay elements can be reduced.

Figure 18:
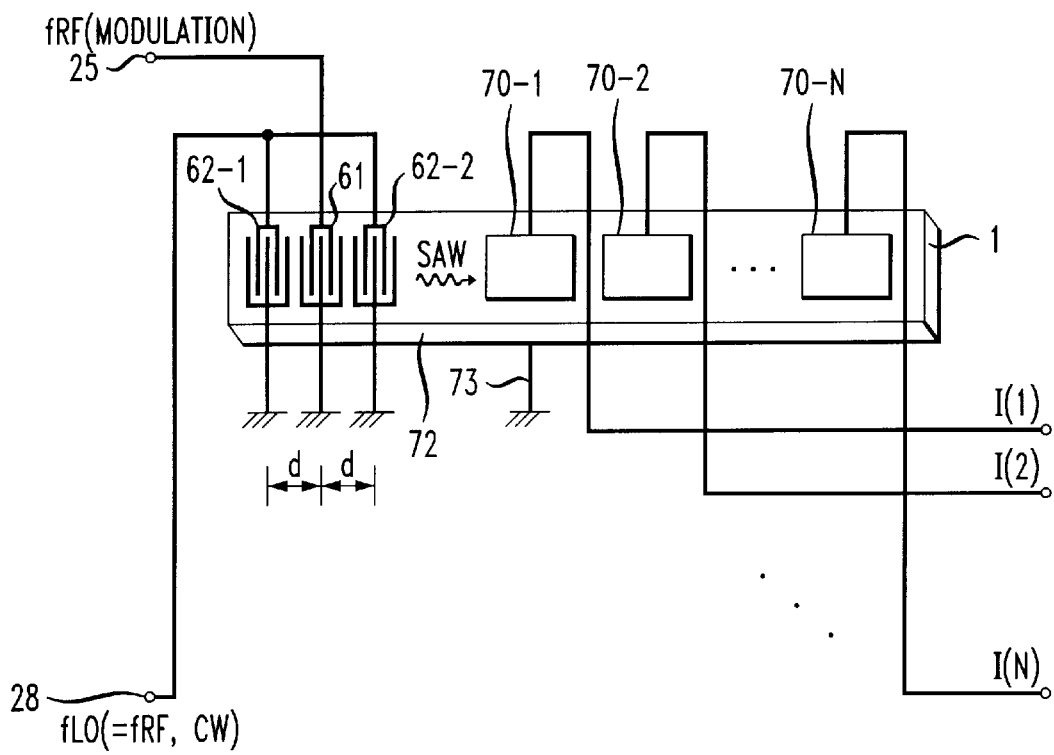
FIG. 18 is a circuit diagram of the SAW signal processing apparatus for spread-spectrum communication as an embodiment of the present invention.

FIG. 18 shows a further embodiment of the present invention as stated in Claim 26. Configuration is made so that the reception transducers in the fourth and fifth delay elements of the apparatus in FIG. 17 are replaced by N uniform electrodes. For simplification, FIG. 18 shows only the delay element of an upper half correspondingly to the fourth element. The same function as described above can be achieved by use of this configuration in two SAW delay elements in FIG. 17. Two high-frequency signals inputted to two kinds of SAW excitation transducers are converted into two SAW signals. The two SAW signals propagate on the substrate simultaneously and mixed with each other by a nonlinear effect in the piezoelectric substrate under N uniform electrodes instead of the mixers. N independent outputs I(1), I(2), . . . , I(N) and N independent outputs Q(1), Q(2), . . . , Q(N) can be taken out as a voltage between the uniform electrode and the ground 72 on the back of the piezoelectric substrate. If the same processing as in FIG. 17 is performed thereafter, the same result can be obtained with a relatively simple configuration though the output level is small.

Figure 19:
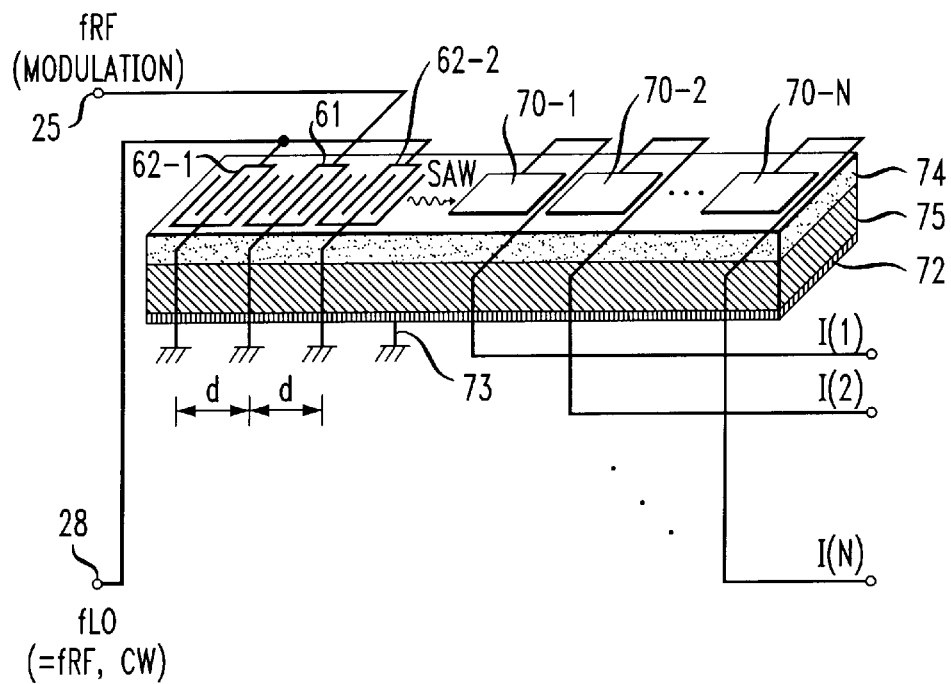
FIG. 19 is a circuit diagram of the SAW signal processing apparatus for spread-spectrum communication as an embodiment of the present invention.

FIG. 19 shows a further embodiment of the present invention as stated in Claim 27. Configuration is made so that the SAW delay element in the apparatus of FIG. 18 has a multilayer structure of a piezoelectric matter 74 such as ZnO, or the like, and a semiconductor 75 such as Si, or the like, and further has N uniform electrodes (gate electrodes). Similarly to FIG. 18, FIG. 19 shows only an upper half corresponding to the fourth delay element. Two high-frequency signals are inputted to the two kinds of SAW excitation transducers in the delay element. Two SAW signals propagating on the substrate induce electric field and electric potential in the semiconductor through the piezoelectric matter. The two high-frequency signals are mixed on the basis of the nonlinear relational expression between the electric field and the potential possessed by the semiconductor just under the electrode. N independent outputs can be taken out as electric signals from the uniform electrodes. The same processing is performed in the same manner in the case of FIG. 18 thereafter, but the output level can be expected to have a value larger than that in FIG. 18.

Figures 20, 20A:
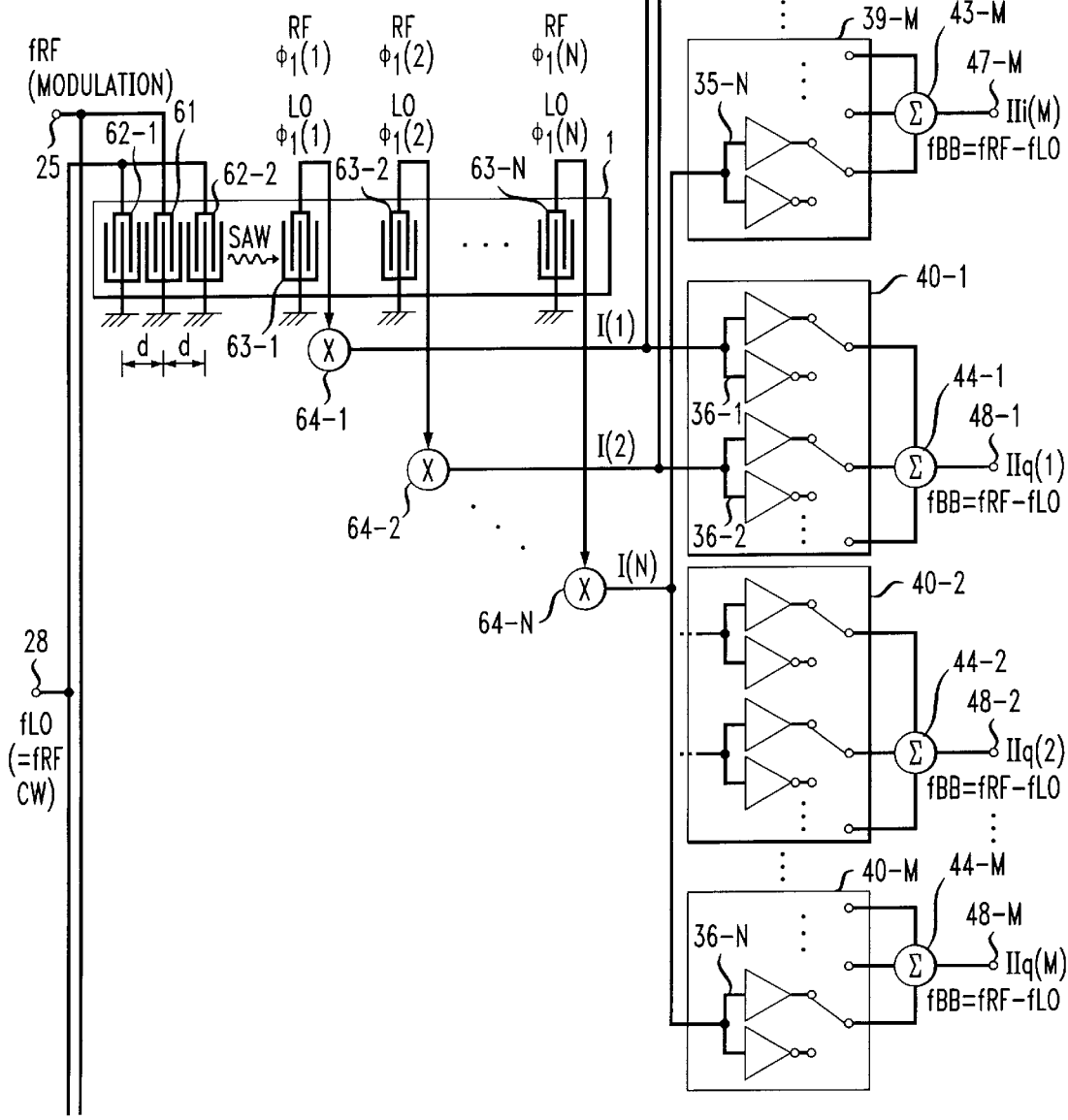
FIG. 20 is a circuit diagram of the SAW signal processing apparatus for spread-spectrum communication as an embodiment of the present invention.
Figure 20B:
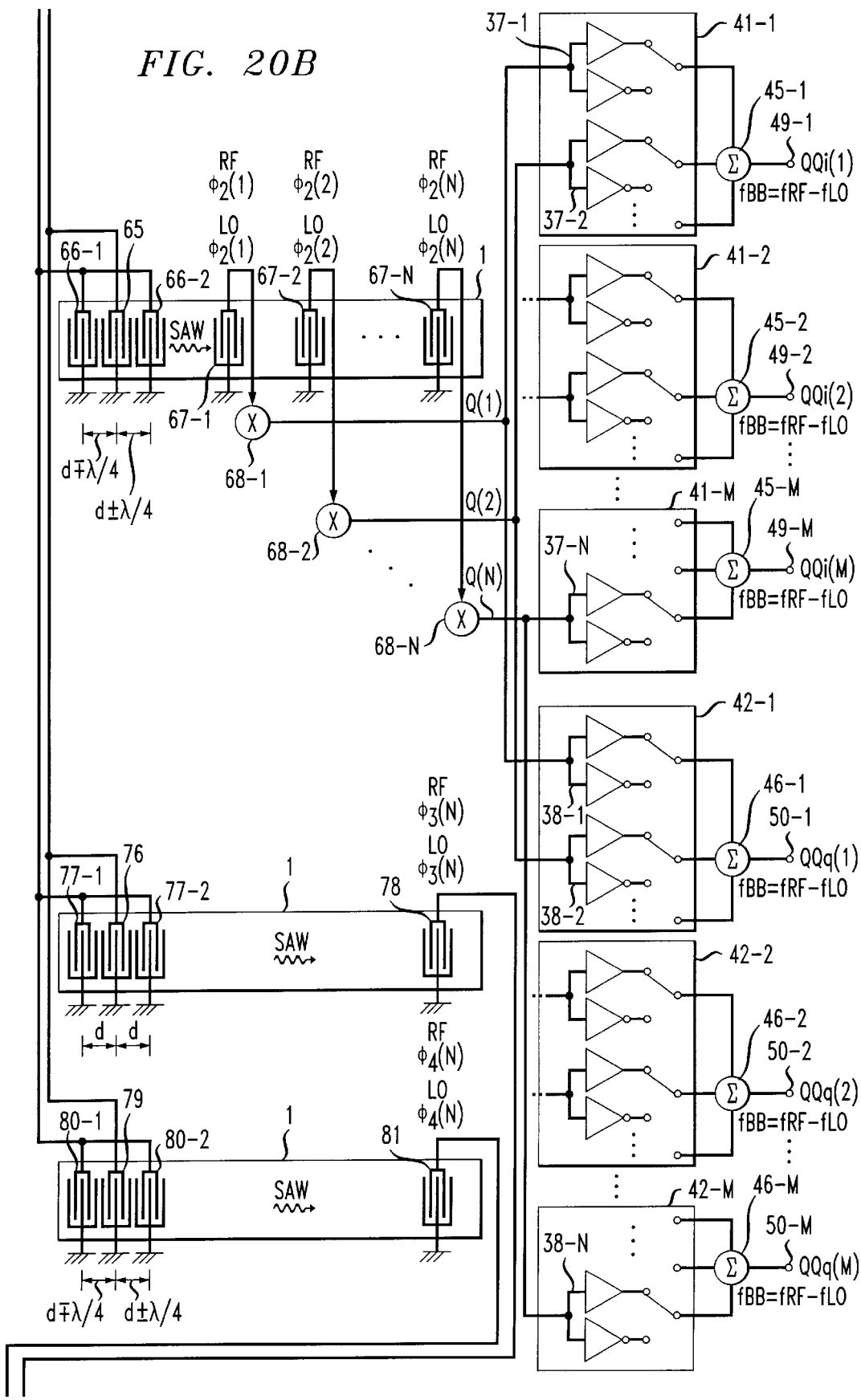
Figure 20C:
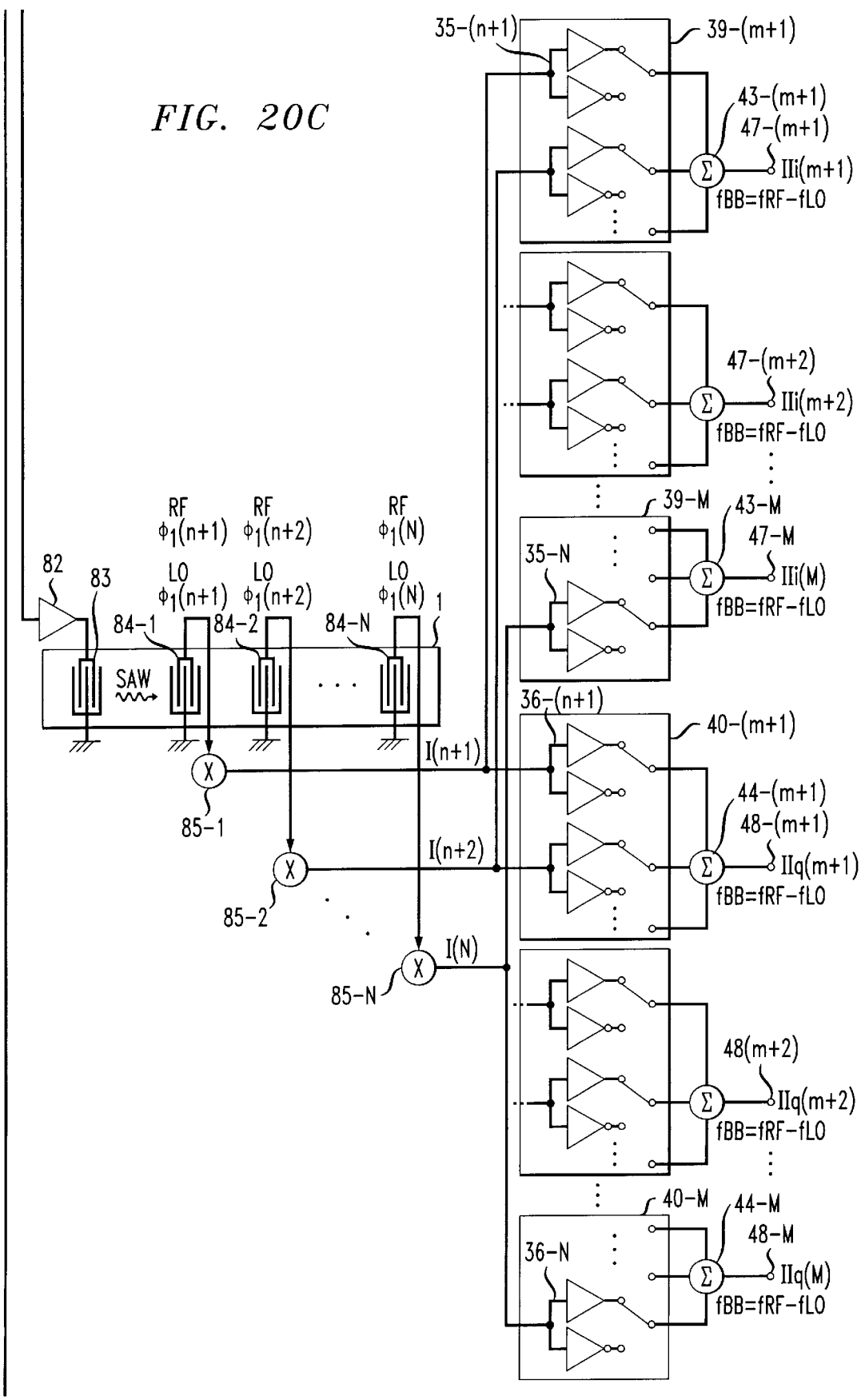
Figure 20D:
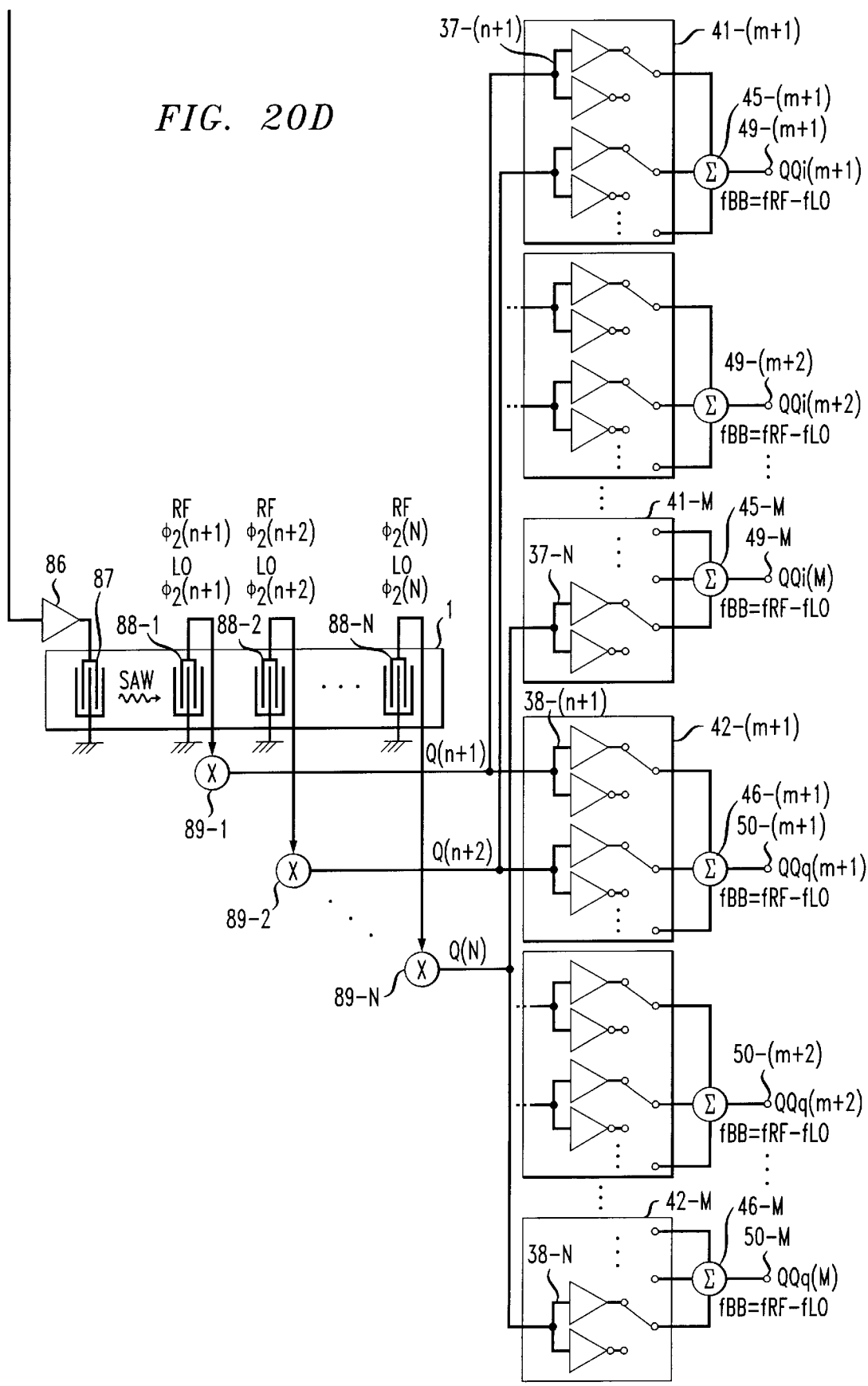

FIG. 20 shows a further embodiment of the present invention as stated in Claim 28. This apparatus has, in addition to the fourth and fifth delay elements (first and second delay elements from the upper of FIG. 20) as shown in FIG. 17, sixth and seventh SAW delay elements (third and fourth delay elements from the upper of FIG. 20) having two kinds of SAW excitation transducers as shown in FIG. 17. In the configuration shown in FIG. 20, eighth and ninth SAW delay elements (fifth and sixth delay elements from the upper of FIG. 20) each having an SAW excitation transducer and a plurality of reception transducers are further provided, but this point is not essential. The point of difference between the SAW excitation transducers of the fourth delay element and the SAW excitation transducers of the sixth delay element is in that SAW excited by the transducers 62-1 and 62-2 of the fourth delay element receiving a non-modulation signal has an anti-phase relation with SAW excited by the transducers 77-1 and 77-2 of the sixth delay element receiving a non-modulation signal. The point of difference between the two kinds of SAW excitation transducers of the fifth delay element and the two kinds of SAW excitation transducers of the seventh delay element is in that SAW excited by the transducers 66-1 and 66-2 of the fifth delay element receiving a non-modulation signal has an anti-phase relation with SAW excited by the transducers 80-1 and 80-2 of the seventh delay element exciting a non-modulation signal. When the excitation transducers are configured as shown in FIG. 20, all high-level non-modulation signals are generally canceled from the spread-spectrum signal side so that the backflow can be prevented. This is a very important point in a radio apparatus, or the like.

Further, in FIG. 20, outputs of the sixth and seventh delay elements are inputted to the SAW excitation transducers of the eighth and ninth delay elements. As shown in FIG. 20, N independent outputs can be taken out from the reception transducers of the fourth and eight delay elements and from the reception transducers of the fifth and ninth delay elements, respectively. This is equivalent to the fact that the length of the delay element is equivalently doubled, so that this is effective for reduction in size of the apparatus, or the like.

Figure 21:
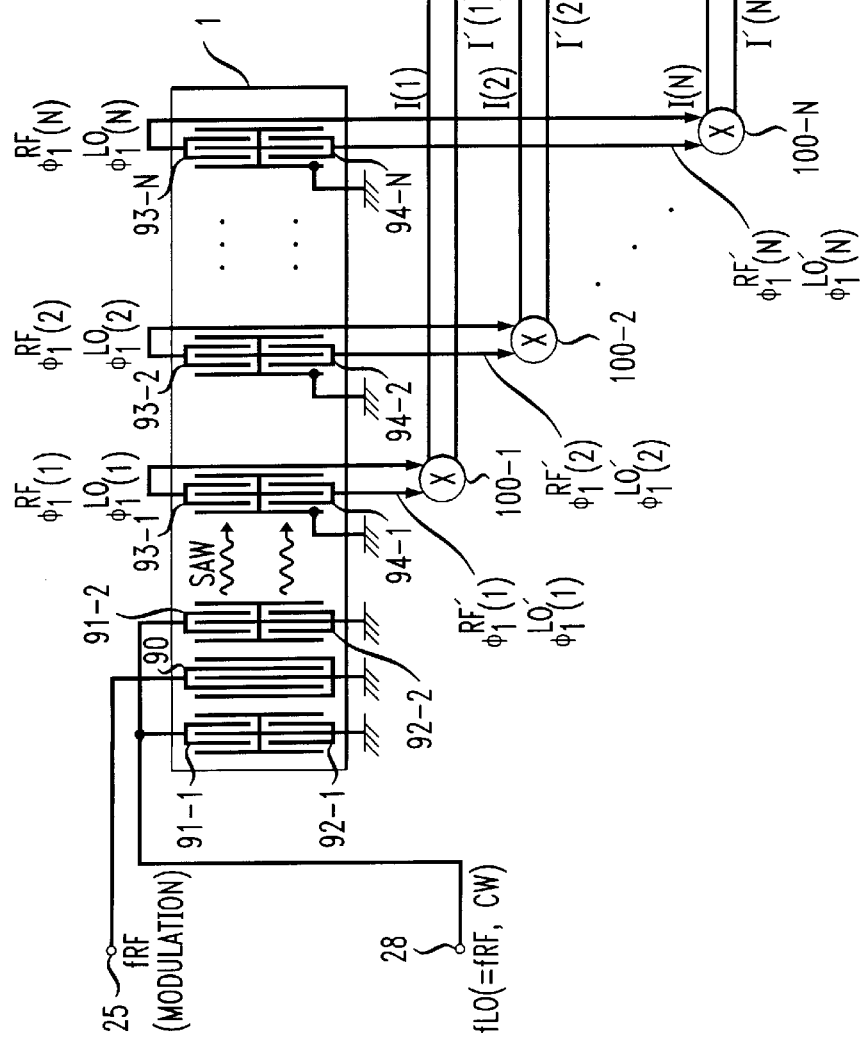
FIG. 21 is a circuit diagram of the SAW signal processing apparatus for spread-spectrum communication as an embodiment of the present invention.

FIG. 21 shows a further embodiment of the present invention as stated in Claims 29 and 30. Configuration is made so that two kinds of SAW excitation transducers and a reception transducer are formed in each of the fourth and fifth delay elements in FIG. 17 as stated in Claims 29 and 30. FIG. 21 shows only an upper half corresponding to the fourth delay element for simplification. Transducers each receiving a non-modulation signal and having an aperture length about half the aperture length of a transducer 90 receiving a spread-spectrum signal are designated by the reference numerals 91-9 and 91-2, respectively. Transducers for exciting SAW having an anti-phase relation with the transducers 91-1 and 91-2 are designated by the reference numerals 92-1 and 92-2. Outputs obtained from the transducer 90 and N transducers 93-1, . . . , 93-N receiving two SAW signals excited by the transducers 91-1 and 91-2 and outputs obtained from the transducer 90 and N transducers 94-1, . . . , 94-N receiving two SAW signals excited by the transducers 92-1 and 92-2 are mixed by N independent balanced type mixers, so that N pairs of base-band modulation signals having an anti-phase relation with each other are taken out as differential outputs I(1) and I'(1), I(2) and I'(2), . . . , I(N) and I'(N). The pairs of differential outputs are classified into groups by N/M. In each of the groups, when one of each differential output pair is weighted with +1, the other is weighted with −1. When one of each differential output pair is weighted with −1, the other is weighted with +1. The weighted outputs are added up by groups by adders so that output signals IIi(1), IIi(2), . . . ,IIi(M) are obtained in the same manner as in FIG. 17. The same weighting is applied to the q-channel spread code row and then weighted outputs are added up by groups by adders so that output signals IIq(1), IIq(2), . . . , IIq(M) are obtained. When a delay element corresponding to the fifth delay element is used in the same manner as in FIG. 17, N output signals QQi(1), QQi(2), . . . , QQi(M) and QQq(1), QQq(2), . . . , QQq(M) can be further taken out. Generally, in a differential configuration, common mode noise on a signal line is canceled so that the influence of noise can be reduced greatly. Particularly, the configuration of FIG. 21 is very useful for spread-spectrum communication because energy density in the spread-spectrum communication is small.

Figure 22:
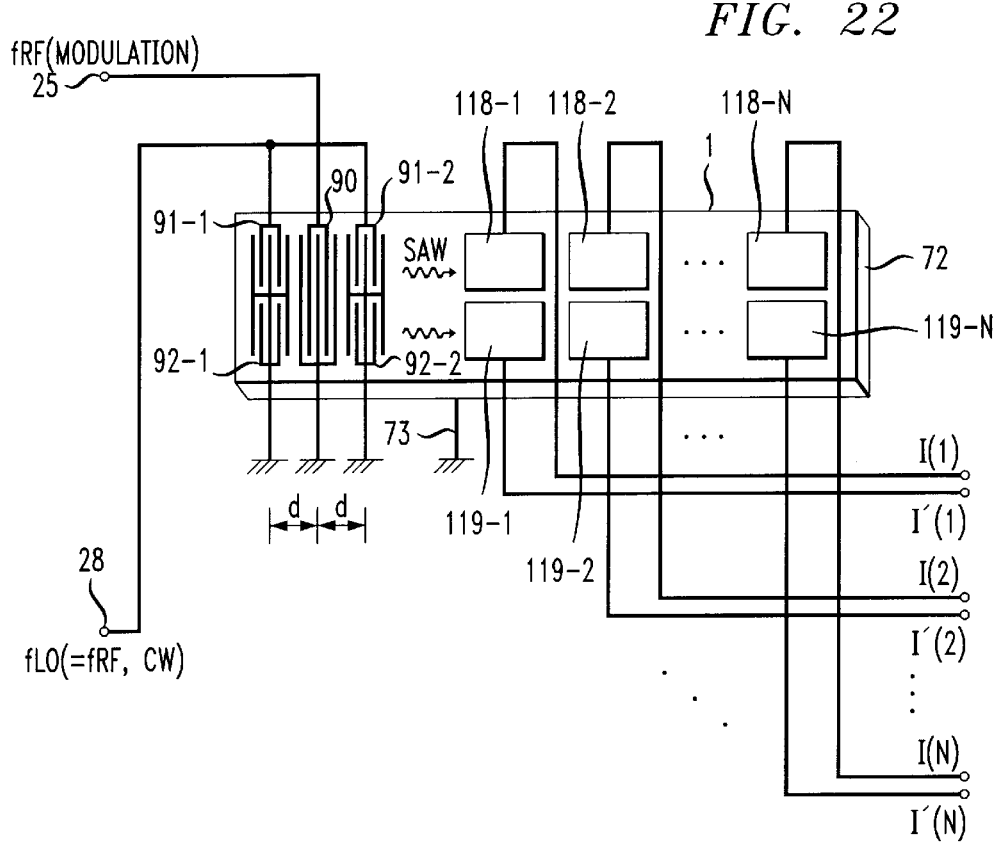
FIG. 22 is a circuit diagram of the SAW signal processing apparatus for spread-spectrum communication as an embodiment of the present invention.

FIG. 22 shows a further embodiment of the present invention as stated in Claim 31. Instead of the reception transducers of the SAW delay elements and the balanced mixers in FIG. 21, a plurality of pairs (N pairs) of uniform electrodes are disposed symmetrically with respect to the center line of excitation SAW. For simplification, only one delay element is shown. Two high-frequency signals (SAW) inputted to two kinds of SAW excitation transducers are mixed by a nonlinear effect in the piezoelectric substrate under N pairs of uniform electrodes instead of the mixers. N base-band modulation signals can be taken out independently and differentially as potential differences between the uniform electrodes. If the same processing as in FIG. 21 is performed thereafter, the same result is obtained with a relatively simple configuration though the output level is small.

Figure 23:
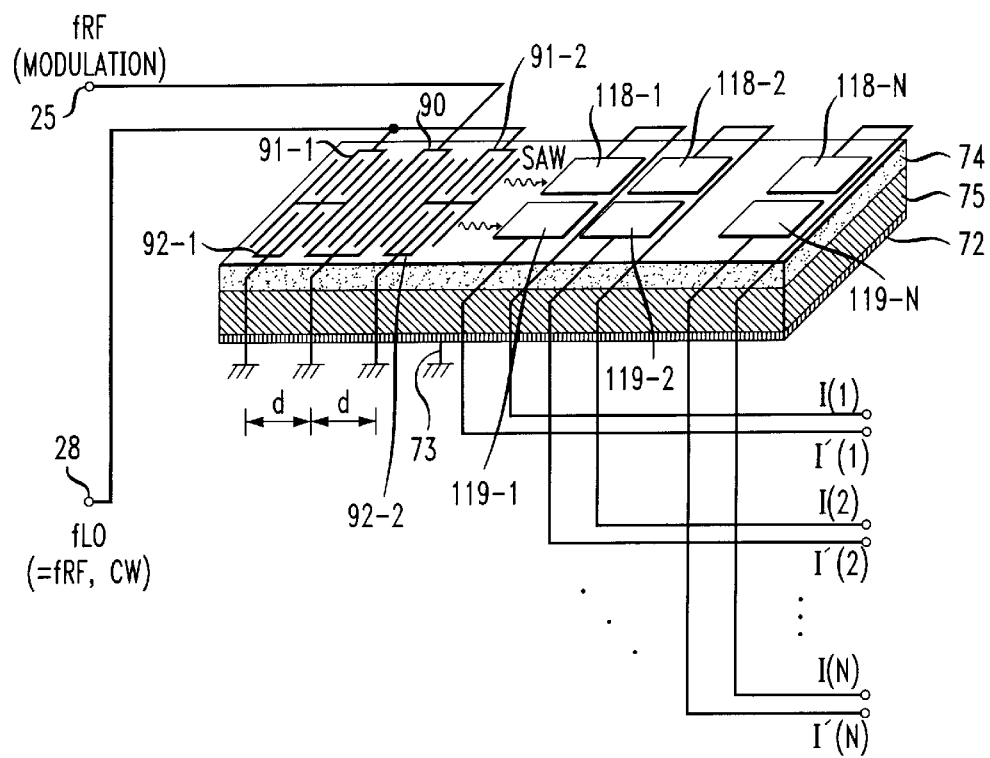
FIG. 23 is a circuit diagram of the SAW signal processing apparatus for spread-spectrum communication as an embodiment of the present invention.

FIG. 23 shows a further embodiment of the present invention as stated in Claim 32. In FIG. 22, each of the SAW delay elements form a multilayer structure of a piezoelectric matter such as ZnO, or the like, and a semiconductor such as Si, or the like, in the same manner as in FIG. 19, and has a plurality of pairs (N pairs) uniform electrodes (gate electrodes). For simplification, only one delay element is shown in FIG. 21. When this structure is applied to the delay element of FIG. 21, the same function can be achieved. Two high-frequency signals (SAW) inputted to two kinds of SAW excitation transducers are mixed by the nonlinear function of the semiconductor just under the uniform electrodes instead of the mixers. N independent base-band modulation signals are taken out as differential outputs. When the same processing as that in FIG. 22 is performed thereafter, the output level can be expected to have a value larger than that in FIG. 22.

Figure 24:
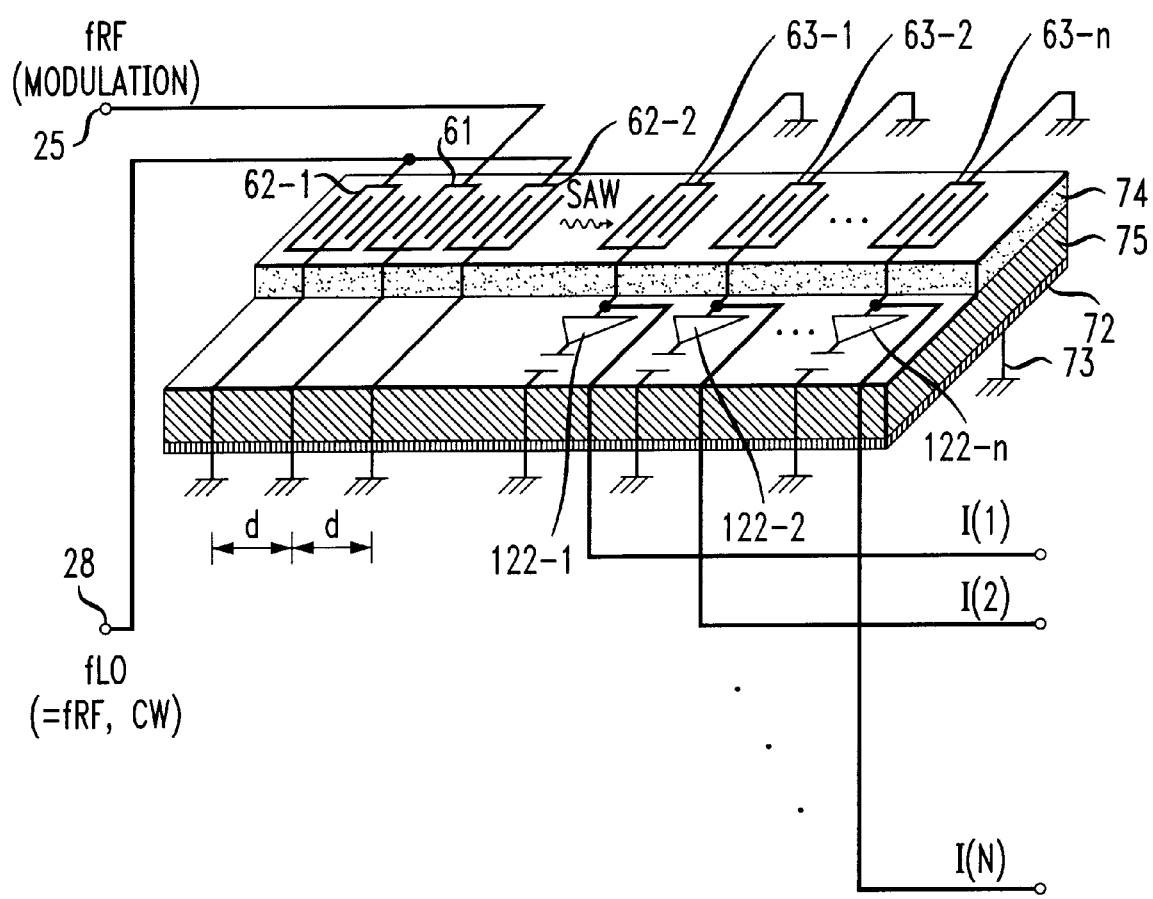
FIG. 24 is a circuit diagram of the SAW signal processing apparatus for spread-spectrum communication as an embodiment of the present invention.
Figure 25A:
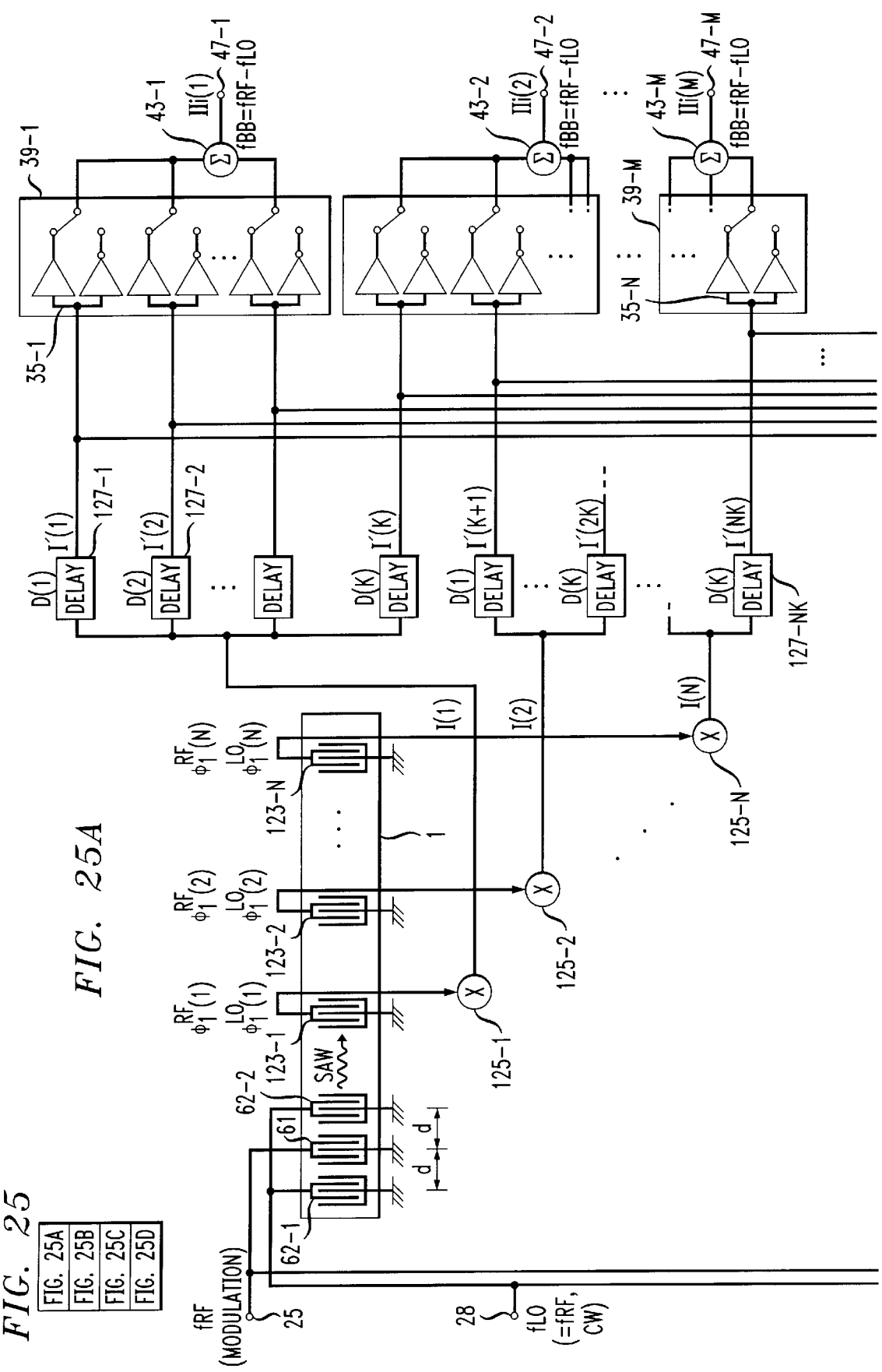
FIG. 25 is a circuit diagram of the SAW signal processing apparatus for spread-spectrum communication as an embodiment of the present invention.
Figure 25B:
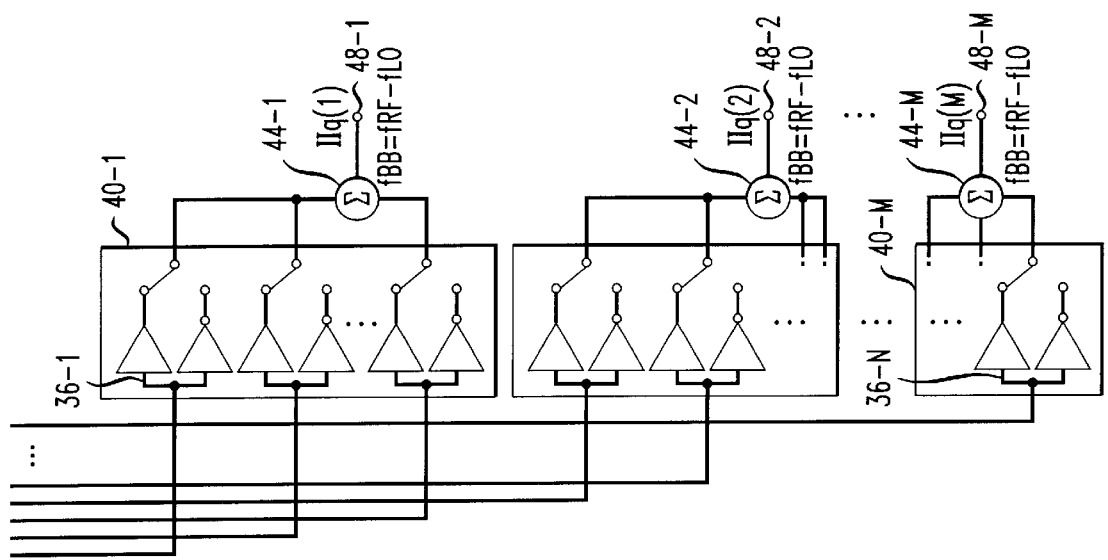
Figure 25C:
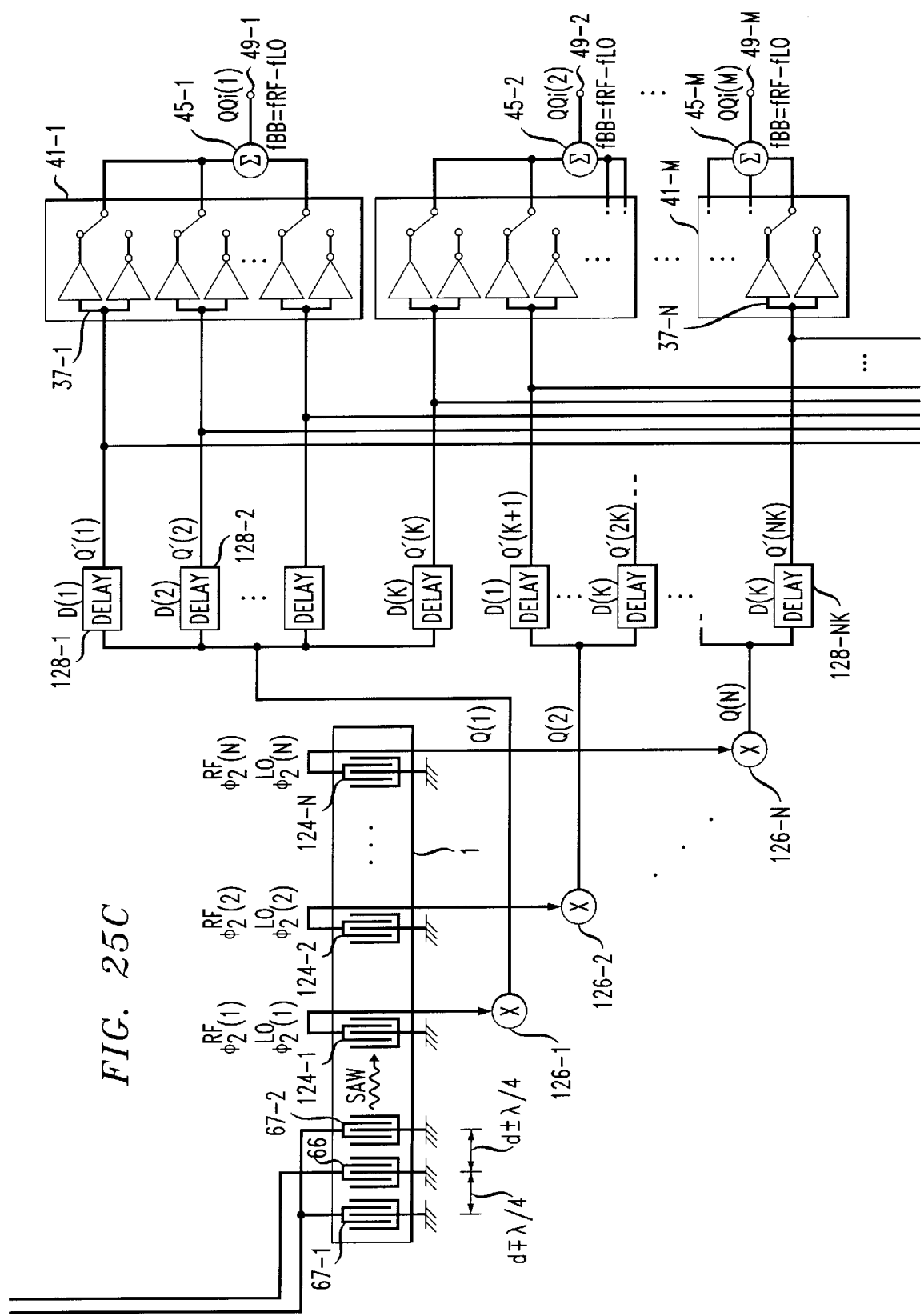
Figure 25D:
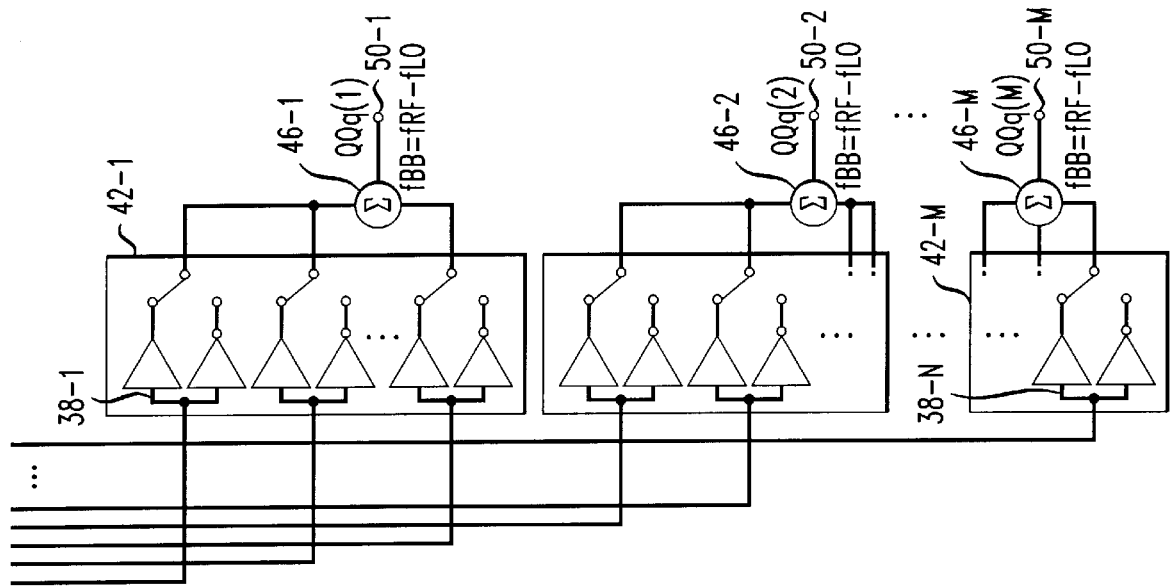

FIG. 24 shows a further embodiment of the present invention as stated in Claim 33. This embodiment is characterized in that the mixers in FIGS. 17, 20 and 21 and the delay elements are formed on the same substrate. As shown in FIG. 24, each of SAW delay elements is formed as a multilayer structure of a piezoelectric matter 74 and a semiconductor 75 such as Si, or the like. For simplification, only one delay element is shown. N outputs from reception transducers of each delay element are mixed by using N nonlinear elements such as diodes, or the like, formed on the same semiconductor, so that N outputs are independently taken out as base-band modulation signals having a frequency equal to the differential frequency. The modulation signals are weighted in the same manner as in FIG. 17 and added up. Accordingly, the delay element and the mixer are united so that extreme reduction in size can be achieved.

FIG. 25 shows a further embodiment of the present invention as stated in Claim 34. Each of SAW delay elements in FIG. 25 is configured so that reception transducers of the SAW delay elements in FIG. 17 are thinned. One transducer corresponding to several (K) chips is formed. The phase delays in corresponding outputs at adjacent terminals satisfy the following relations in $K \geq 2$.

$$|\phi_1^{RF}(1) - \phi_1^{RF}(2)| \approx |\phi_1^{RF}(2) - \phi_1^{RF}(3)| \approx, \ldots, \approx|$$

$$\phi_1^{RF}(N-1) - \phi_1^{RF}(N)| \approx |\phi_2^{RF}(1) - \phi_2^{RF}(2)| \approx|$$

$$\phi_2^{RF}(2) - \phi_2^{RF}(3)| \approx, \ldots, \approx |\phi_2^{RF}(N-1) - \phi_2^{RF}$$

$$(N)| \approx Tc \times 2 \pi f_{RF} \times K$$

Two high-frequency signals are inputted to every two SAW delay elements as shown in FIG. 25, so that two high-frequency signals obtained from N independent reception transducers are mixed by N independent mixers, and N base-band modulation signals I(1), I(2), . . . , I(N) and N base-band modulation signals Q(1), Q(2), . . . , Q(N) are taken out from the mixers. The modulation signals are inputted to K digital or analog delay circuits D(1), D(2), . . . , D(K). These delay circuits are designed so that the quantity of delay is increased by the chip length (Tc) of the spread-spectrum signal successively. The respective quantities of delay satisfy the following relations.

$$\tau(1)=0, \tau(2)=Tc, \tau(3)=2Tc, \ldots, \tau(K)=(K-1) \times Tc$$

N base-band modulation signals from the mixers are made to pass through the K delay circuits respectively to thereby take out N×K outputs, namely, from I(1) to K outputs I'(1), I'(2), . . . , I'(K), from I(2) to K outputs I'(K+1), I'(K+2), . . . , I'(2K), . . . , from I(N) to K outputs I'((N−1)K+1), I'((N−1)K+2), . . . , I'(N×K) and N×K outputs, namely, from Q(1) to K outputs Q'(1), Q'(2), . . . , Q'(K), from Q(2) to K outputs Q'(K+1), Q'(K+2), . . . , Q'(2K), . . . , from Q(N) to K outputs Q'((N−1)K+1), Q'((N−1)K+2), . . . , Q'(N×K), independently. Every N×K outputs are classified into M groups by N×K/M in the same manner as in FIG. 17, so that each of the groups is made to correspond to one symbol. Members of each group are weighted with +1 or −1 and then added up so that every M output signals can be taken out independently. Accordingly, the same function as in FIG. 17 is obtained. This configuration is suitable for the case where the chip rate is very high after the spectrum is spreaded, so that this configuration has an advantage that SAW and conventional signal processing are used in combination to thereby enlarge the range of application greatly.

Figure 26:
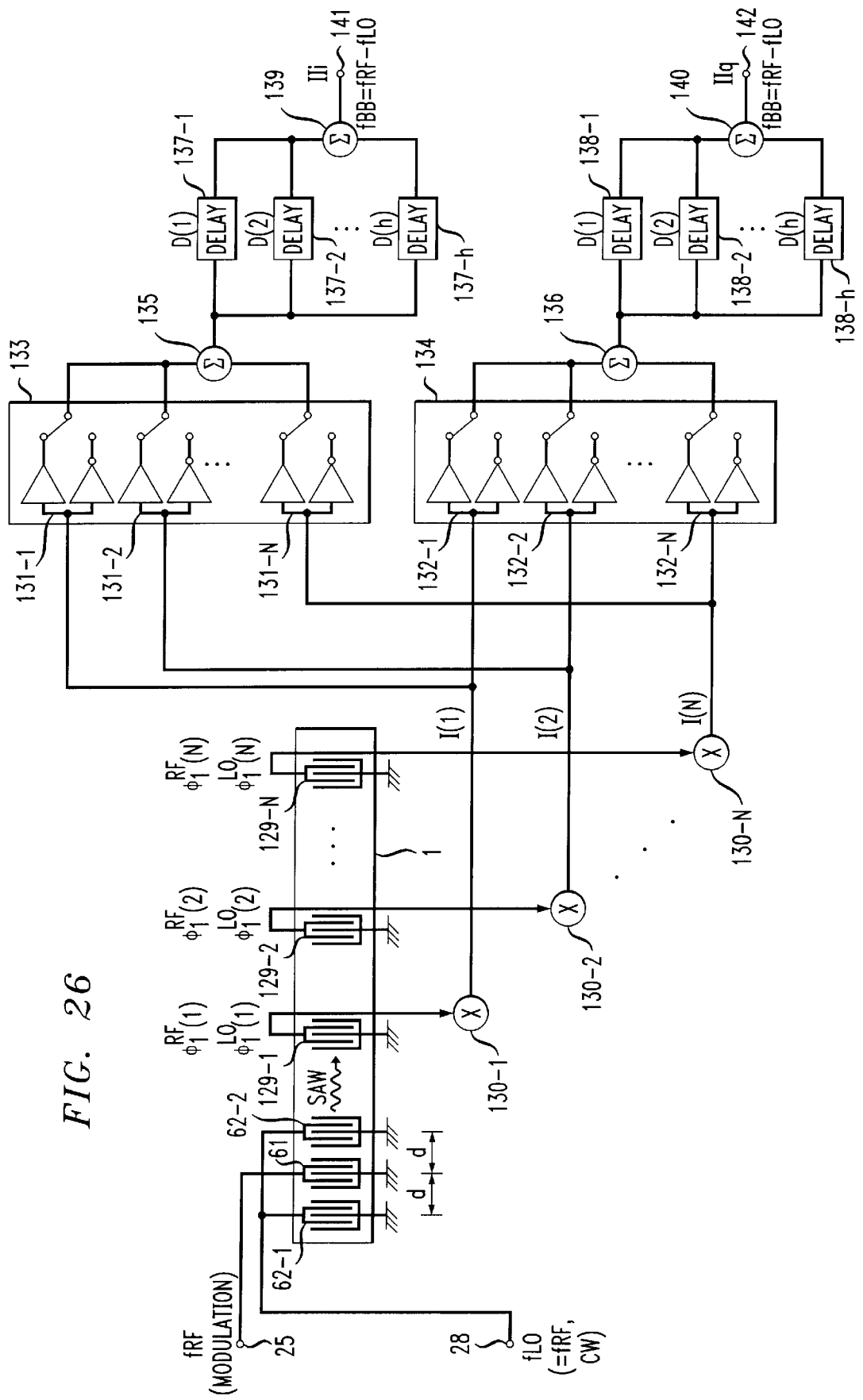
FIG. 26 is a circuit diagram of the SAW signal processing apparatus for spread-spectrum communication as an embodiment of the present invention.

FIG. 26 shows a further embodiment of the present invention as stated in Claim 31. In FIGS. 5 and 17, the number N of reception transducers is larger than the number of chips for a spread code row constituting a unit symbol, so that N base-band modulation signals obtained by N independent mixers can correspond to M ($\geq 1$) symbols. FIG. 26 shows the case of M<1. In FIG. 26, SAW excitation transducers are the same as in FIG. 17, but the number of reception transducers is smaller than the number of chips for a spread code row constituting a unit symbol. For simplification, FIG. 26 shows only one delay element. Two high-frequency signals outputted from N reception transducers are mixed by N mixers, so that N base-band modulation signals I(1), I(2), . . . , I(N) are taken out. The relations between phase delays in respective outputs are the same as in FIG. 17. N outputs are weighted with +1 or −1 corresponding to N chips for a spread code row and then added up by adders. Further, results of addition are inputted to h digital or analog delay circuits D(1), D(2), . . . , D(h) satisfying the following relations when h≈1/M.

$$\tau(1)=0, \tau(2)=N \times Tc, \tau(3)=N \times 2Tc, \ldots, \tau(h)=N \times (h-1) \times Tc$$

Output signals from the h delay circuits are further added up so that output signals IIi, IIq, QQi and QQq corresponding to one symbol can be taken out independently. These are the same outputs as IIi(1), IIq(1), QQi(1) and QQq(1) in FIGS. 5 and 17. As the initial combination for weighting the N mixer outputs with +1 or −1, h combinations per one symbol can be used. Accordingly, the weighting with +1 or −1 is finally updated by N chips correspondingly to the spread code row, but the time of h×Ts at maximum is required for obtaining the final state. In the configuration of FIG. 26, a slight initial time for obtaining autocorrelation values of spread code rows is required, but this configuration is very effective for reducing the length of each SAW delay element in spread-spectrum communication in which the length of one symbol is very large.

Although the description of FIGS. 18 through 26 has been made about the case where QPSK is mainly used as a modulation system, it is self-evident that BPSK is also used.

Although the present invention has been described above with reference to specific embodiments, more delicate points will be added. Although the phase difference of ±90° between the third SAW delay element and the second delay element in FIG. 5, the phase difference of ±90° between the fifth and fourth delay elements in FIGS. 17 and the phase differences of ±90°, ±180° and ±270° between the fifth, sixth and seventh delay elements in FIG. 20 are achieved by the propagation path length of SAW or the polarity of excitation of transducers, such phase differences do not need to be always achieved in delay elements if a phase-shift circuit of ±90° or phase-shift circuits of ±90°, ±180° and ±270° can be formed in the outside. Further, SAW delay elements used in the drawings are generally characterized in that, when transducers are formed of the same material on the same piezoelectric substrate, the temperature characteristics, or the like, of the delay elements can be made strictly coincident with each other. Although the above description has been made about the case where a modulation signal is applied to one delay element or terminal and a non-modulation signal is applied to the other delay element or terminal, it is self-evident that the same function can be obtained when the order of application of the modulation signal and the non-modulation signal is reversed. Further, with respect to the relation between the two kinds of SAW excitation transducers in each of delay elements in FIGS. 16 through 26, the same result is obtained regardless of the structure of each transducer, the number of transducers, etc. if SAW signals can be propagated on the same path in the same direction and the phase relation between signals obtained as outputs of the delay elements is kept constant.

Simplification of circuit configuration in the case where FIGS. 3, 5, 10, and 17 to 26 are achieved specifically will be described below. For simplification of the description, the description of the aforementioned drawings has been made about the case where outputs of mixers are weighted with +1 or −1 by switching circuits and then the weighted outputs are added up by adders. Even in the case where the order of switching for weighting and addition for obtaining the sum is reversed as stated in Claim 38, the same result is obtained. That is, after corresponding outputs of mixers to be weighted with +1 or −1 are added to each other, the results of the addition may be weighted with +1 or −1 and then the resulting outputs may be added up. The latter may be achieved by a small scale circuit. Of course, it is self-evident that this is included within the scope of the present invention.

Although the above description has been made about the case where the spread-spectrum signal is demodulated basically, the apparatus according to the present invention can be used as a demodulator for demodulating a general phase modulation signal. That is, the present invention can be applied to demodulation of a multiphase modulation signal such as BPSK, QPSK, 8-phase or 16-phase PSK or 16QAM (quadrature amplitude modulation).

Although the description of the drawings has been made about the case where mixers, adders, switching circuits, etc. are expressed by simple characters, diodes, bipolar transistors, FETs, compound semiconductors, etc. can be considered for achieving these circuit elements and an actual configuration method is to use CMOS techniques in the future to attain reduction of consumed electric power or provision of the apparatus as one chip as stated in Claim 39. Further, when an SAW chip and a CMOS circuit chip are directly bonded to each other by using bump-bonding, or the like, the size of the apparatus as a whole can be reduced extremely. Accordingly, it is a matter of course that the circuit configuration of the demodulation portion of a spread-spectrum communication radio machine mounting the aforementioned apparatus is simplified greatly so as to have great contribution to the reduction in size and cost of a radio machine.

In the SAW signal processing apparatus according to the present invention, a lot of problems concerning conventional SAW convolvers, SAW matched filters, etc. used for demodulation in spread-spectrum communication, etc. are solved. That is, demodulation of a high-efficient spread-spectrum signal can be performed without the necessity of any replica signal generating circuit, or the like. Further, with respect to the piezoelectric substrate used, an inexpensive substrate excellent in efficiency of conversion of an electric signal into SAW can be used regardless of the temperature characteristic of the substrate. Further, when a circuit configuration using CMOS in external mixers, etc. is employed, further reduction in cost and size can be achieved. When an SAW chip and a CMOS circuit chip are directly bonded to each other by using bump-bonding, etc., extreme reduction in size of the apparatus as a whole is attained to thereby have great contribution to the reduction in size of a radio machine terminal.

What is claimed is:

1. A surface acoustic wave signal processing apparatus for processing first and second high-frequency signals having frequencies $f_1$ and $f_2$ respectively, wherein said first high-frequency signal is a modulated wave signal and said second high-frequency signal is a non-modulated wave signal, which comprises:

first and second surface acoustic wave delay elements for receiving said first and second high frequency signals respectively and independently of each other, said delay elements being formed as surface acoustic wave excitation and reception transducers on a piezoelectric substrate so that a phase delay $\phi_1$ with respect to the frequency $f_1$ is substantially equal to a phase delay $\phi_2$ with respect to the frequency $f_2$ (that is, $\phi_1 \approx \phi_2$); and a mixer for mixing first and second high-frequency output signals of said first and second surface acoustic wave delay elements so that a signal having a frequency $|f_1-f_2|$ which is a difference between said two frequencies $f_1$ and $f_2$ is taken out as an output signal of said mixer.

2. A surface acoustic wave signal processing apparatus according to claim 1, wherein said frequency $f_1$ of said first high-frequency signal and said frequency $f_2$ of said second high-frequency signal are equal to each other except broadening of spectral bandwidth of said first high-frequency signal due to modulation so that a modulated signal of a base band is directly outputted from said mixer.

3. A surface acoustic wave signal processing apparatus according to claim 1, wherein: said first and second surface acoustic wave delay elements are integrated to constitute a third surface acoustic wave delay element; two kinds of surface acoustic wave excitation transducers and one kind of reception transducers are formed on said piezoelectric substrate; first and second high-frequency signals which are a modulation signal such as a spread-spectrum signal, or the like, and a non-modulation signal having a frequency f equal to the frequency of the modulation signal except the spectral spread due to modulation are inputted to said two kinds of surface acoustic wave excitation transducers of said third surface acoustic wave delay element capable of propagating said two high-frequency signals in the same direction and in the same path on the same substrate; said first and second high-frequency signals obtained simultaneously from outputs of said two kinds of surface acoustic wave excitation transducers are mixed by a mixer; and a modulation signal of a base band is directly outputted from said mixer.

4. A surface acoustic wave signal processing apparatus according to claim 3, wherein: said two kinds of surface acoustic wave excitation transducers include one kind of surface acoustic wave excitation transducers for exciting in-phase surface acoustic wave with respect to a center axis of excited surface acoustic wave, and the other kinds of surface acoustic wave excitation transducers for exciting anti-phase surface acoustic wave with respect to a center axis of excited surface acoustic wave; said reception transducers output a sum of in-phase surface acoustic wave signals and a sum of in-phase and anti-phase surface acoustic wave signals independently of each other; said outputs are mixed by balanced mixers so that N pairs of base-band modulation signals having phases reverse to each other are taken out independently of each other in the form of differential output pairs.

5. A surface acoustic wave signal processing apparatus according to claim 4, wherein: each of said N pairs of base-band modulation signals having phases reverse to each other and obtained from outputs of said balanced mixers are weighted so that when one of the differential outputs is weighted with +1 correspondingly to said spread code row, the other is weighted with −1 or when one of the differential outputs is weighted with −1 correspondingly to said spread code row, the other is weighted with +1; said weighted outputs are added up correspondingly to phases perpendicular to each other so that the output signals are taken out as independent signals.

6. A surface acoustic wave signal processing apparatus according to claim 4, wherein: said reception transducers of said surface acoustic wave delay elements and said balanced mixers are replaced by a plurality of pairs (N pairs) of uniform electrodes disposed symmetrically with each other with respect to a center axis of excited surface acoustic wave; and two high-frequency signals are mixed by using a nonlinear phenomenon of surface acoustic wave in said piezoelectric substrate just under said uniform electrode pairs so that outputs thereof are taken out as differential base-band modulation signals from said N pairs of uniform electrodes independently of each other.

7. A surface acoustic wave signal processing apparatus according to claim 4, wherein: each of said surface acoustic delay elements has a configuration using a multilayer structure of a piezoelectric matter such as ZnO, or the like, and a semiconductor such as Si, or the like; said reception transducers of said surface acoustic wave delay elements and said balanced mixers are replaced by a plurality of pairs (N pairs) of uniform electrodes disposed symmetrically with each other with respect to a center axis of excited surface acoustic wave; and two high-frequency signals are mixed by using nonlinear relation between potential and electric field in said semiconductor so that outputs thereof are taken out as differential base-band modulation signals from said N uniform electrode pairs independently.

8. A surface acoustic wave signal processing apparatus according to claim 3, wherein: each of said surface acoustic delay elements has a configuration using a multilayer structure of a piezoelectric substrate and a semiconductor substrate such as an Si substrate, or the like; and first and second high frequency signals obtained from N output terminals of said third and fourth delay elements are mixed by using a nonlinear element array such as a diode array, or the like, formed on said semiconductor substrate so that N modulation signals each having a frequency equal to the differential frequency, that is, of a base band are taken out independently of each other.

9. A surface acoustic wave signal processing apparatus according to claim 1, wherein: each of said first and second surface acoustic wave delay elements has a plurality of output terminals the numbers of which is assumed to be N so that the phase delays $\phi_1(1)$, $\phi_1(2)$, ..., $\phi_1(N)$ for said frequency $f_1$ at the respective output terminals of said first surface acoustic wave delay element are substantially equal to the phase delays $\phi_2(1)$, $\phi_2(2)$, ..., $\phi_2(N)$ for said frequency $f_2$ at the respective output terminals of said second surface acoustic wave delay element correspondingly respectively (that is, $\phi_1(1) \approx \phi_2(1)$, $\phi_1(2) \approx \phi_2(2)$, ..., $\phi_1(N) \approx \phi_2(N)$); said first high-frequency signal is a DS spread spectrum signal having a spectrum mainly spread by a change in phase whereas said second high-frequency signal is a non-modulation signal; each difference ($|\phi_1(1)-\phi_1(2)|$, $|\phi_1(2)-\phi_1(3)|$, ..., $|\phi_1(N-1)-\phi_1(N)|$) between phase delays in outputs at adjacent terminals in said N output terminals of said first delay element is substantially equal to a value $2\pi f_1$ times as large as a length Tc of each of chips constituting a unit spread code row (corresponding to a unit symbol of the modulation signal) of said spread-spectrum signal or an integer (K) multiple of said value $2\pi f_1$ times as large as the length Tc; and said first and second high-frequency signals obtained correspondingly respectively from the terminals of said first and second delay elements are mixed by N independent mixers so that N independent output signals (O(1), O(2), ..., O(N)) each of which is equal to a differential frequency between the frequencies $f_1$ and $f_2$ are taken out from said mixers respectively.

10. A surface acoustic wave signal processing apparatus according to claim 9, wherein: a difference $|\phi_1(1)-\phi_1(N)|$ between phase delays in outputs at the first and N-th output terminals of the first delay element is substantially equal to a product (Ts×2 Πf$_1$×M) of the unit symbol length (Ts) of the spread-spectrum signal and a value M times as large as 2 Πf$_1$; when M is an integer satisfying M≧1, output signals O(1), O(2), ..., O(N) obtained from the respective N mixers are classified into M groups, namely, from 1 to N/M, from N/M+1 to 2N/M, ..., from (M−1)N/M+1 to N; each of the groups corresponds to a unit symbol of said spread-spectrum signal; and after N/M outputs in each group are weighted with +1 or −1 correspondingly to chips of a spread code row constituting said unit symbol, the N/M outputs are added up correspondingly to each group so that M output signals (OO(1), OO(2), ..., OO(M)) are taken out independently of each other.

11. In an apparatus according to claim 10 in which M is equal to 1, a synchronous detector for demodulating a spread-spectrum signal by using the amplitude and phase of said output signal OO(1).

12. In an apparatus according to claim 5 in which M is equal to 2, a delay detector for demodulating a spread-spectrum signal by using correlation in amplitude and phase between said output signals OO(1) and OO(2).

13. In an apparatus according to claim 10, a spread-spectrum signal delay detector in which: data detection clock pulses for demodulating a spread-spectrum signal are determined on the basis of a result of an arithmetic operation $|OO(1)+OO(2)|^2+|OO(1)-OO(2)|^2$; and data are detected on the basis of a result of an arithmetic operation $|OO(1)+OO(2)|^2-|OO(1)-OO(2)|^2$ or on the basis of a result of an output of a mixer to which OO(1) and OO(2) are inputted.

14. A surface acoustic wave signal processing apparatus according to claim 10, wherein: the order of weighting with +1 or −1 and addition by said groups is reversed so that corresponding outputs to be weighted with +1 or −1 are added up, weighted with +1 or −1 and then added up.

15. A surface acoustic wave signal processing apparatus according to claim 4, wherein: the output signals O(1), O(2), ..., O(N) obtained from the N mixers are classified into M groups in the same manner as the apparatus described in claim 10; said groups correspond to unit symbols of said spread-spectrum signal respectively; each of said unit symbols is constituted by modulation wave which is obtained by applying modulation to two phases perpendicular to each other on the basis of corresponding two spread code rows; and after said output signals O(1), O(2), ..., O(N) are weighted with +1 or −1 correspondingly to respective chips of said two spread code rows, said output signals O(1), O(2), ..., O(N) are added up for every groups corresponding to said two perpendicular phases, that is, said two spread code rows so that M output signals OOi(1), OOi(2), ..., OOi(M) and M output signals OOq(1), OOq(2), ..., OOq(M) are taken out independently of each other.

16. In an apparatus according to claim 15 in which M is equal to 1, a synchronous detector for demodulating a spread-spectrum signal by using the amplitude and phase of said output signals OOi(1) and OOq(1).

17. In an apparatus according to claim 15 in which M is equal to 2, a delay detector for demodulating a spread-spectrum signal by using correlations in amplitude and phase between said output signals OOi(1) and OOi(2), and between said output signals OOq(1) and OOq(2).

18. In an apparatus according to claim 15 a spread-spectrum signal delay detector in which: data detection clock pulses for demodulating a spread-spectrum signal are determined on the basis of a result of an arithmetic operation $|OOi(1)+OOi(2)|^2+|OOi(1)-OOi(2)|^2$ or $|OOq(1)+OOq(2)|^2+|OOq(1)-OOq(2)|^2$; and data corresponding to two phases perpendicular to each other are demodulated by said arithmetic operation $|OOi(1)+OOi(2)|^2-|OOi(1)-OOi(2)|^2$ or mixture of OOi(1) and OOi(2) or by said arithmetic operation $|OOq(1)+OOq(2)|^2-|OOq(1)-OOq(2)|^2$ or mixture of OOq(1) and OOq(2).

19. In an apparatus according to claim 9, a spread-spectrum signal demodulator in which said spread-spectrum signal is modulated by a modulation system using BPSK based on two-valued BPSK, π/2-shift BPSK, etc.

20. In an apparatus according to claim 9, spread-spectrum signal demodulator in which said spread-spectrum signal is modulated by a modulation system using QPSK based on four-valued QPSK, MSK, GMSK, OQPSK, π/4-shift QPSK etc.

21. A surface acoustic wave signal processing apparatus according to claim 9, wherein: mixers, adders and weighting circuits with +1 or −1 are achieved by CMOS circuit elements.

22. A spread-spectrum communication radio machine in which said surface acoustic wave signal processing apparatus according to claim 9 is mounted.

23. A spread-spectrum communication radio machine in which: said surface acoustic wave signal processing apparatus according to claim 4 is mounted; said spread-spectrum signal is a reception signal for said radio machine or an intermediate frequency signal whereas said non-modulation signal is a local oscillation signal for said radio machine; and said radio machine has an external circuit (that is, a carrier reproducing circuit) for setting the frequency and phase of said local oscillation signal on the basis of said spread-spectrum signal or said radio machine corrects the frequency and phase equivalently by digital signal processing.

24. In an apparatus according to claim 22, a spread-spectrum communication radio machine comprising an external circuit (that is, a clock reproducing circuit) for detecting the symbol-repetition frequency of a spread-spectrum signal on the basis of a reception signal.

25. A surface acoustic wave signal processing apparatus for processing first and second high-frequency signals which are a spread-spectrum signal having a frequency $f_{RF}$ and a non-modulation signal having a frequency $f_{LO}$ respectively so that each of said frequencies $f_{RF}$ and $f_{LO}$ are equal to a frequency f except the broadening of the spectral bandwidth due to modulation (that is, $f_{RF} \approx f_{LO} \approx f$), said apparatus comprising: a first surface acoustic wave delay element having N output terminals at which phase delays in outputs are $\phi_1(1)$, $\phi_1(2)$, ..., $\phi_1(N)$ respectively; a second surface acoustic wave delay element having N output terminals at which phase delays in outputs are $\phi_2(1)$, $\phi_2(2)$, ..., $\phi_2(N)$ respectively so that said phase delays in outputs at said output terminals of said second surface acoustic wave delay element are substantially equal to said phase delays in outputs at said output terminals of said first surface acoustic wave delay element respectively correspondingly (that is, $\phi_1(1) \approx \phi_2(1)$, $\phi_1(2) \approx \phi_2(2)$, ..., $\phi_1(N) \approx \phi_2(N)$); a third surface acoustic wave delay element having N output terminals at which phase delays in outputs for said frequency f are $\phi_3(1)$, $\phi_3(2)$, ..., $\phi_3(N)$ respectively with phase differences of about 90° from those in said second delay element (that is, $\phi_2(1) \approx \phi_3(1) \pm 90°$, $\phi_2(2) \approx \phi_3(2) \pm 90°$, ..., $\phi_2(N) \approx \phi_3(N) \pm 90°$); and independent N mixers in which the differences ($|\phi_1(1)-\phi_1(2)|$, $|\phi_1(2)-\phi_1(3)|$, ..., $|\phi_1(N-1)-\phi_1(N)|$, $|\phi_2(1)-\phi_2(2)|$, $|\phi_2(2)-\phi_2(3)|$, ..., $|\phi_2(N-1)-\phi_2(N)|$ and $|\phi_3(1)-\phi_3(2)|$, $|\phi_3(2)-\phi_3(3)|$, ..., $|\phi_3(N-1)-\phi_3(N)|$) between phase delays in outputs at adjacent ones of said N output terminals in each of said delay elements are substantially equal to a value $2\pi f$ times as large as the length Tc of each chip constituting a unit spread code row (corresponding to a unit symbol) of a spread-spectrum signal or to an integer (K) multiple of said value $2\pi f$ times as large as the length Tc of each chip; said first and second high-frequency signals are inputted to said first and second delay elements, and first and second high-frequency output signals respectively obtained from corresponding terminals of said first and second delay elements are mixed by said independent N mixers so that N modulation signals (l(1), l(2), ..., l(N)) which are equal to differential frequencies respectively, that is, which are of a base band, are taken out independently from said N mixers; and a third high-frequency signal which is the same signal as said second high-frequency signal is inputted to said third delay element, and first and third high-frequency output signals respectively obtained from corresponding terminals of said first and third delay elements are mixed by said independent N mixers so that N modulation signals (Q(1), Q(2), ..., Q(N)) which are equal to differential frequencies respectively, that is, which are of a base band, are taken out independently from said N mixers.

26. A surface acoustic wave signal processing apparatus according to claim 25, wherein the 90° phase difference of said third surface acoustic wave delay element from said second delay element is achieved by a change (shortening or extension by a quarter wavelength) of a propagation path of each surface acoustic wave delay element.

27. A surface acoustic wave signal processing apparatus according to claim 25, wherein the 90° phase difference of said third surface acoustic wave delay element from said second delay element is achieved by an external circuit regardless of a change of a propagation path of each surface acoustic wave delay element.

28. A surface acoustic wave signal processing apparatus according to claim 25, wherein: the differences $|\phi_1(1)-\phi_1(N)|$, $|\phi_2(1)-\phi_2(N)|$, and $|\phi_3(1)-\phi_3(N)|$ between phase delays in outputs at the respective first and N-th output terminals of said first, second and third delay elements are substantially equal to a product (Ts×2 πf×M) of the unit symbol length (Ts) of the spread-spectrum signal and a value M times as large as 2 πf; when M is an integer satisfying M≧1, output signals I(1), I(2), ..., I(N) and Q(1), Q(2), ..., Q(N) obtained from the respective N mixers are classified into M groups, namely, from 1 to N/M, from N/M+1 to 2N/M, ..., from (M−1)N/M+1 to N; each of said groups corresponds to a unit symbol of said spread-spectrum signal; after N/M outputs in each group are weighted with +1 or −1 correspondingly to chips of a spread code row constituting said unit symbol, said N/M outputs are added up by said groups so that M output signals IIi(1), IIi(2), ..., II(M) and M output signals QQi(1), QQi(2), ..., QQi(M) are taken out independently.

29. In an apparatus according to claim 28 in which M is equal to 1, a synchronous detector for demodulating a spread-spectrum signal by using the amplitude and phase of said output signals IIi(1) and QQi(1).

30. In an apparatus according to claim 28 in which M is equal to 2, a synchronous detector for demodulating a spread-spectrum signal by using correlations in amplitude and phase between said output signals IIi(1) and IIi(2) and between said output signals QQi(1) and QQi(2).

31. In an apparatus according to claim 30 a spread-spectrum signal delay detector in which: data detection clock pulses for demodulating a spread-spectrum signal are determined on the basis of a result of an arithmetic operation $\{IIi(1)+IIi(2)\}^2+(QQi(1)+QQi(2)\}^2+\{IIi(1)-IIi(2)\}^2+\{QQi(1)-QQi(2)\}^2$; and data are demodulated by a result of an arithmetic operation $\{IIi(1)+IIi(2)\}^2+\{QQi(1)+QQi(2)\}^2-\{IIi(1)-IIi(2)\}^2-\{QQi(1)-QQi(2)\}^2$.

32. A surface acoustic wave signal processing apparatus according to claim 25, wherein: the differences $|\phi_1(1)-\phi_1(N)|$, $|\phi_2(1)-\phi_2(N)|$, and $|\phi_3(1)-\phi_3(N)|$ between phase delays in outputs at the respective first and N-th output terminals of said first, second and third delay elements are substantially equal to a product (Ts×2 πf×M) of the unit symbol length (Ts) of the spread-spectrum signal and a value M times as large as 2 πf; when M is an integer satisfying M≧1, output signals I(1), I(2), ..., I(N) obtained from N mixers and output signals Q(1), Q(2), ..., Q(N) obtained from the respective N mixers are classified into M groups, namely, from 1 to N/M, from N/M+1 to 2N/M, ..., from (M−2)N/M+1 to N; each of said groups corresponds to a unit symbol of the spread-spectrum signal; said unit symbol is constituted by wave modulated on the basis of two spread code rows corresponding to two phases perpendicular to each other; after said output signals I(1), I(2), ..., I(N) and output signals Q(I), Q(2), ..., Q(N) are weighted with +1 or −1 correspondingly to chips of said two spread code rows, said output signals I(1), I(2), ..., I(N) and output signals Q(1), Q(2), ..., Q(N) are added up by said groups correspondingly to said two perpendicular phases, that is, correspondingly to said two spread code rows so that M output signals IIi(1), IIi(2), ..., IIi(M), M output signals QQi(1), QQi(2), ..., QQi(M), M output signals IIq(1), IIq(2), ..., IIq(M) and M output signals QQq(1), QQq(2), ..., are taken out independently of each other.

33. In an apparatus according to claim 32 in which M is equal to 1, a synchronous detector for demodulating a spread-spectrum signal by using the amplitude and phase of said output signals IIi(1) and QQi(1), and IIq(1) and QQq(1).

34. In an apparatus according to claim 32 in which M is equal to 2, a synchronous detector for demodulating a spread-spectrum signal by using correlations in amplitude and phase between said output signals IIi(1) and IIi(2), QQi(1) and QQi(2), IIq(1) and IIq(2), and QQq(1) and QQq(2).

35. In an apparatus according to claim 34, a spread-spectrum signal delay detector in which: data detection clock pulses for demodulating a spread-spectrum signal are determined on the basis of a result of an arithmetic operation $\{IIi(1)+IIi(2)\}^2+\{QQi(1)+QQi(2)\}^2+\{IIi(1)-IIi(2)\}^2+\{QQi(1)-QQi(2)\}^2$ or $\{IIq(1)+IIq(2)\}^2+\{QQq(1)+QQq(2)\}^2+\{IIq(1)-IIq(2)\}^2+\{QQq(1)-QQq(2)\}^2$; and data corresponding to two phases perpendicular to each other are demodulated on the basis of a result of an arithmetic operation $\{IIi(1)+IIi(2)\}^2+\{QQi(1)+QQi(2)\}^2-\{IIi(1)-IIi(2)\}^2-\{QQi(1)-QQi(2)\}^2$ or $\{IIq(1)+IIq(2)\}^2+\{QQq(1)+QQq(2)\}^2-\{IIq(1)-IIq(2)\}^2-\{QQq(1)-QQq(2)\}^2$.

36. A surface acoustic wave signal processing apparatus according to claim 25, wherein: said first and second surface acoustic wave delay elements are integrated to constitute a fourth surface acoustic wave delay element; said first and third surface acoustic wave delay elements are integrated to constitute a fifth surface acoustic wave delay element; said fourth surface acoustic wave delay element has two kinds of surface acoustic wave excitation transducers and N reception transducers formed on said piezoelectric substrate and can propagate two high-frequency signals in the same direction and in the same path on the same substrate so that phase delays $\phi_1^{RF}(1), \phi_1^{RF}(2), \ldots, \phi_1^{RF}(N)$ in outputs at the respective terminals for said spread-spectrum signal having a frequency f are substantially equal to phase delays $\phi_1^{LO}(1), \phi_1^{LO}(2), \ldots, \phi_1^{LO}(N)$ in outputs obtained from the same terminals for said non-modulation signal (that is, $\phi_1^{RF}(1) \approx \phi_1^{LO}(1), \phi_1^{RF}(2) \approx \phi_1^{LO}(2), \ldots, \phi_1^{RF}(N) \approx \phi_1^{LO}(N)$; said fifth surface acoustic wave delay element has two kinds of surface acoustic wave excitation transducers and N reception transducers formed on said piezoelectric substrate and can propagate two high-frequency signals in the same direction and in the same path on the same substrate so that phase delays $\phi_2^{RF}(1), \phi_2^{RF}(2), \ldots, \phi_2^{RF}(N)$ in outputs at the N output terminals for said spread-spectrum signal having said frequency f are equal to said phase delays $\phi_1^{RF}(1), \phi_1^{RF}(2), \ldots, \phi_1^{RF}(N)$ in outputs of said fourth delay element for said spread-spectrum signal and that phase delays $\phi_2^{LO}(1), \phi_2^{LO}(2), \ldots, \phi_2^{LO}(N)$ in outputs obtained from the same terminals for said non-modulation signal have a phase difference of 90° from said phase delays $\phi_1^{LO}(1), \phi_1^{LO}(2), \ldots, \phi_1^{LO}(N)$ in outputs of said fourth delay element for said non-modulation signal (that is, $\phi_1^{LO}(1) \approx \phi_2^{LO}(1) \pm 90°, \phi_1^{LO}(2) \approx \phi_2^{LO}(2) \pm 90°, \ldots, \phi_1^{LO}(N) \approx \phi_2^{LO}(N) \pm 90°$); first and second high-frequency signals one of which is a modulation signal such as a spread-spectrum signal, or the like, having a frequency $f_{RF}$ and the other of which is a non-modulation signal having a frequency $f_{RF}$ equal to the frequency of the modulation signal except the spectral spread due to modulation (that is, $f_{RF} \approx f_{LO} \approx f$) are inputted to said two kinds of surface acoustic wave excitation transducers of said forth and fifth surface acoustic wave delay elements; said first and second high-frequency signals obtained simultaneously from said N output terminals of said fourth delay element are mixed so that N modulation signals (I(1), I(2), ..., I(N)) of a base band having frequencies equal to differential frequencies are taken out from said mixers; said first and second high-frequency signals obtained simultaneously from said N output terminals of said fifth delay element are mixed so that N modulation signals (Q(1), Q(2), ..., Q(N)) of a base band having frequencies equal to differential frequencies are taken out from said mixers; and after said N outputs (I(1), I(2), ... I(N)) and said outputs (Q(1), Q(2), ..., Q(N)) are weighted with +1 or −1 correspondingly to said spread code rows, said N outputs (I(1), I(2), ..., I(N)) and said outputs (Q(1), Q(2), ..., Q(N)) are added up correspondingly to phases perpendicular to each other so that output signals are taken out independently of each other.

37. A surface acoustic wave signal processing apparatus according to claim 36, wherein: a plurality of uniform electrodes the number of which is assumed to be N are formed instead of said reception transducers of said surface acoustic wave delay elements; a nonlinear phenomenon of surface acoustic wave in said piezoelectric substrate just under said uniform electrodes is used instead of said mixers to thereby mix two high-frequency signals; and outputs of mixing are taken out from said N uniform electrodes independently of each other.

38. A surface acoustic wave signal processing apparatus according to claim 36, wherein: each of said surface acoustic wave delay elements uses a multilayer structure of a piezoelectric material such as ZnO, or the like, and semiconductors such as Si, or the like; a plurality of uniform electrodes the number of which is assumed to be N are formed instead of said reception transducers of said surface acoustic wave delay elements; and nonlinear relation between potential and electric field in said semiconductors is used so that mixture outputs of two high-frequency signals are taken out from said N uniform electrodes independently of each other.

39. A surface acoustic wave signal processing apparatus according to claim 36, further comprising: a sixth surface acoustic wave delay element which is similar in configuration to said fourth delay element and in which surface acoustic wave having a phase reverse to the phase of said fourth delay element is excited from one of two kinds of surface acoustic excitation transducers; and a seventh surface acoustic wave delay element which is similar in configuration to said fifth delay element and in which surface acoustic wave having a phase reverse to the phase of said fourth delay element is excited from one of two kinds of surface acoustic excitation transducers, wherein: said first and second high-frequency signals are inputted to respective two kinds of surface acoustic wave excitation transducers of each of said fourth, fifth and sixth and seventh delay elements; and said first and second high-frequency signals obtained simultaneously from respective N output terminals of at least said fourth and fifth delay elements are mixed, so that respective N modulation signals each having a frequency equal to the differential frequency, that is, of a base band are taken out independently from said mixers.

40. A surface acoustic wave signal processing apparatus according to claim 36, wherein: said two kinds of surface acoustic wave excitation transducers include one kind of surface acoustic wave excitation transducers for exciting in-phase surface acoustic wave with respect to a center axis of excited surface acoustic wave, and the other kinds of surface acoustic wave excitation transducers for exciting anti-phase surface acoustic wave with respect to a center axis of excited surface acoustic wave; said reception transducers output a sum of in-phase surface acoustic wave signals and a sum of in-phase and anti-phase surface acoustic wave signals independently of each other; said outputs are mixed by balanced mixers so that N pairs of base-band modulation signals having phases reverse to each other are taken out independently of each other in the form of differential output pairs.

41. A surface acoustic wave signal processing apparatus according to claim 40, wherein: each of said N pairs of base-band modulation signals having phases reverse to each other and obtained from outputs of said balanced mixers are weighted so that when one of the differential outputs is weighted with +1 correspondingly to said spread code row, the other is weighted with −1 or when one of the differential outputs is weighted with −1 correspondingly to said spread code row, the other is weighted with +1; said weighted outputs are added up correspondingly to phases perpendicular to each other so that the output signals are taken out as independent signals.

42. A surface acoustic wave signal processing apparatus according to claim 41, wherein: said reception transducers of said surface acoustic wave delay elements and said balanced mixers are replaced by a plurality of pairs (N pairs) of uniform electrodes disposed symmetrically with each other with respect to a center axis of excited surface acoustic wave; and two high-frequency signals are mixed by using a nonlinear phenomenon of surface acoustic wave in said piezoelectric substrate just under said uniform electrode pairs so that outputs thereof are taken out as differential base-band modulation signals from N pairs of uniform electrodes independently of each other.

43. A surface acoustic wave signal processing apparatus according to claim 40, wherein: each of said surface acoustic delay elements has a configuration using a multilayer structure of a piezoelectric matter such as ZnO, or the like, and a semiconductor such as Si, or the like; said reception transducers of said surface acoustic wave delay elements and said balanced mixers are replaced by a plurality of pairs (N pairs) of uniform electrodes disposed symmetrically with each other with respect to a center axis of excited surface acoustic wave; and two high-frequency signals are mixed by using nonlinear relation between potential and electric field in said semiconductor so that outputs thereof are taken out as differential base-band modulation signals from said N uniform electrode pairs independently.

44. A surface acoustic wave signal processing apparatus according to claim 25, wherein: K is an integer satisfying the relation K≧2; N base-band modulation signals I(1), I(2), ..., I(N) and N base-band modulation signals Q(1), Q(2), ..., Q(N) obtained from said mixers are inputted to K digital or analog delay circuits D(1), D(2), ..., D(K) for successively increasing the quantities of delays by the chip length Tc of said spread-spectrum signal (that is, τ(1)=0, τ(2)=Tc, τ(3)=2Tc, ..., τ(K)=(K−1)×Tc) so that N×K outputs, namely, I'(1), I'(2), ..., I'(K) form I(1), I'(K+1), I'(K+2), ..., I'(2K) from I(2), ..., I'((N−1)K+1), I'((N−1K+2), ..., I'(N×K) from I(N), and N×K outputs, namely Q'(1), Q'(2), ..., Q'(K) from Q(1), Q'((N−1)K+2, ..., Q'(2K) from Q(2), ..., Q'((N−1)K+1), Q'((N−1)K+2), ..., Q'(N×K) from Q(N), are taken out independently of each other; and the outputs thus taken out are weighted with +1 or −1 correspondingly to spread code rows and then added up correspondingly to phases perpendicular to each other so that output signals are taken out independently of each other.

45. A surface acoustic wave signal processing apparatus according to claim 25, wherein: M is smaller than 1; base-band modulation signals I(1), I(2), ..., I(N) and Q(1), Q(2), ..., Q(N) obtained from said mixers are weighted with +1 or −1 correspondingly to spread code rows and then added up on the basis of two phases perpendicular to each other; and results of addition are inputted to h(≈1/M) digital or analog delay circuits D(1), D(2), ..., D(h) for successively increasing the quantities of delay by N times of the chip length Tc of the spread-spectrum signal (that is, τ(1)=0, τ(2)=N×Tc, τ(3)=N×2Tc, ..., τ(h)=N×(h−1)×Tc) so that N×h is not smaller than the number of chips constituting a unit symbol; respective h outputs are taken out from said digital or analog delay circuits and added up on the basis of phases perpendicular to each other so that output signals IIi and QQi, and output signals IIq and QQq are taken out independently of each other.

\* \* \* \* \*

UNITED STATES PATENT AND TRADEMARK OFFICE
CERTIFICATE OF CORRECTION

PATENT NO. : 6,047,306 Page 1 of 1
DATED : April 4, 2000
INVENTOR(S) : Hikita et al.

It is certified that error appears in the above-identified patent and that said Letters Patent is hereby corrected as shown below:

<u>Title page,</u>
Item [73], Assignee, insert -- Hitachi Media Electronics Co., Ltd. Japan --

Signed and Sealed this

Twenty-eighth Day of June, 2005

JON W. DUDAS
*Director of the United States Patent and Trademark Office*